US010578953B1

(12) United States Patent
Hallett

(10) Patent No.: US 10,578,953 B1
(45) Date of Patent: Mar. 3, 2020

(54) VIEW CAMERA ADAPTER

(71) Applicant: Richard Hallett, Albuquerque, NM (US)

(72) Inventor: Richard Hallett, Albuquerque, NM (US)

(73) Assignee: Richard Hallett, Albuquerque, NM (US)

( * ) Notice: Subject to any disclaimer, the term of this patent is extended or adjusted under 35 U.S.C. 154(b) by 0 days.

(21) Appl. No.: 16/517,518

(22) Filed: Jul. 19, 2019

(51) Int. Cl.
G03B 17/00 (2006.01)
G03B 17/56 (2006.01)
F16M 11/04 (2006.01)
F16M 11/20 (2006.01)
F16M 11/24 (2006.01)

(52) U.S. Cl.
CPC ......... *G03B 17/561* (2013.01); *F16M 11/041* (2013.01); *F16M 11/043* (2013.01); *F16M 11/205* (2013.01); *F16M 11/2085* (2013.01); *F16M 11/2092* (2013.01); *F16M 11/24* (2013.01)

(58) Field of Classification Search
USPC .......................................................... 396/428
See application file for complete search history.

(56) References Cited

U.S. PATENT DOCUMENTS

| | | | |
|---|---|---|---|
| 399,345 A * | 3/1889 | Poehlman | F16M 11/08 248/179.1 |
| 2,310,850 A | 2/1943 | Grover | |
| 2,922,609 A | 1/1960 | Collier | |
| 3,587,432 A * | 6/1971 | Koch | G03B 19/10 396/342 |
| 3,731,897 A * | 5/1973 | Price | F16M 13/02 248/230.1 |
| 4,319,825 A | 3/1982 | Newton | |
| 4,341,452 A | 7/1982 | Korling | |
| 4,591,252 A | 5/1986 | Huhle | |
| 4,601,565 A | 7/1986 | Fisher | |
| 4,614,414 A | 9/1986 | Tomidokoro | |
| 4,618,062 A | 10/1986 | Tomidokoro | |
| 4,653,888 A | 3/1987 | Komamura | |
| 4,693,575 A * | 9/1987 | Keller | F16M 13/04 396/420 |
| 5,625,851 A * | 4/1997 | Boxer | F16B 7/1463 396/341 |

(Continued)

OTHER PUBLICATIONS http://www.kenko-pi.co.jp/horseman/e/L45.html, retrieved Jul. 19, 2019. HORSEMAN 4×5" L-Series View Camera.

(Continued)

*Primary Examiner* — Rodney E Fuller
(74) *Attorney, Agent, or Firm* — Robert D. Watson

(57) ABSTRACT

A view camera system that uses an adjustable adapter assembly to attach a relatively-inexpensive film camera body or digital camera sensor to the view camera. The adapter assembly includes a C-shaped support arc and an L-shaped cantilevered camera mount that is removably attached to the arc. The camera mount can be attached to the support arc at three orientations: portrait, 45° tilt, or landscape. A digital camera body can be attached to the camera mount with a thumb screw. The view camera system can have dual, 5-axis movements that allow for tilt, swing, rise and fall, shift, and micro-focus adjustments.

21 Claims, 60 Drawing Sheets

(56) References Cited

U.S. PATENT DOCUMENTS

| | | | |
|---|---|---|---|
| 5,835,807 A | 11/1998 | Brock | |
| D446,323 S | 6/2001 | Johansson | |
| 6,354,544 B1 * | 3/2002 | Muzila | F16M 11/105 |
| | | | 248/177.1 |
| 6,712,530 B2 | 3/2004 | Radl | |
| 6,776,539 B2 | 8/2004 | Mulcahey | |
| 6,778,772 B2 | 8/2004 | Litman | |
| 6,991,384 B1 * | 1/2006 | Davis | F16M 11/041 |
| | | | 248/187.1 |
| 7,181,135 B2 | 2/2007 | Litman | |
| 7,390,130 B2 | 6/2008 | Soulvie | |
| 7,549,807 B2 | 6/2009 | Nazarian | |
| 8,109,681 B2 * | 2/2012 | McAnulty | F16M 11/041 |
| | | | 396/428 |
| 8,346,070 B2 | 1/2013 | Beasley | |
| D701,260 S | 3/2014 | Burton | |
| D701,261 S | 3/2014 | Burton | |
| 8,678,678 B2 | 3/2014 | Imura | |
| 8,774,618 B1 * | 7/2014 | Muzila | F16M 11/10 |
| | | | 396/198 |
| 9,823,552 B2 | 11/2017 | Kungl | |
| 10,281,803 B2 | 5/2019 | Johnson | |
| 2011/0176035 A1 | 7/2011 | Poulsen | |
| 2013/0236235 A1 * | 9/2013 | Johnson, Sr. | F16C 11/04 |
| | | | 403/53 |

OTHER PUBLICATIONS http://www.kenko-pi.co.jp/horseman/e/digital/LD.html, retrieved Jul. 19, 2019. HORSEMAN 4×5" LD-Series View Camera. Camera mount for Canon or Nikon DSLR.

* cited by examiner

SEC A-A

VIEW CAMERA ADAPTER

CROSS-REFERENCE TO RELATED APPLICATIONS

None

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention pertains to the field of photography, and to methods and structures for adjustably mounting different digital camera bodies to view camera systems in different orientations using a multi-position, adjustable camera adapter.

Description of Related Art

Two US patents describe related patent art. These are: "Adjustable Camera Mounting Device", U.S. Pat. No. 6,354,544 by Michael Muzila; and "Camera Support", U.S. Pat. No. 4,693,575 by James H. Keller. The '544 patent by Muzila discloses an adjustable camera mounting device or bracket, including a base member having a curved recess portion which receives a camera mounting member having a complementary curved configuration. A spring-biased pressure member and oppositely positioned guide members are mounted within the curved recess portion of the base member and are received within a complementary groove in the camera mounting member, permitting the camera mounting member to be continuously rotatably movable within the base member. The '575 patent by Keller discloses a camera support of holder for a hand-held camera that has an arcuate member that is held in a user's palm. The "palm ring" is attached to the standard threaded recess in the camera that is normally used for attaching a tripod to the camera.

Neither patent discloses or teaches structures for rigidly (but, adjustably) mounting a camera body (which can be digital or film) to a large-format view camera system, such as the "Horseman-L 4×5" camera made by the Komamura company in Japan. A traditional view camera system is a large format camera in which the lens forms an inverted image on a ground glass screen directly at the plane of the film. The image viewed is exactly the same as the image on the film, which replaces the viewing screen during exposure. This type of camera was first developed in the era of the daguerreotype (1840s-1850s) and is still in use today, though with many refinements. It comprises a flexible bellows that forms a light-tight seal between two adjustable standards, one of which holds a lens, and the other a viewfinder or a photographic film holder. The bellows is a flexible, accordion-pleated box. It encloses the space between the lens and film, and flexes to accommodate the movements of the standards.

In a traditional view camera system, the front standard comprises a board at the front of the camera that holds the lens and, usually, a shutter or lens cap. At the other end of the bellows, the rear standard comprises a frame that holds a ground glass plate, which is used for focusing and composing the image before exposure, which is replaced by a holder containing the light-sensitive film, plate, or image sensor for exposure. The front and rear standards can move in various ways relative to each other, unlike most other camera types. These movements provide control over focus, depth of field, and perspective. The camera is usually used on a tripod or other support. A monorail camera is the most common type of studio view camera, with front and rear standards mounted to a single guide rail that is fixed to a camera support (e.g., tripod). This design gives the greatest range of movements and flexibility, with both front and rear standards able to tilt, shift, rise, fall, and swing in similar proportion.

Photographers use view camera systems to control focus and convergence of parallel lines. Image control is done by moving the front and/or rear standards. Rise-and-fall are the movements of either the front or rear standard vertically along a line in a plane parallel to the film (or sensor) plane. Moving the front standard left or right from its normal position is called lens shift, or simply shift. This movement is similar to rise-and-fall, but moves the image horizontally rather than vertically. The axis of the lens is normally perpendicular to the film (or sensor). Changing the angle between axis and film by tilting the lens standard backwards or forwards is called lens tilt, or just tilt. Tilt is especially useful in landscape photography. By using the Scheimpflug principle, the "plane of sharp focus" can be changed so that any plane can be brought into sharp focus. Altering the angle of the lens standard in relation to the film plane by swiveling it from side to side is called swing. Swing is like tilt, but it changes the angle of the focal plane in the horizontal axis instead of the vertical axis. For example, swing can help achieve sharp focus along the entire length of a picket fence that is not parallel to the film plane. Specialized digital camera backs exist for large-format view cameras, but these are very expensive due to the large sensor size. What is needed, then, is a method and structure to attach relatively-inexpensive digital camera bodies (e.g., 35 mm DSLR cameras) to traditional large-format view camera systems in a variety of orientations. Against this background, the present invention was developed.

SUMMARY OF THE INVENTION

The present invention relates to a variety of view camera systems, including some antique wooden cameras, which use an adjustable adapter assembly to attach a relatively-inexpensive film camera body or digital camera sensor to the view camera. The adapter assembly includes a C-shaped support arc, and an L-shaped, cantilevered camera mount that is removably attached to the arc. The camera mount can be attached to the support arc at three orientations: portrait, 45° tilt, or landscape. A digital camera body can be attached to the camera mount with a thumb screw. The view camera system can have dual, 5-axis movements that allow for tilt, swing, rise and fall, shift, and micro-focus adjustments.

BRIEF DESCRIPTION OF THE SEVERAL VIEWS OF THE DRAWING(S)

Figure 5:
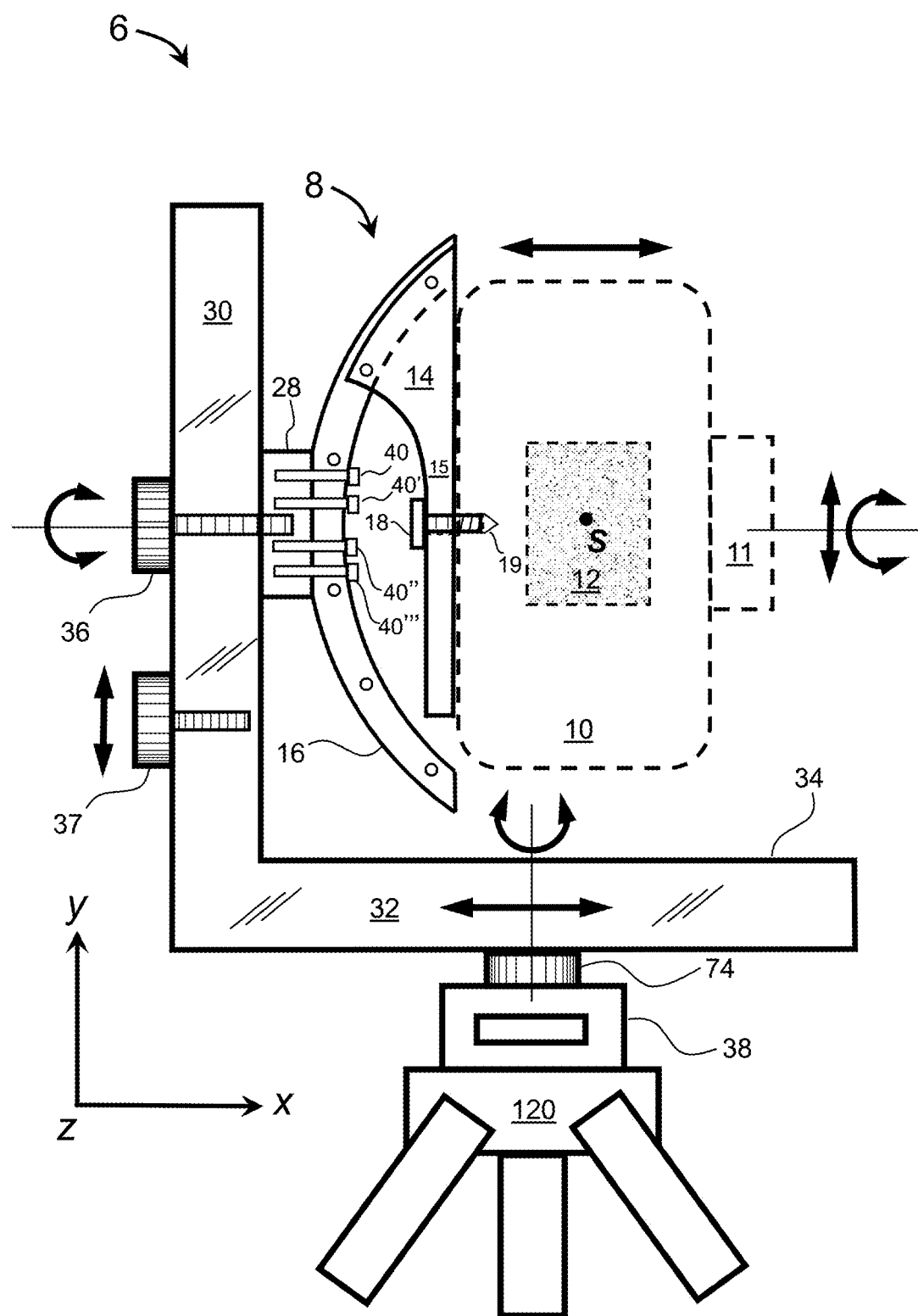

FIG. 5 shows an elevation rear view of a first embodiment of a camera system 6 comprising a multi-position camera adapter 8 and removable camera body 10 oriented parallel to the Y-axis (portrait mode), that is rotatably and slidably attached to an adjustable rear L-frame, according to the present invention.

Figure 6:
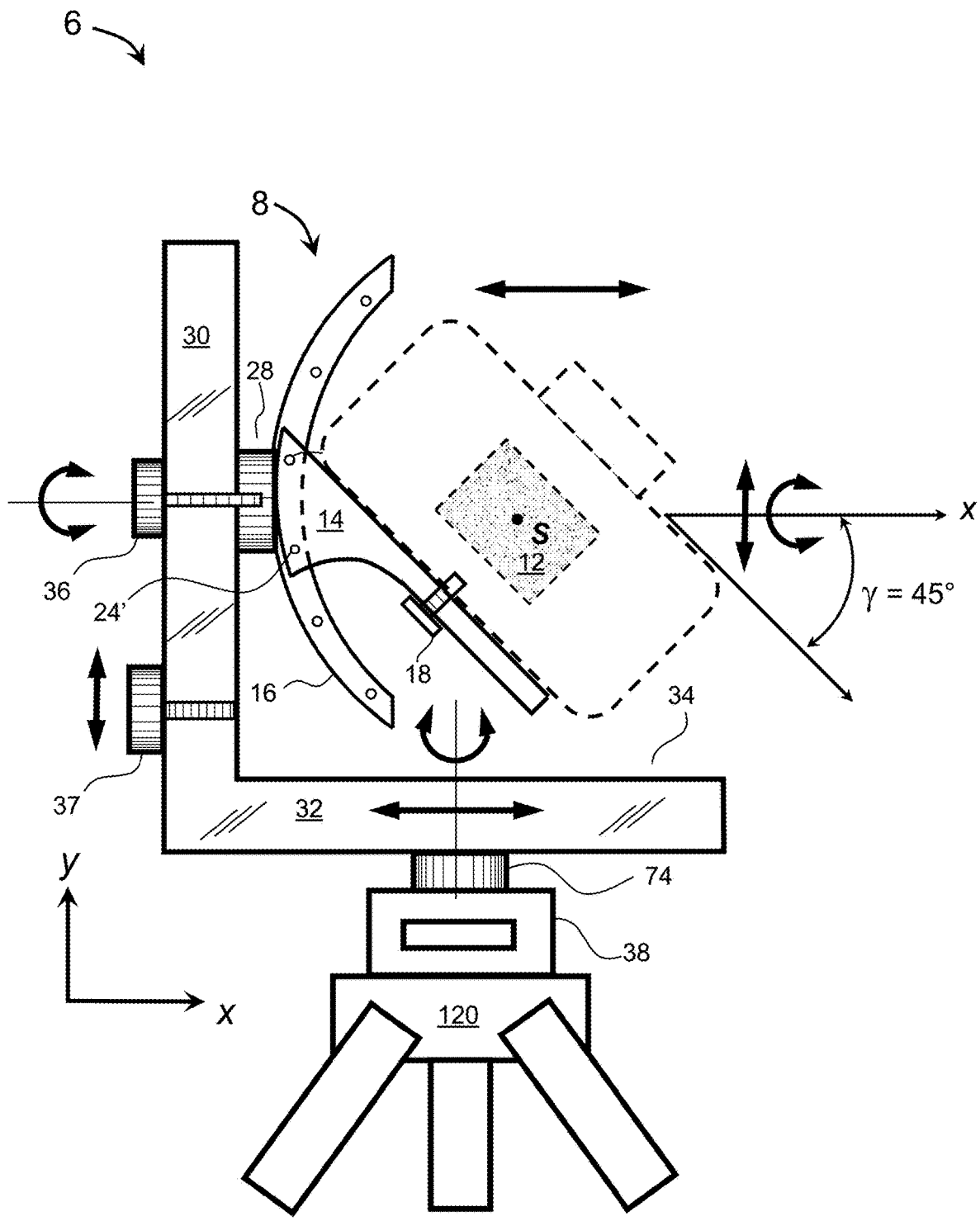

FIG. 6 shows an elevation rear view of a first embodiment of a camera system 6 comprising a multi-position camera adapter 8 and removable camera body 10 oriented at 45° to the horizontal X-axis, that is rotatably and slidably attached to an upright standard of an adjustable rear L-frame, according to the present invention.

Figure 7:
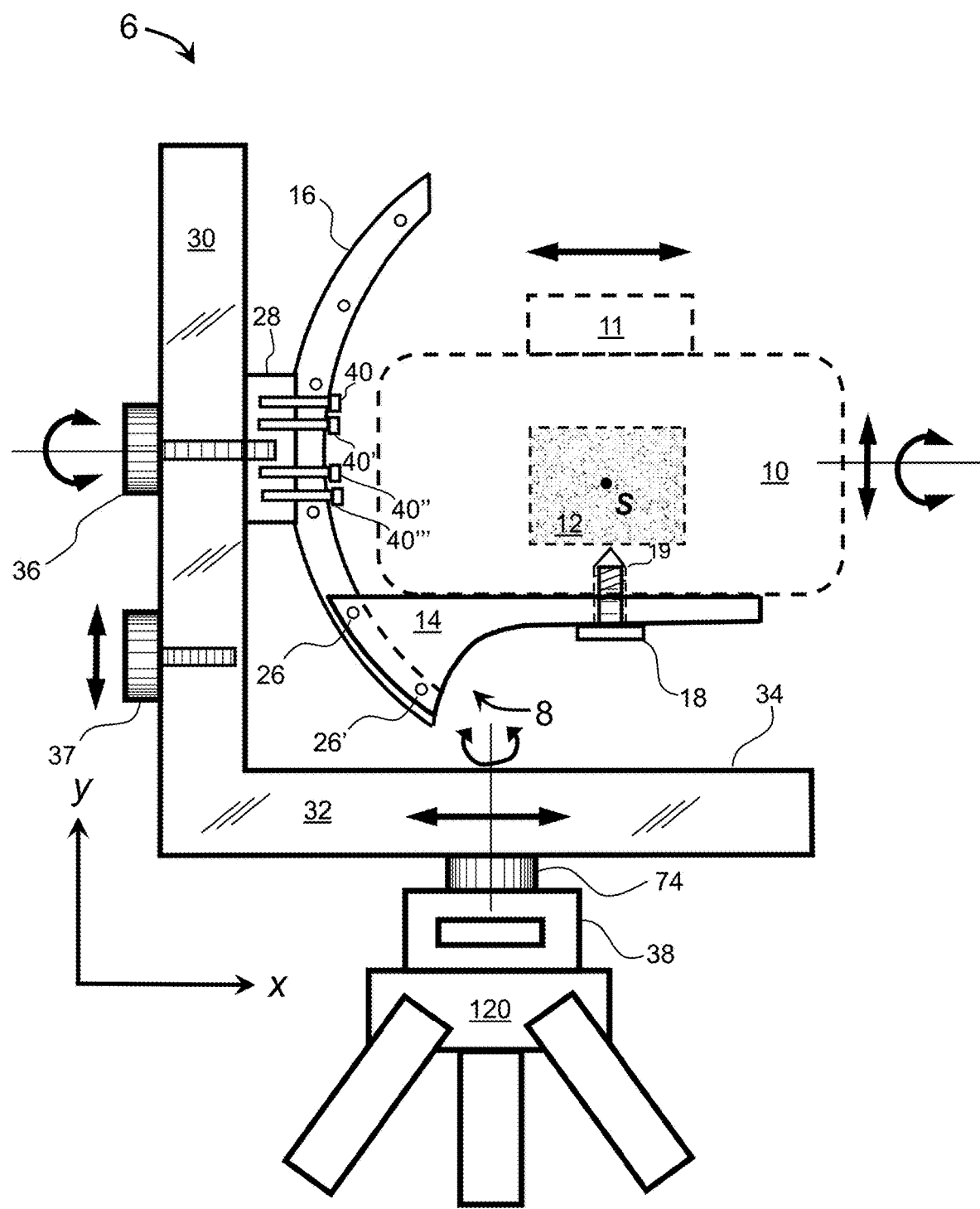

FIG. 7 shows an elevation rear view of a first embodiment of a camera system 6 comprising a multi-position camera adapter 8 and removable camera body 10 oriented parallel to the horizontal X-axis (landscape mode), that is rotatably and slidably attached to an upright standard 30 of an adjustable rear L-frame 34, according to the present invention.

Figure 8:
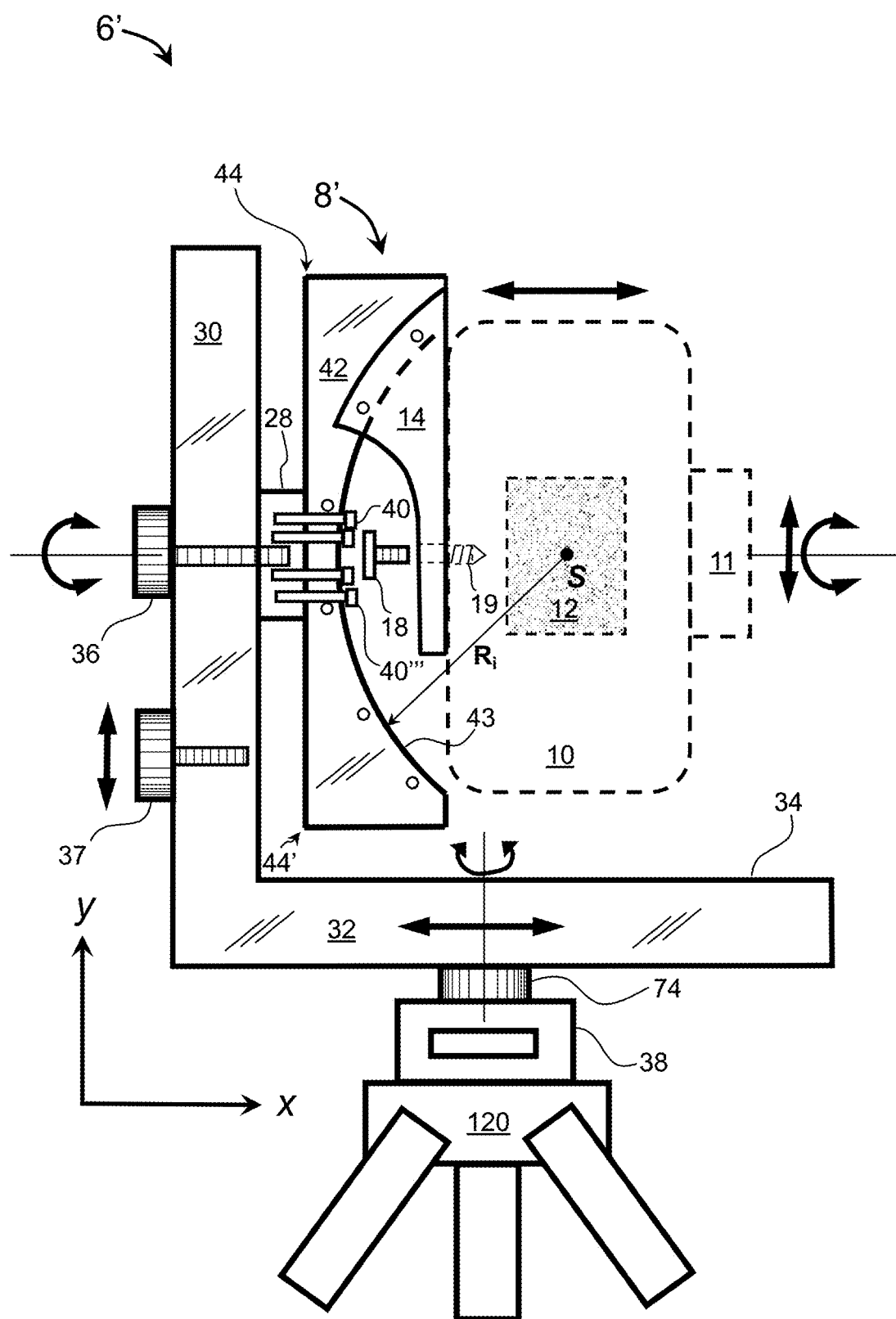

FIG. 8 shows an elevation rear view of a second embodiment of a camera system 6' comprising a second embodiment of a multi-position camera adapter 8' and removable camera body 10 oriented parallel to the Y-axis (portrait mode), that is rotatably and slidably attached to an upright standard 30 of an adjustable rear L-frame 34, according to the present invention.

Figure 9:
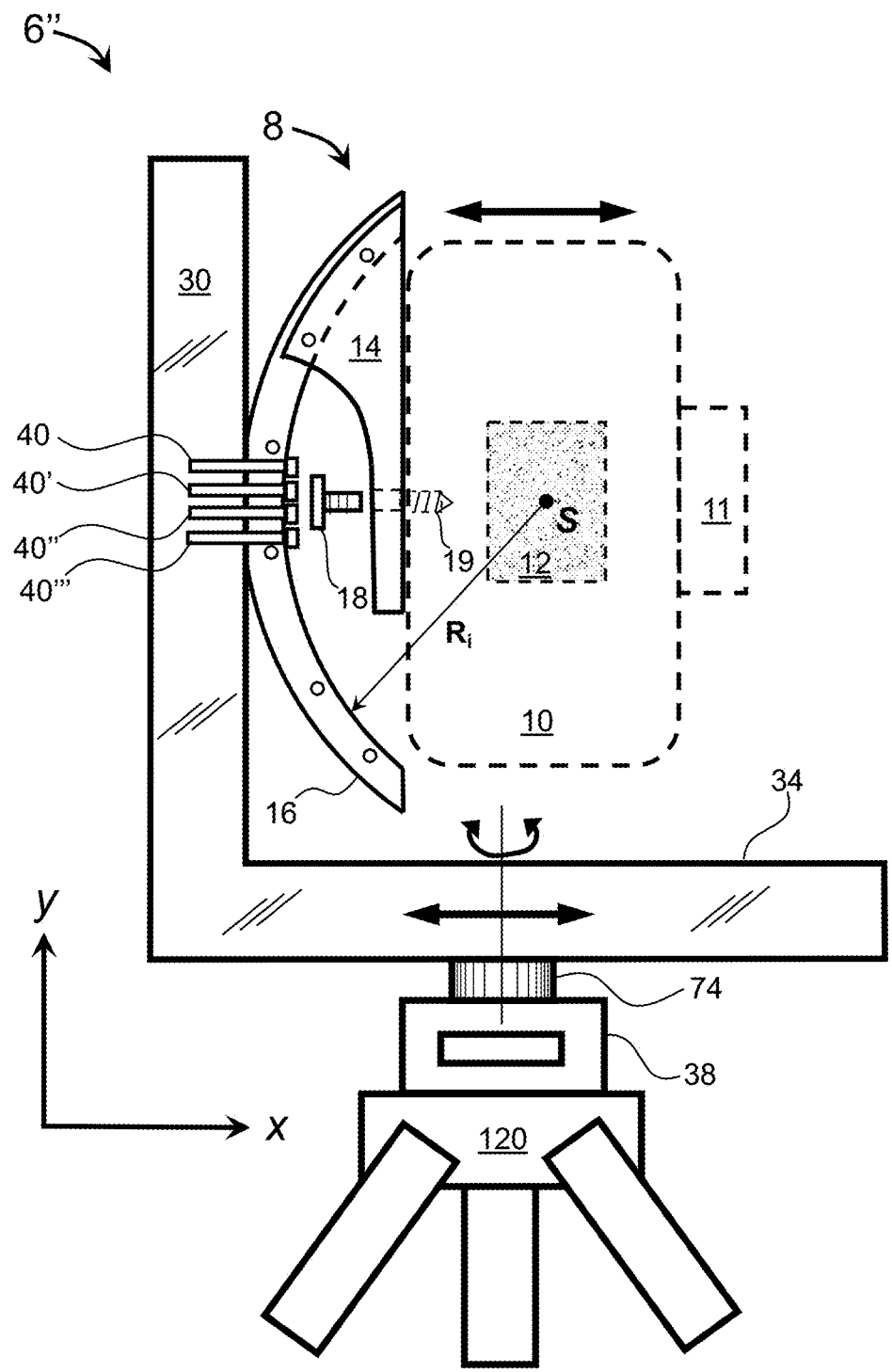

FIG. 9 shows an elevation rear view of a third embodiment of a camera system 6" comprising a multi-position camera adapter 8 and removable camera body 10 oriented parallel to the Y-axis (portrait mode), that is attached directly to an upright standard 30 of an adjustable rear L-frame 34, according to the present invention.

Figure 10:
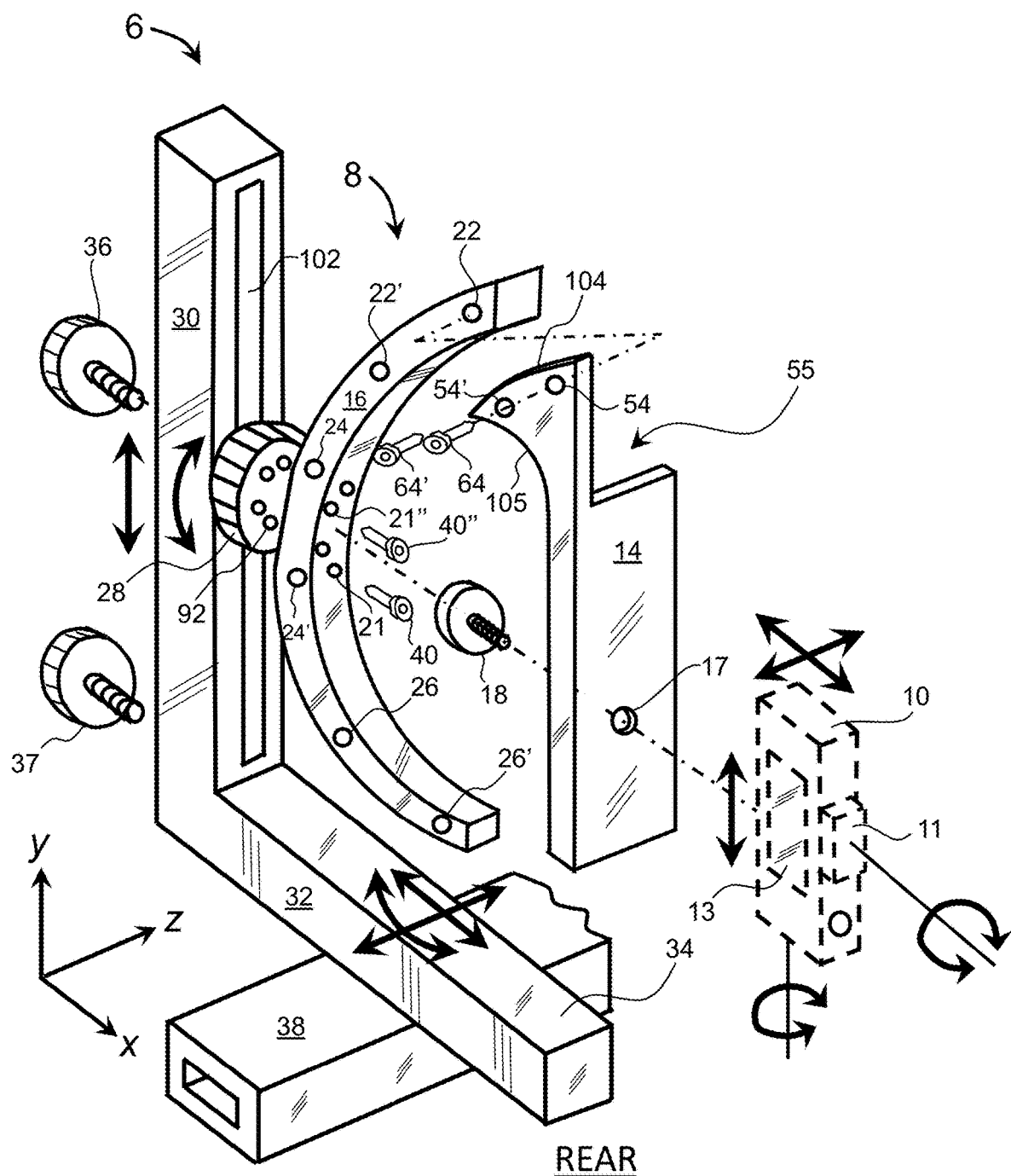

FIG. 10 shows an isometric exploded perspective view of a camera system 6 comprising a multi-position camera adapter 8 and removable camera body 10 oriented parallel to the Y-axis (portrait mode), that is rotatably and slidably attached to an upright standard 30 of an adjustable rear L-frame 34, according to the present invention.

Figure 11:
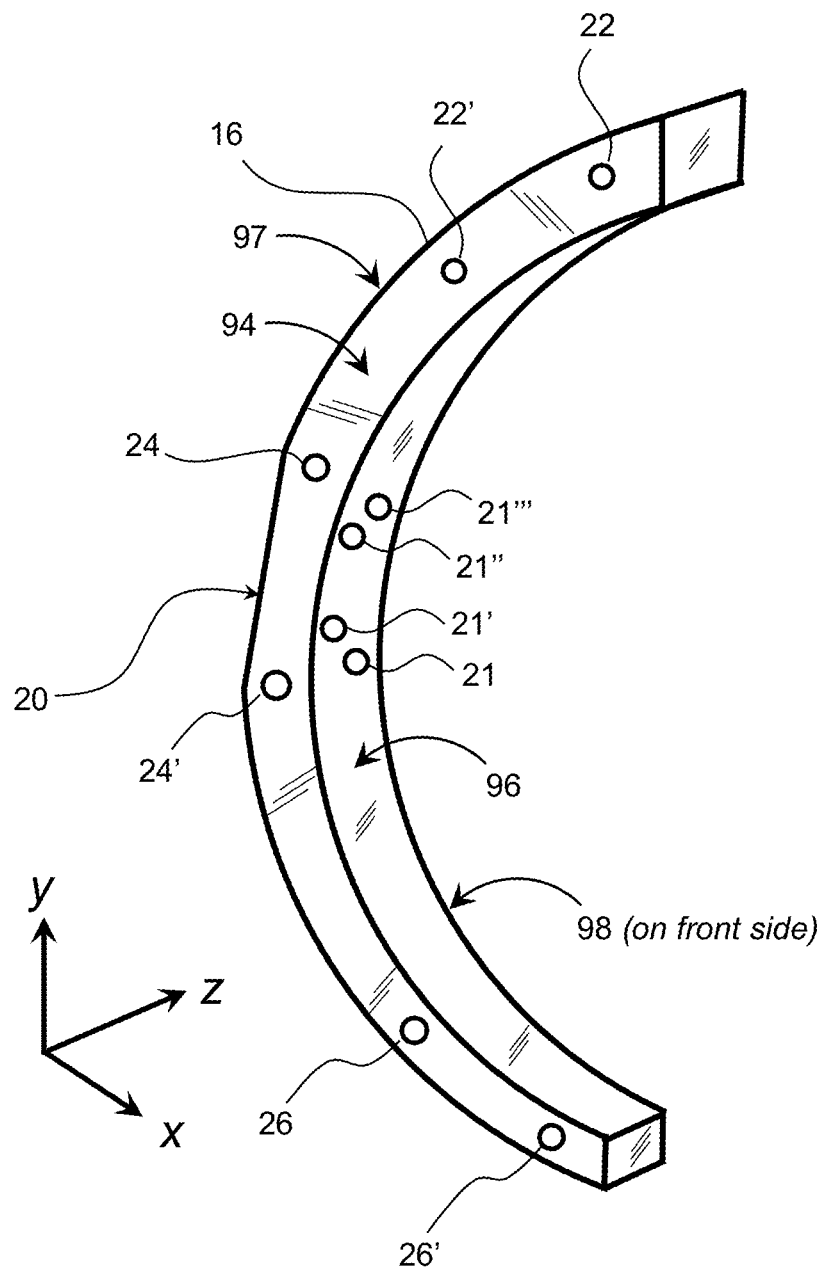

FIG. 11 shows an isometric perspective rear view of the first embodiment of a C-shaped support arc 16, according to the present invention.

Figure 12A:
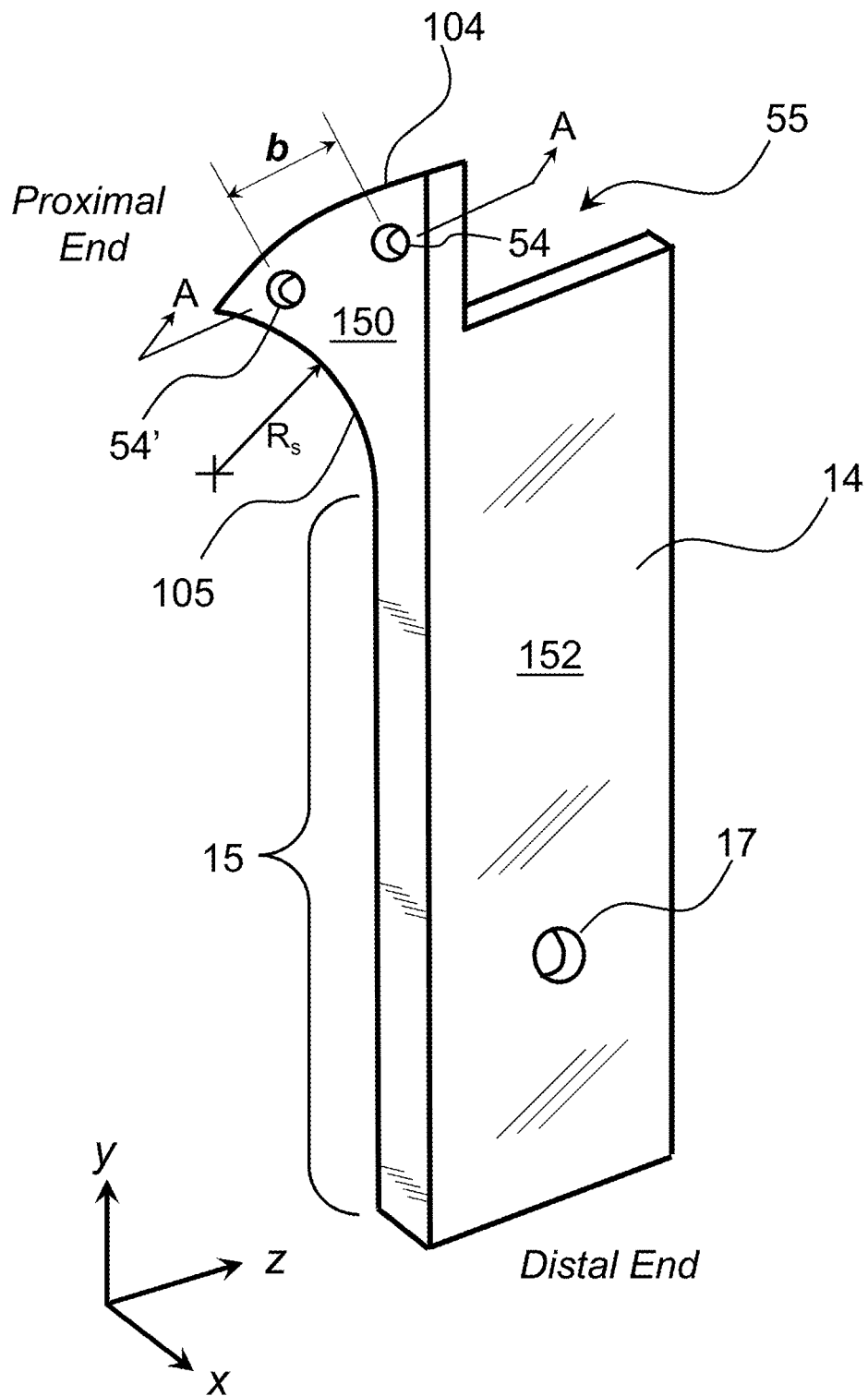

FIG. 12A shows an isometric perspective rear view of the first embodiment of a cantilevered camera mount 14, according to the present invention.

Figure 12B:
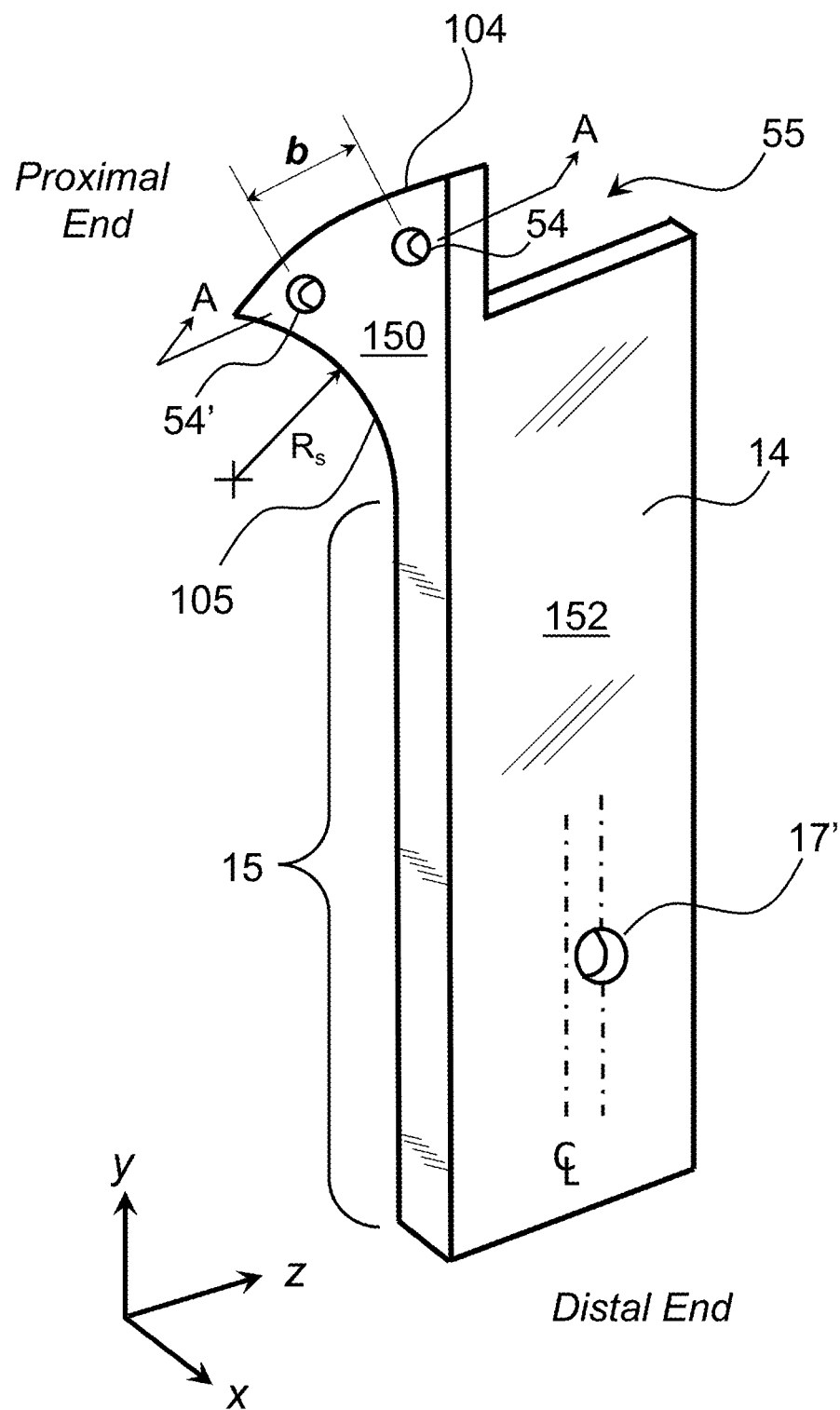

FIG. 12B shows an isometric perspective rear view of another embodiment of a cantilevered camera mount 14, according to the present invention.

Figure 13A:
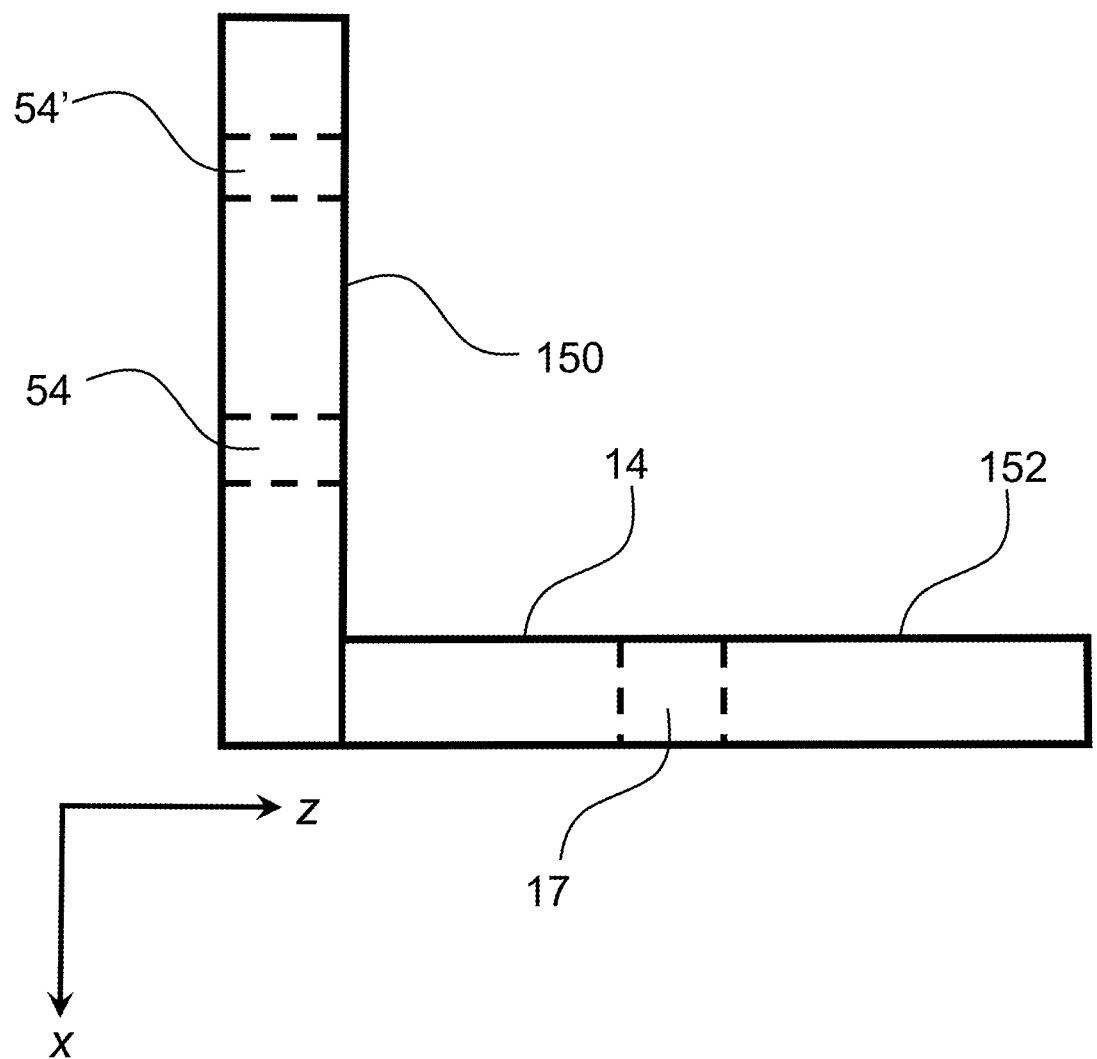

FIG. 13A shows a plan view of the first embodiment of a cantilevered camera mount 14, according to the present invention.

Figure 13B:
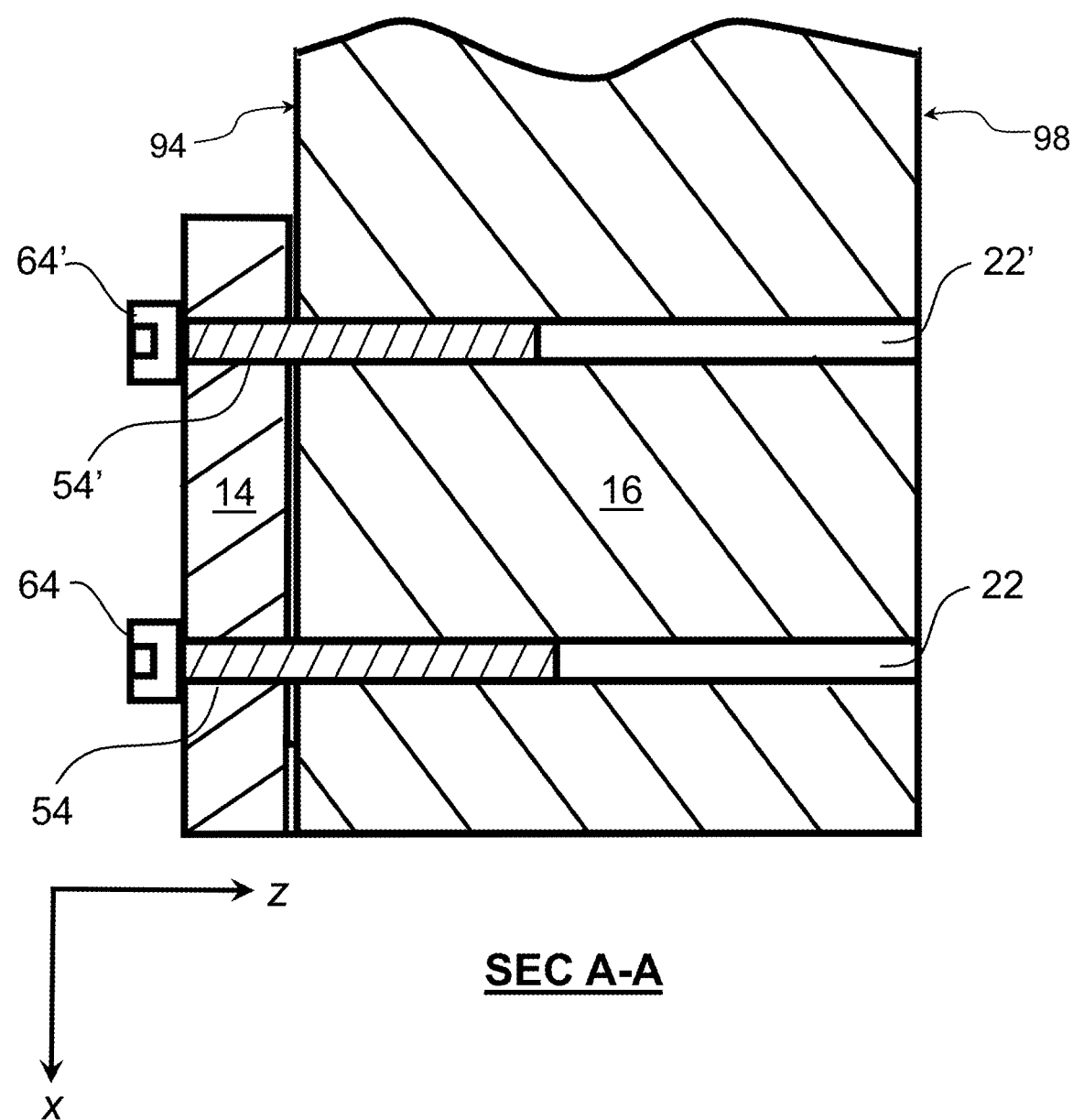

FIG. 13B shows a plan cross-section view of the top end of a cantilevered camera mount 14 attached to a semi-circular support arc 16, according to the present invention.

Figure 13C:
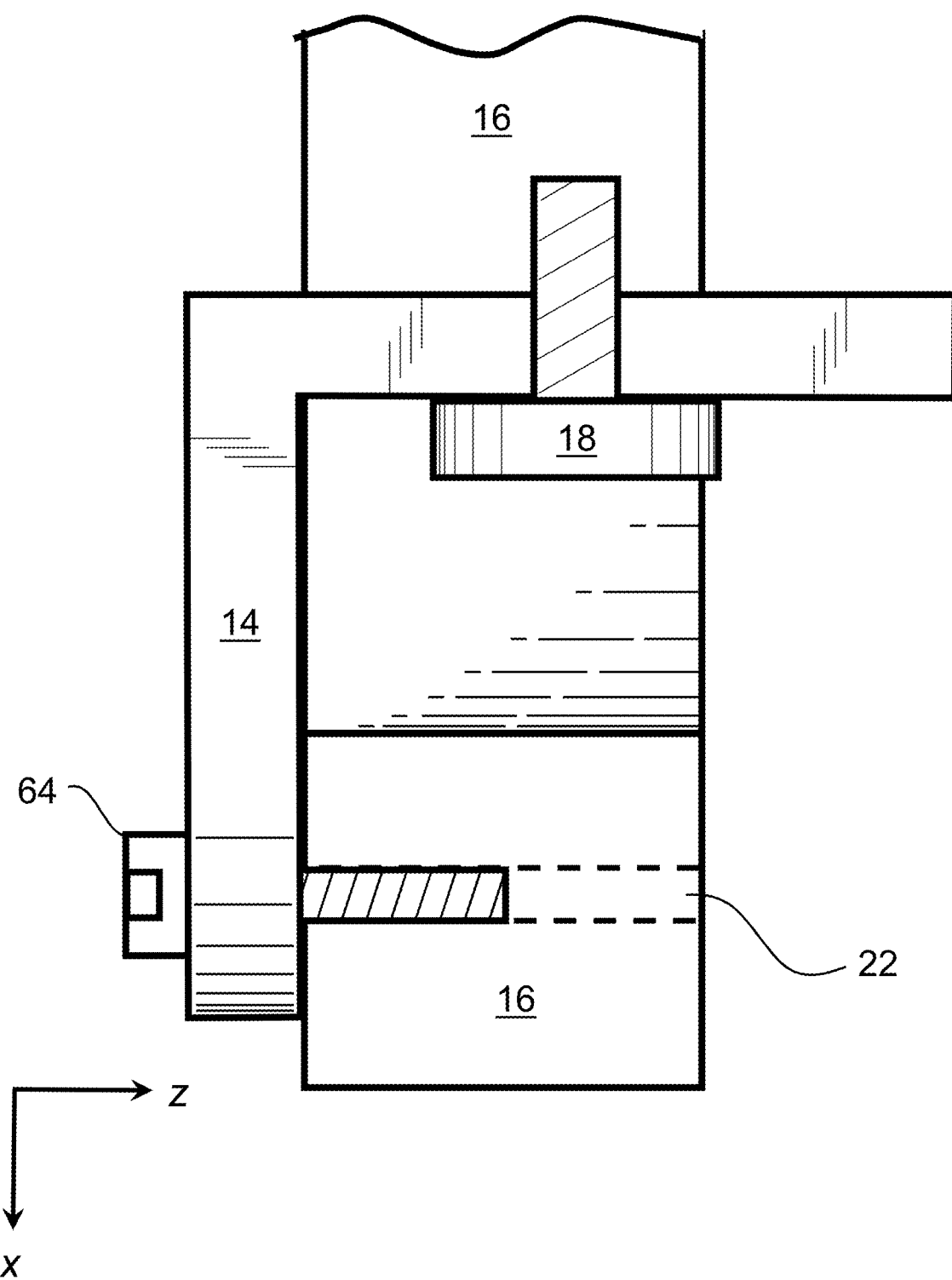

FIG. 13C shows a plan view of the top end of a cantilevered camera mount 14 attached to a semi-circular support arc 16, according to the present invention.

Figure 14:
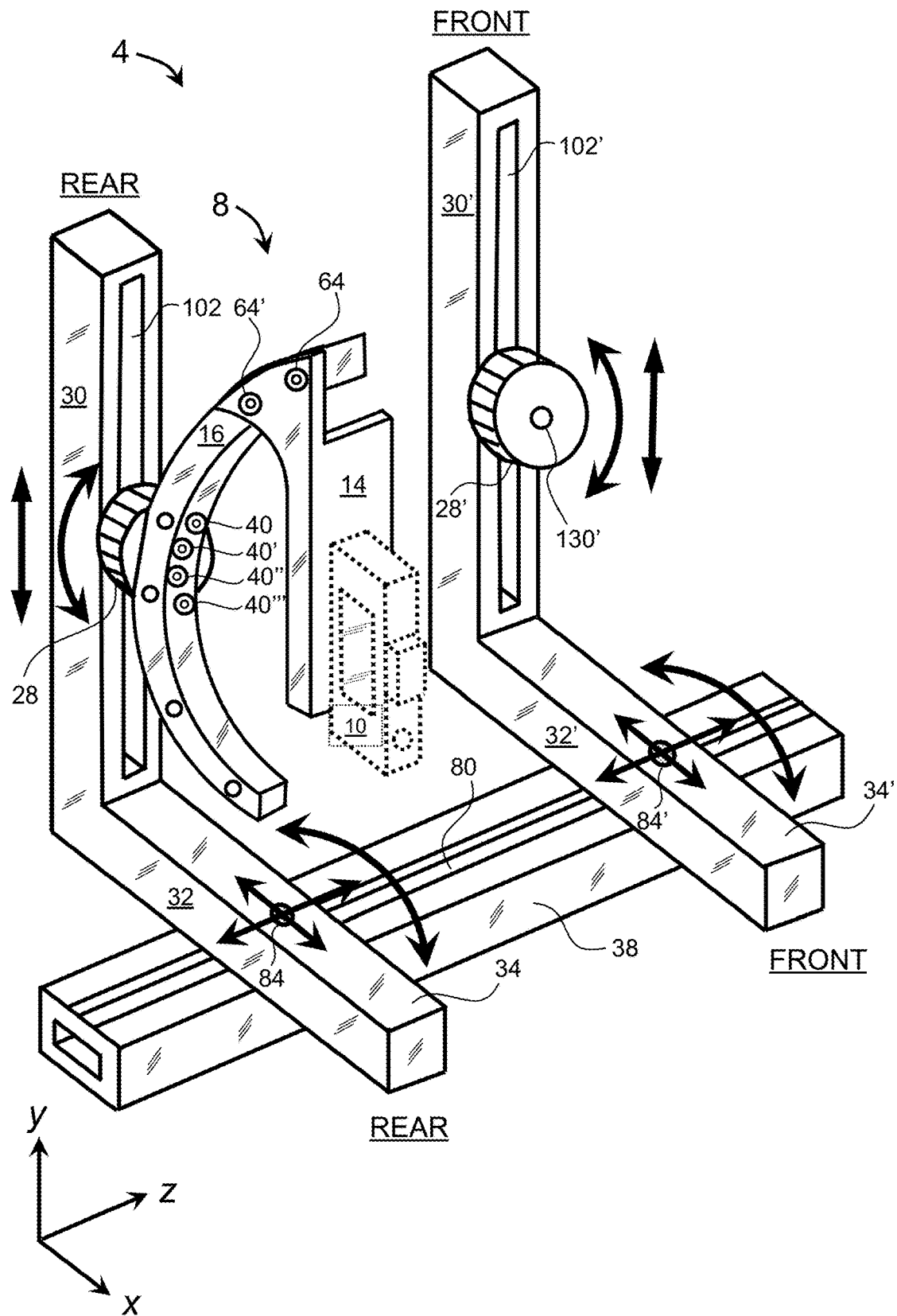

FIG. 14 shows an isometric rear perspective view of a view camera system 4 comprising a multi-position camera adapter 8 and attached camera body 10 oriented parallel to the Y-axis (portrait mode), that is rotatably and slidably attached to an upright arm (standard) 30 of an adjustable rear L-frame 34, including an adjustable front L-frame 34', according to the present invention.

Figure 15:
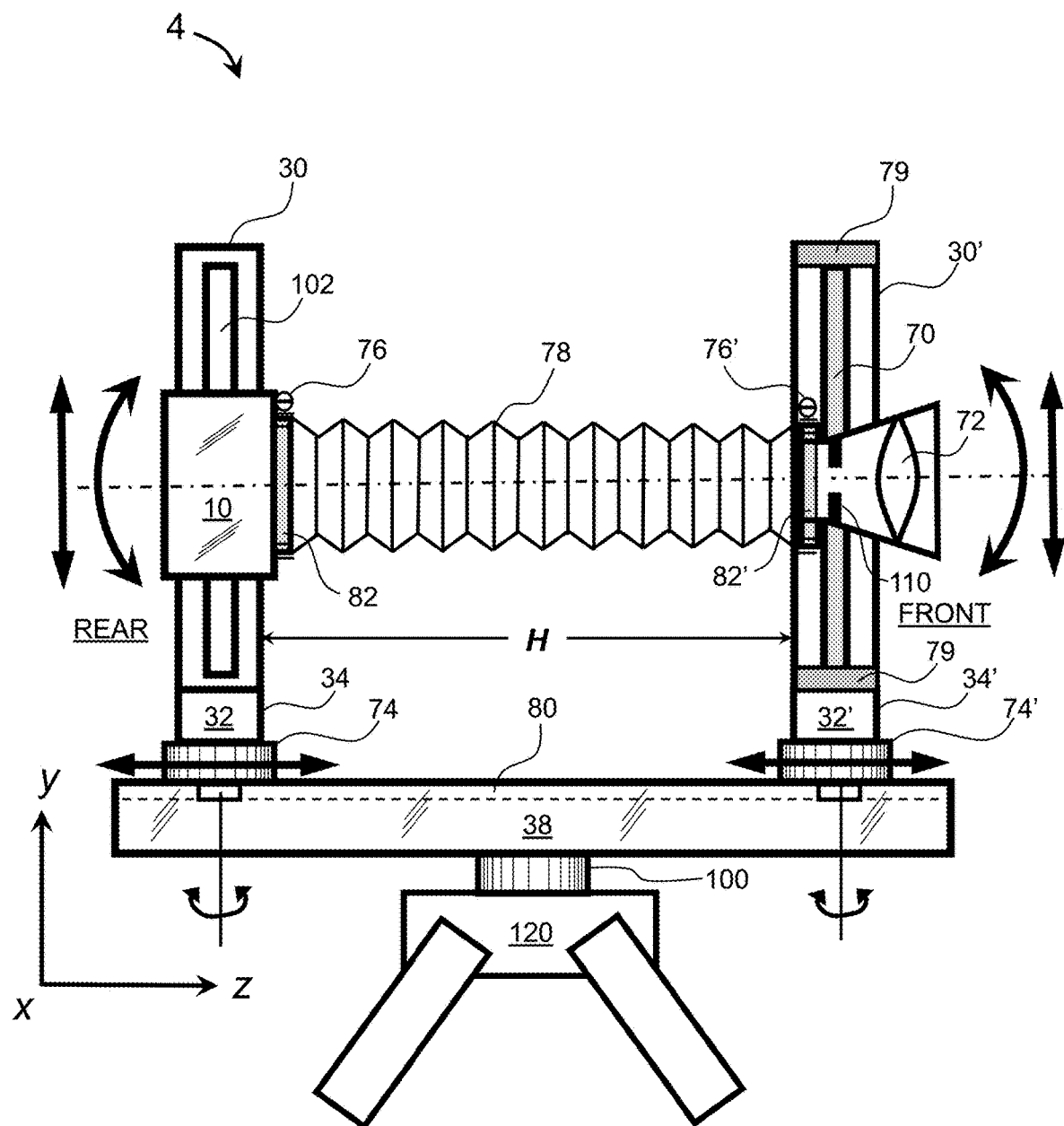

FIG. 15 shows a side elevation view of a view camera system 4 comprising a multi-position camera adapter and removable camera body 10 oriented parallel to the Y-axis (portrait mode), that is rotatably and slidably attached to an upright arm (standard) 30 of an adjustable rear L-frame 34, with an adjustable front L-frame 34' comprising a tiltable and positionable lens board 70 and front lens 72, wherein both front and rear L-frames 34' and 34, respectively, are adjustably attached to a horizontal guide rail 38, according to the present invention.

Figure 16:
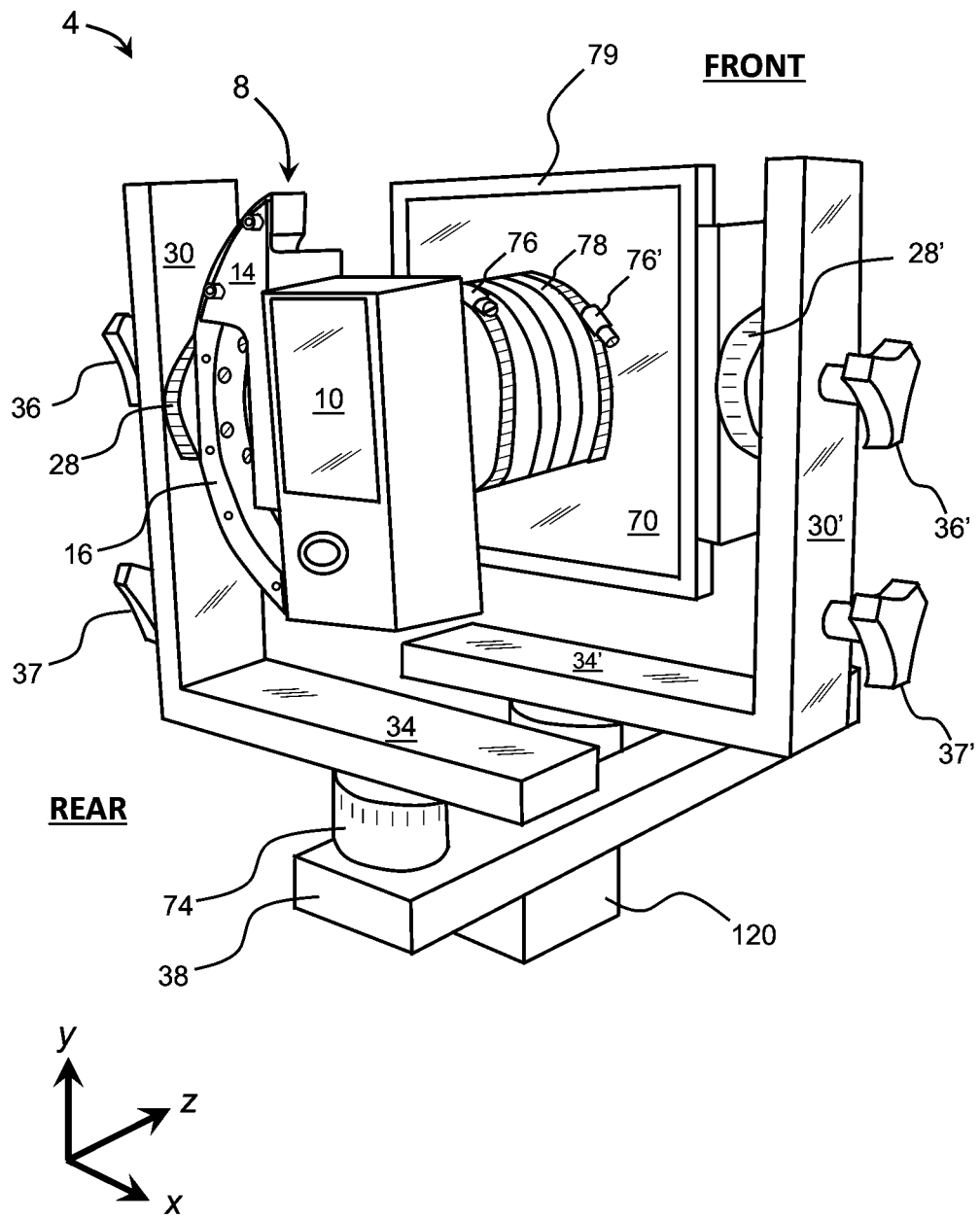

FIG. 16 is a photograph showing an isometric perspective view of a prototype view camera system 4 comprising a multi-position camera adapter 8 and DSLR camera body 10 oriented parallel to the Y-axis (portrait mode), that is rotatably and slidably attached to an upright arm (standard) 30 of an adjustable rear L-frame 34, with an adjustable front L-frame 34' comprising a tiltable and positionable lens board 70 and front lens 72, wherein both front and rear L-frames 34' and 34, respectively, are adjustably attached to a horizontal guide rail 38, according to the present invention.

Figure 17:
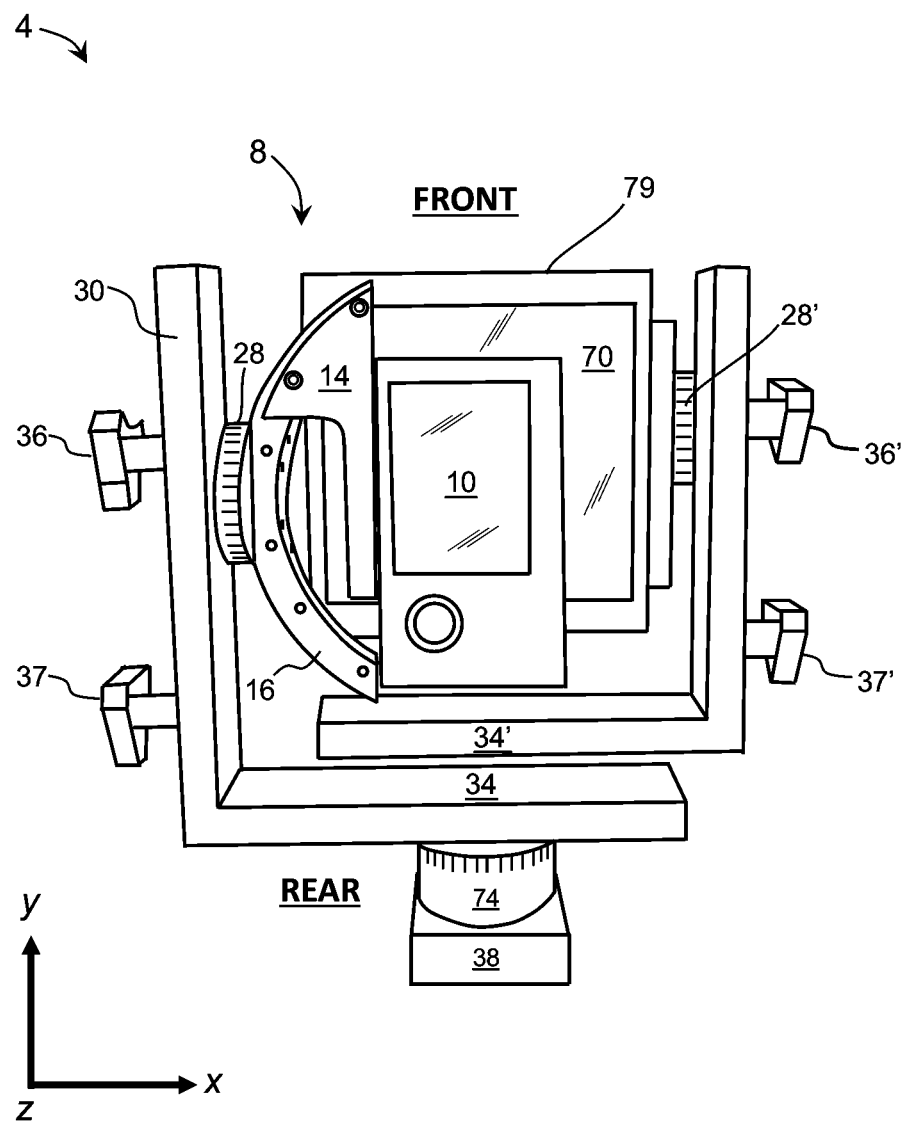

FIG. 17 is a photograph showing a rear elevation perspective view of a prototype view camera system 4 comprising a multi-position, adjustable camera adapter 8 and Sony-brand DSLR camera body 10 (Sony α7II) oriented parallel to the y-axis (portrait mode), that is rotatably and slidably attached to an upright arm (standard) 30 of an adjustable rear L-frame 34, with an adjustable front L-frame 34' comprising a tiltable and positionable lens board 70 and front lens 72 and shutter 110 (or lens cap, not shown), wherein both front and rear L-frames 34' and 34, respectively, are adjustably attached to a horizontal guide rail 38, according to the present invention.

Figure 18:
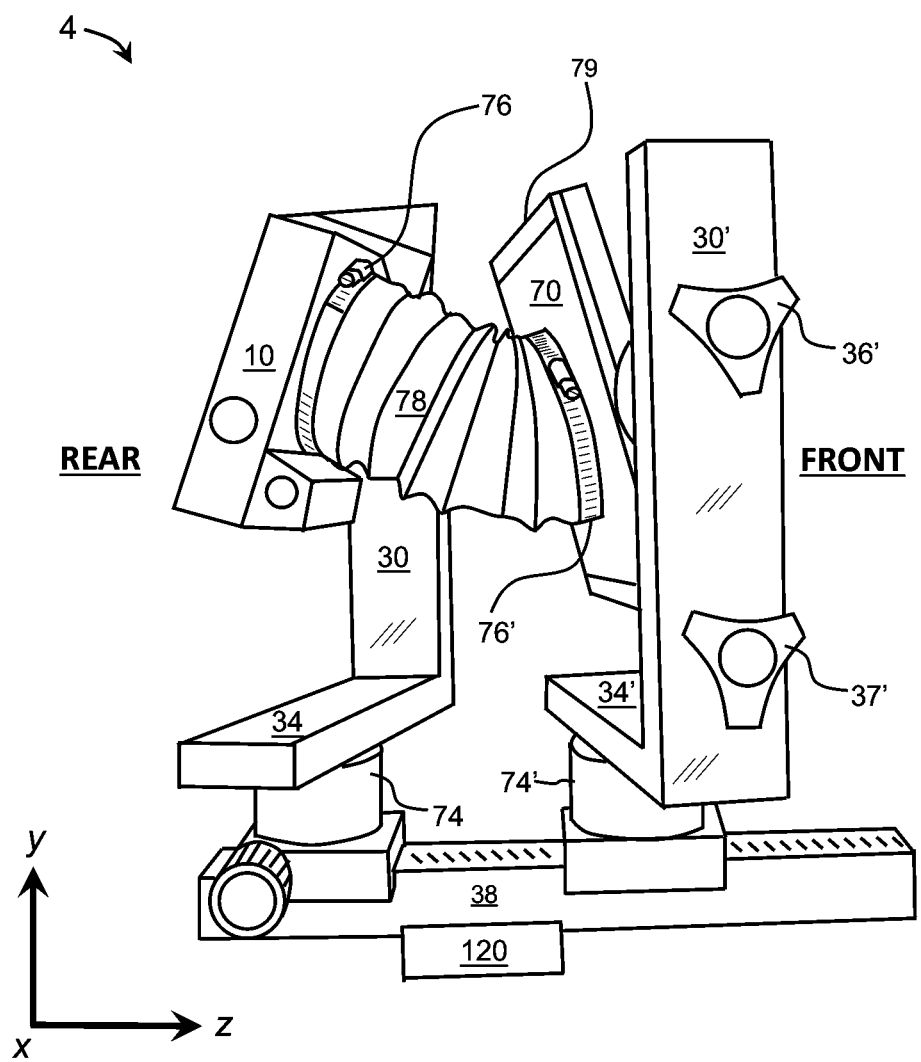

FIG. 18 is a photograph showing a side elevation perspective view of a prototype view camera system 4 comprising a multi-position, adjustable camera adapter 8 and Sony-brand DSLR camera body 10 oriented parallel to the y-axis (portrait mode), that is rotatably and slidably attached to an upright arm (standard) 30 of an adjustable rear L-frame 34, with an adjustable front L-frame 34' comprising a tiltable and positionable lens board 70 and front lens 72 and shutter 110, wherein both front and rear L-frames 34' and 34, respectively, are adjustably attached to a horizontal guide rail 38, according to the present invention.

Figure 19:
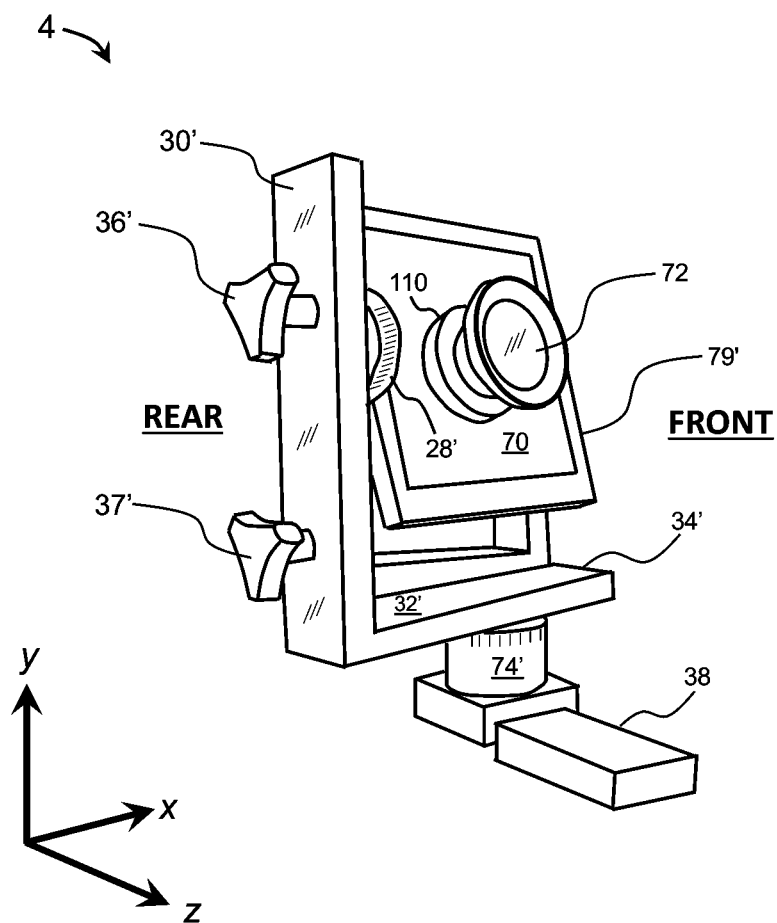

FIG. 19 is a photograph showing a front elevation perspective view of a prototype view camera system 4 comprising an adjustable front L-frame 34' comprising a tiltable and positionable lens board 70 and front lens 72 and shutter 110, wherein both front L-frames 34' is adjustably attached to a horizontal guide rail 38, according to the present invention.

Figure 20:
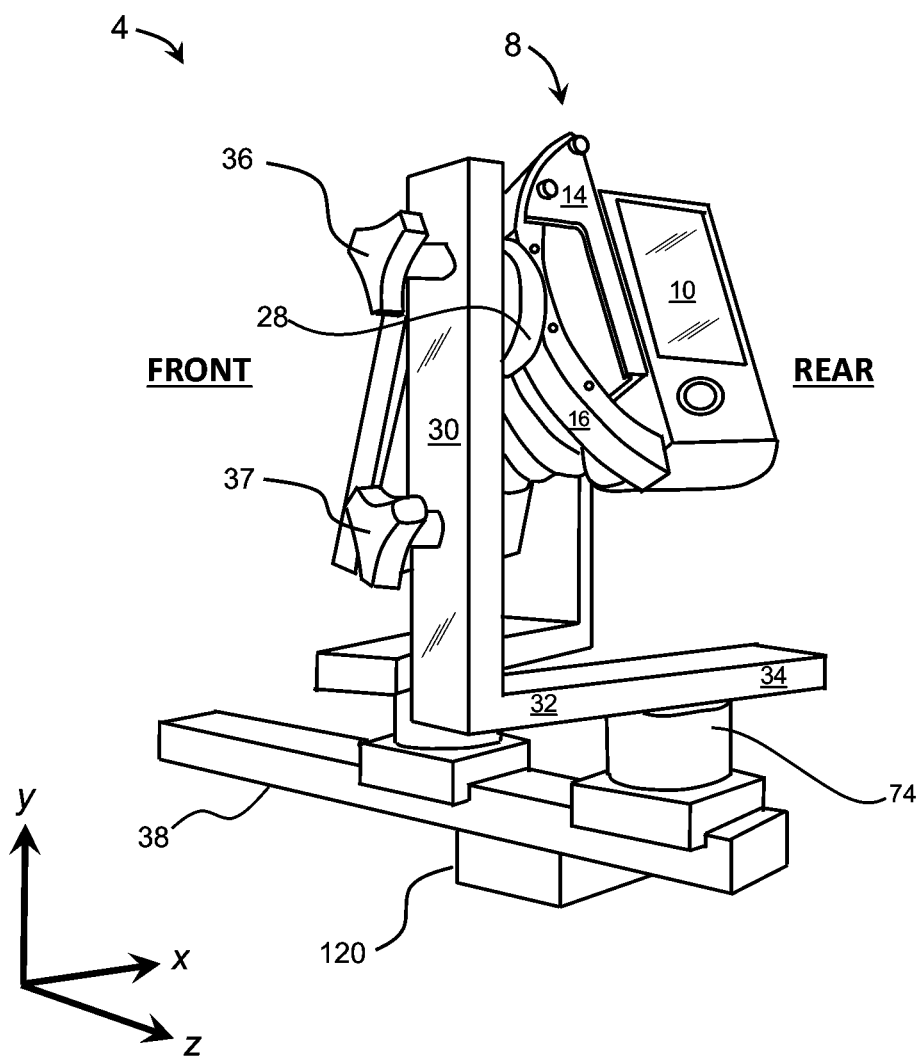

FIG. 20 is a photograph showing a rear isometric perspective view of a prototype view camera system 4 comprising an adjustable rear L-frame 34 and multi-position camera adapter 8, according to the present invention.

Figure 21:
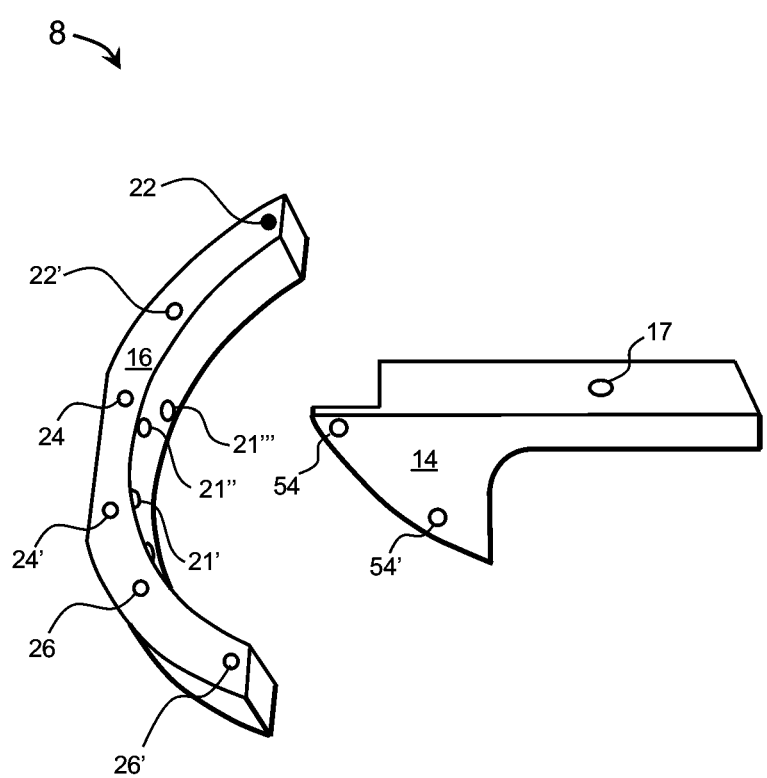

FIG. 21 is a photograph showing an exploded, isometric perspective view of a prototype adjustable camera adapter 8 comprising a multi-position support arc 16 and a positionable camera mount 14, according to the present invention.

Figure 22:
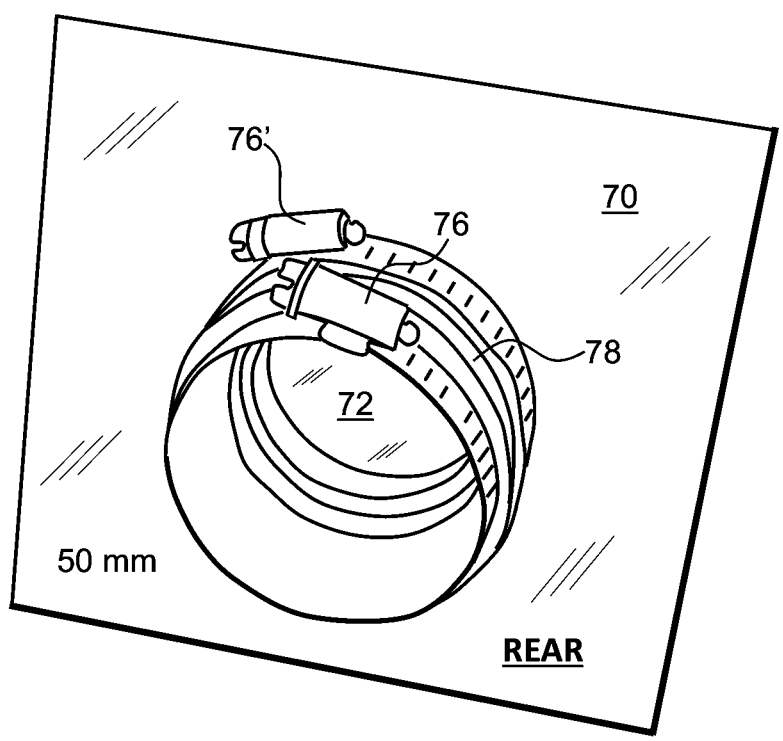

FIG. 22 is a photograph showing a rear isometric perspective view of a 50 mm lens 72 mounted in a lens board 70, according to the present invention.

Figure 23:
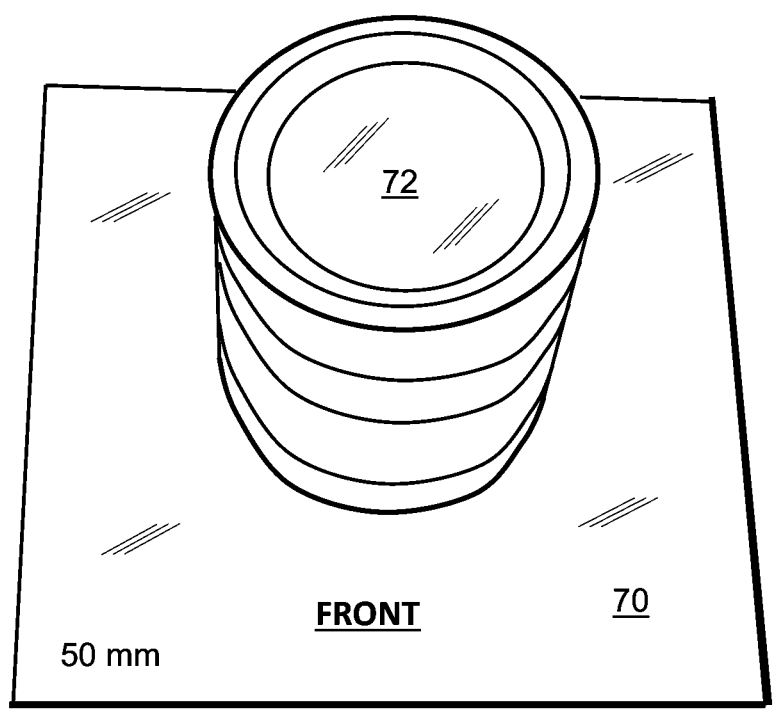

FIG. 23 is a photograph showing a front isometric perspective view of a 50 mm lens 72 mounted in a lens board 70, according to the present invention.

Figure 24:
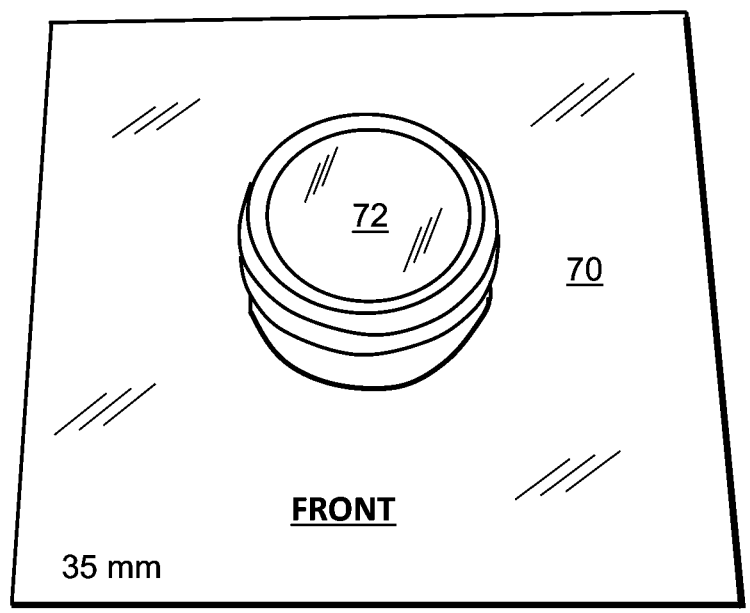

FIG. 24 is a photograph showing a front isometric perspective view of a 35 mm lens 72 mounted in a lens board 70, according to the present invention.

Figure 25:
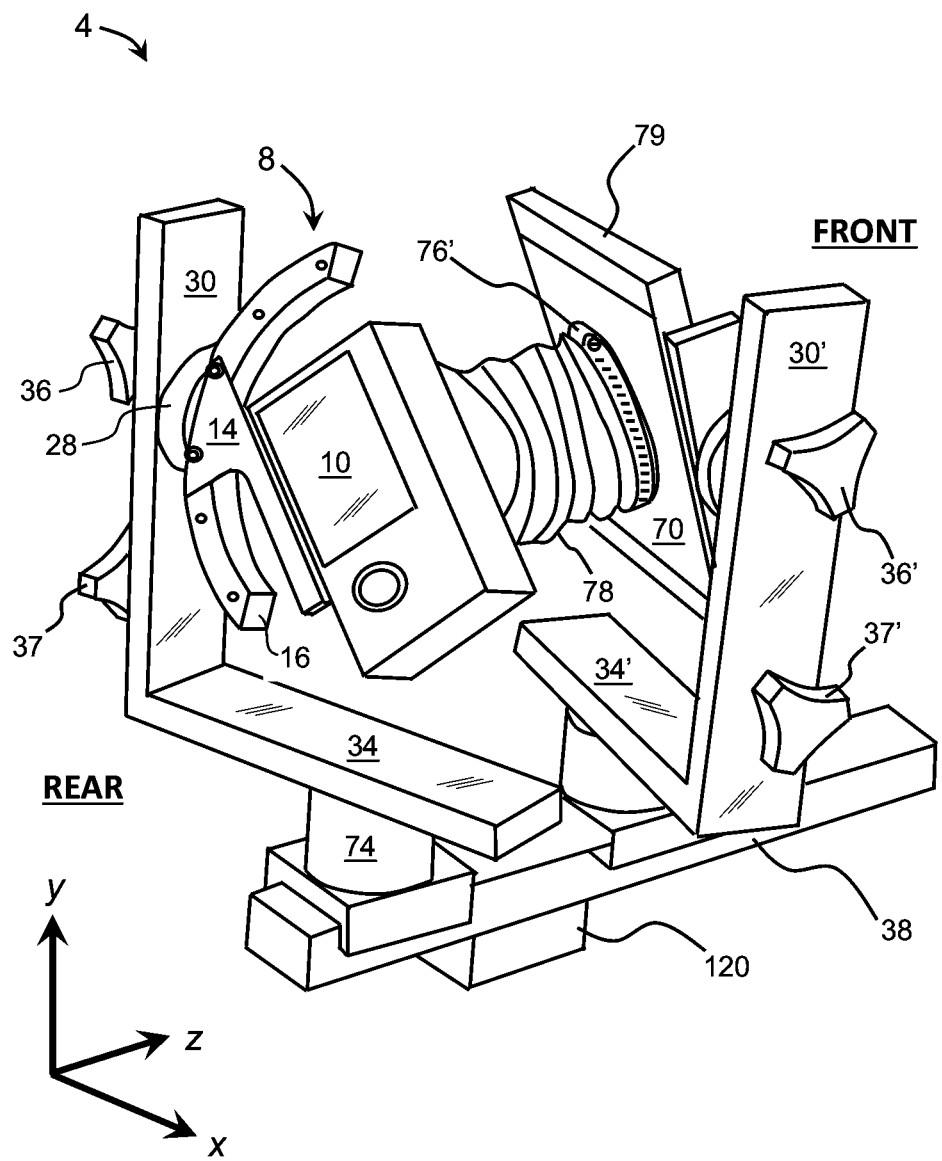

FIG. 25 is a photograph showing an isometric rear perspective view of a prototype view camera system 4 comprising a multi-position camera adapter 8 and DSLR camera body 10 oriented 45° to the Y-axis (45° tilt mode), that is rotatably and slidably attached to an upright arm (standard) 30 of an adjustable rear L-frame 34, with an adjustable front L-frame 34' comprising a tiltable and positionable lens board 70 and front lens 72, wherein both front and rear L-frames 34' and 34, respectively, are adjustably attached to a horizontal guide rail 38, according to the present invention.

Figure 26:
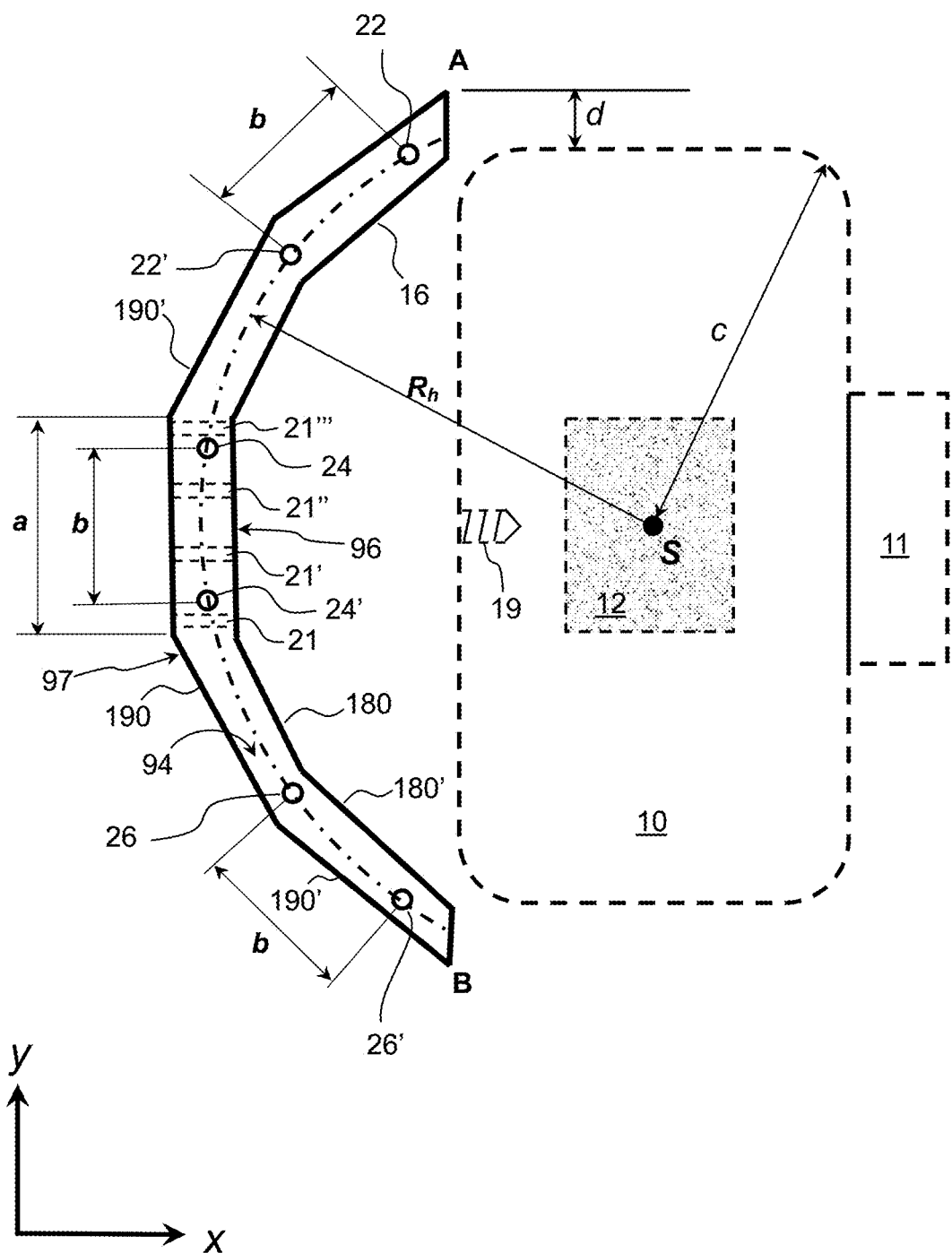

FIG. 26 shows an elevation rear view of another embodiment of a C-shaped support arc 16 and removable camera body 10, according to the present invention.

Figure 27:
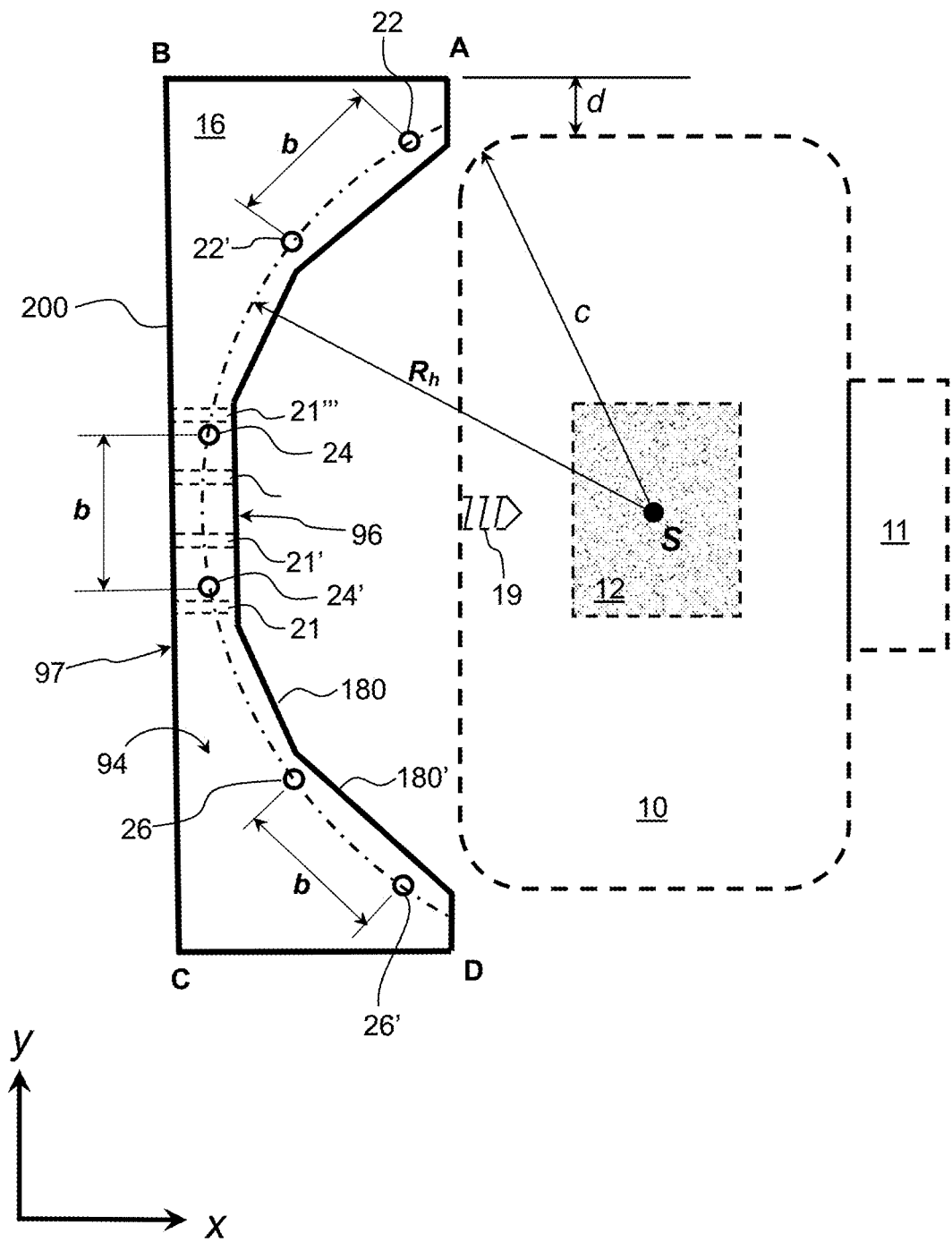

FIG. 27 shows an elevation rear view of another embodiment of a C-shaped support arc 16 and removable camera body 10, according to the present invention.

Figure 28:
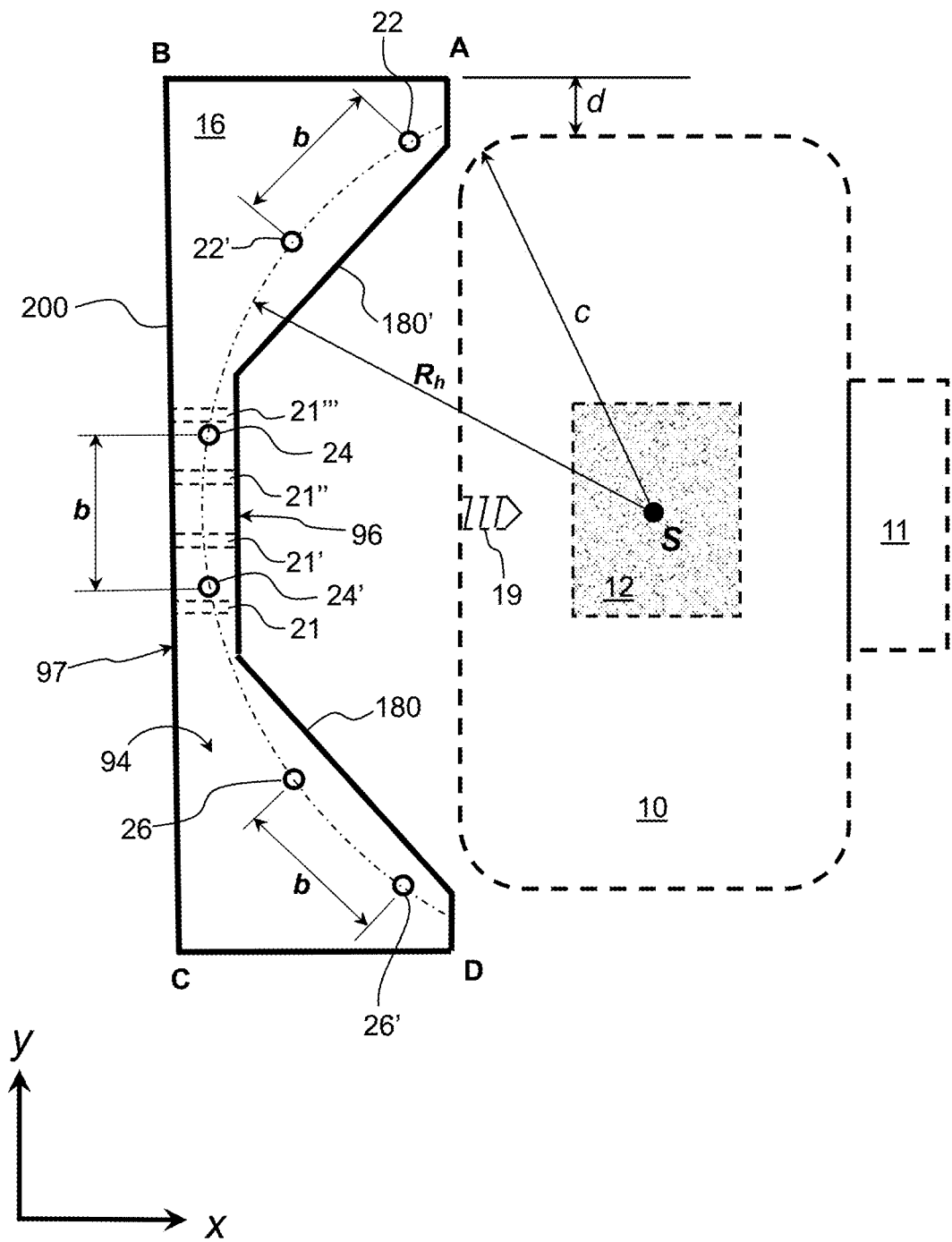

FIG. 28 shows an elevation rear view of another embodiment of a C-shaped support arc 16 and removable camera body 10, according to the present invention.

Figure 29:
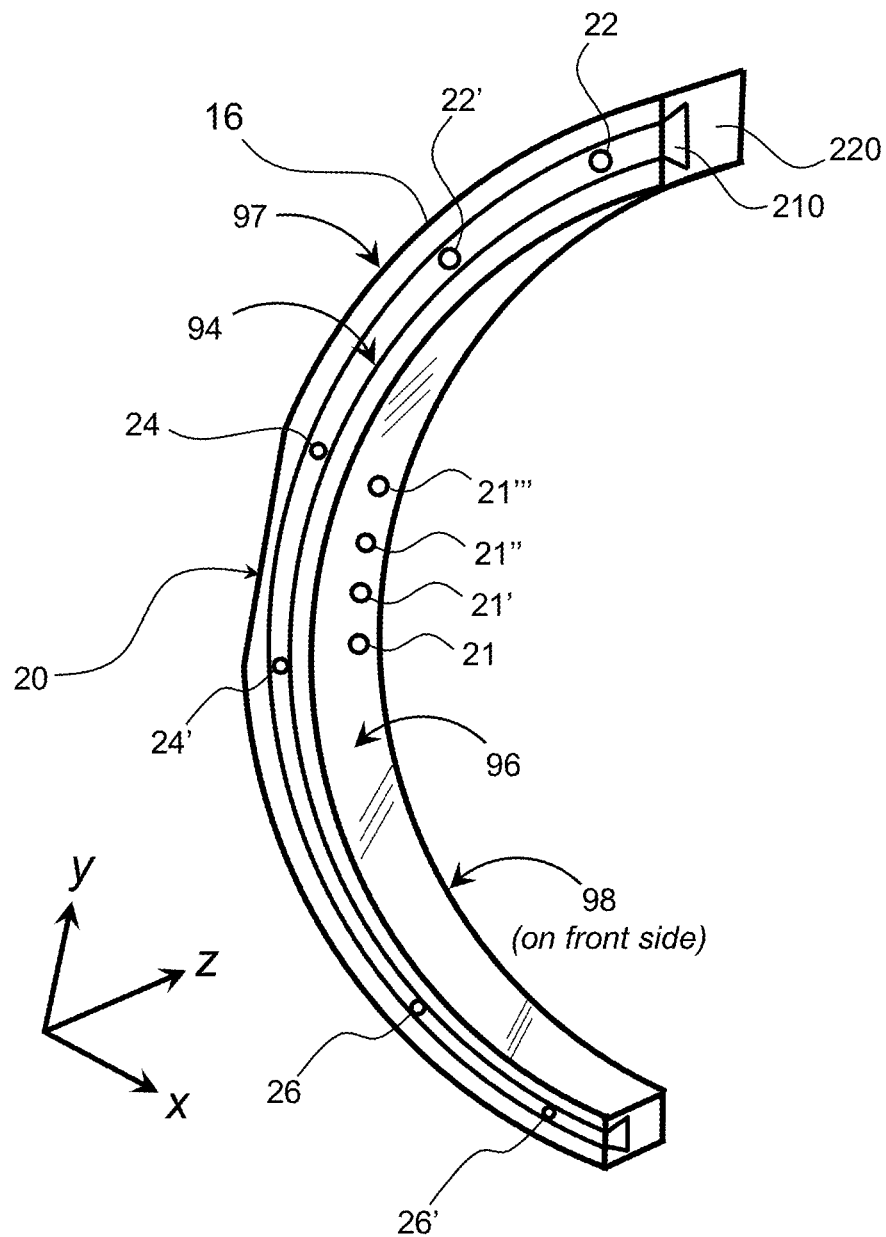

FIG. 29 shows an isometric perspective rear view of another embodiment of a C-shaped support arc 16, according to the present invention.

Figure 30:
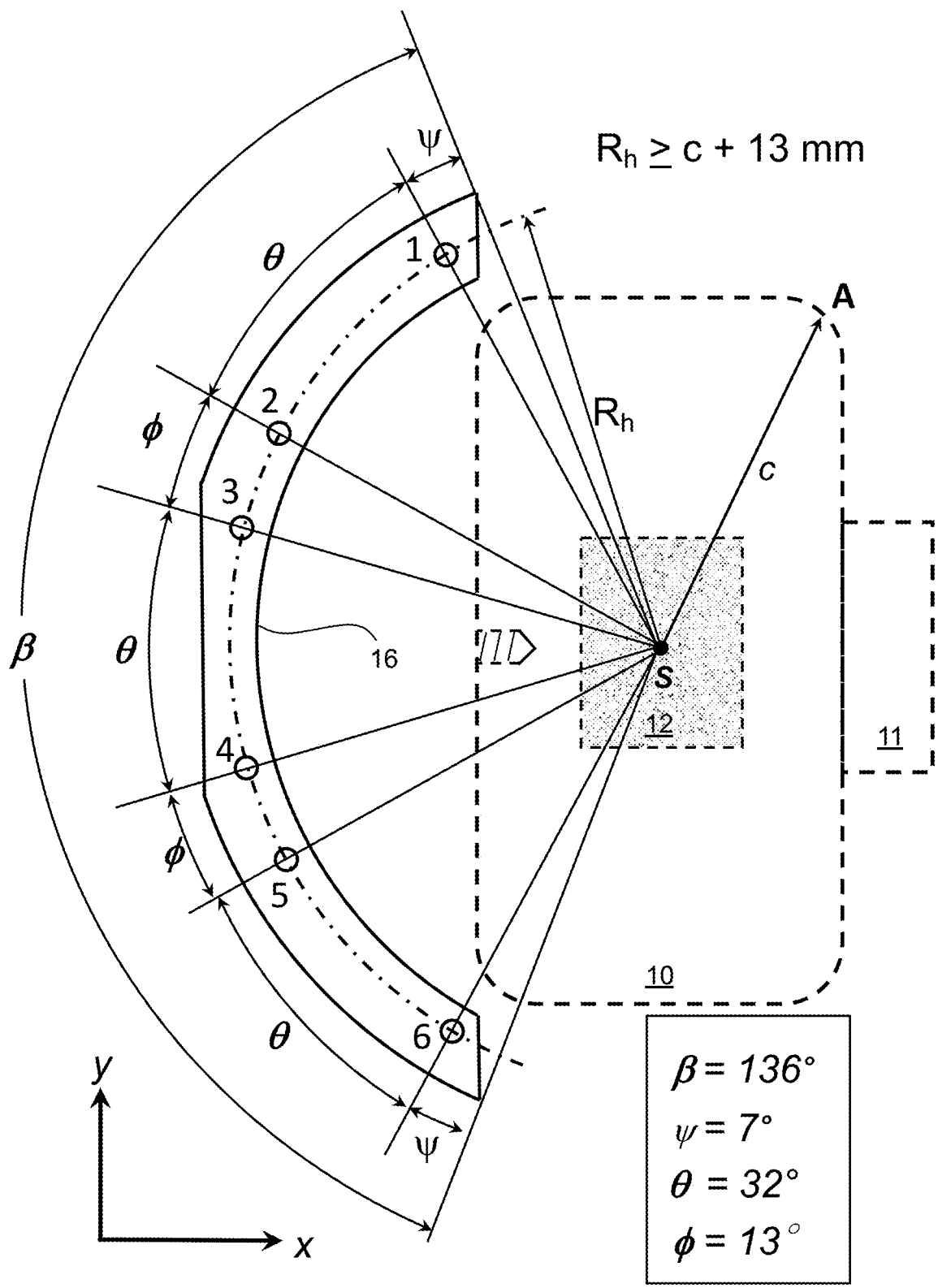

FIG. 30 shows an elevation rear view of another embodiment of a C-shaped support arc 16 and removable camera body 10, according to the present invention.

Figure 31:
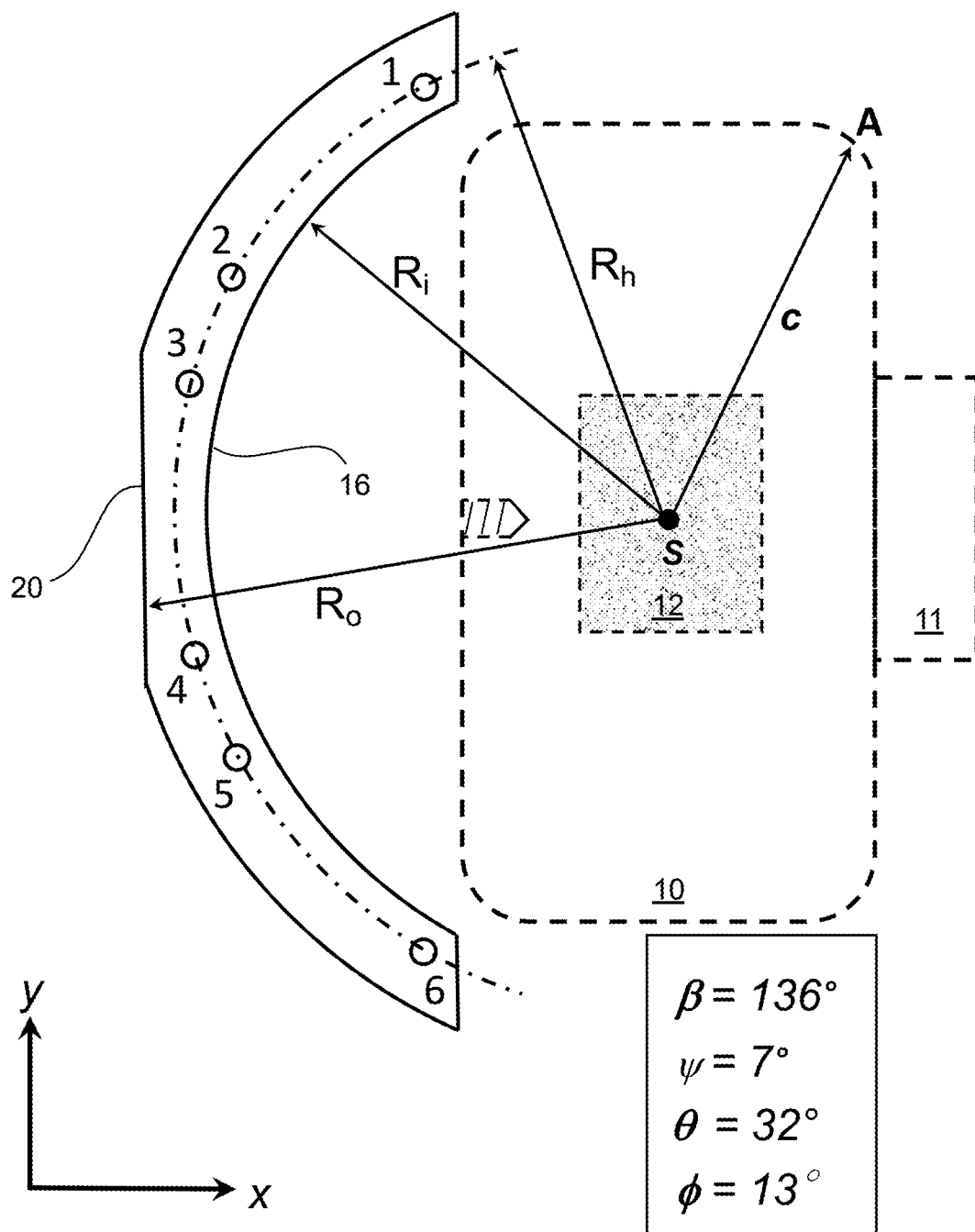

FIG. 31 shows an elevation rear view of another embodiment of a C-shaped support arc 16 and removable camera body 10, according to the present invention.

Figure 32:
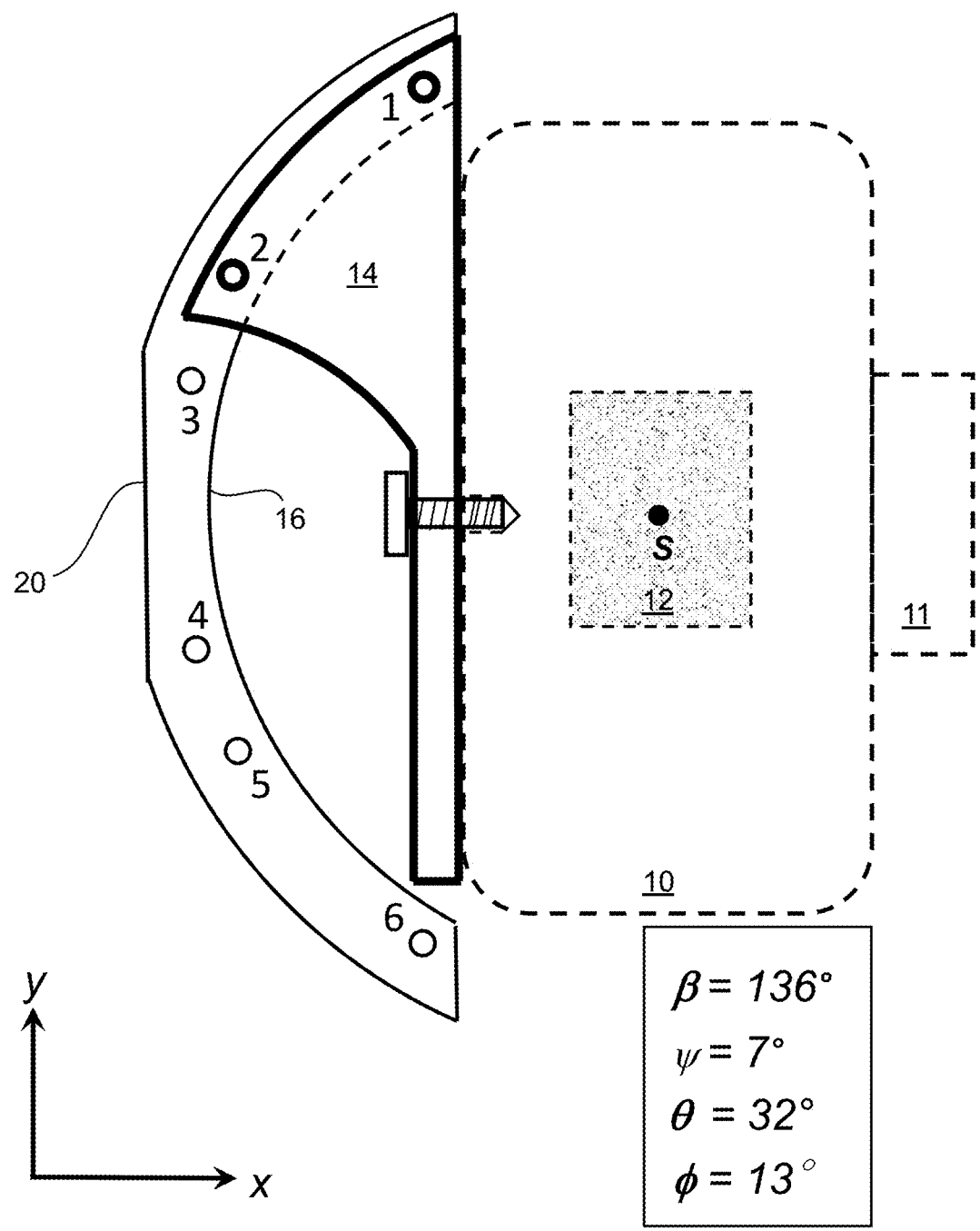

FIG. 32 shows an elevation rear view of another embodiment of a C-shaped support arc 16, camera mount 14, and removable camera body 10, according to the present invention.

Figure 33:
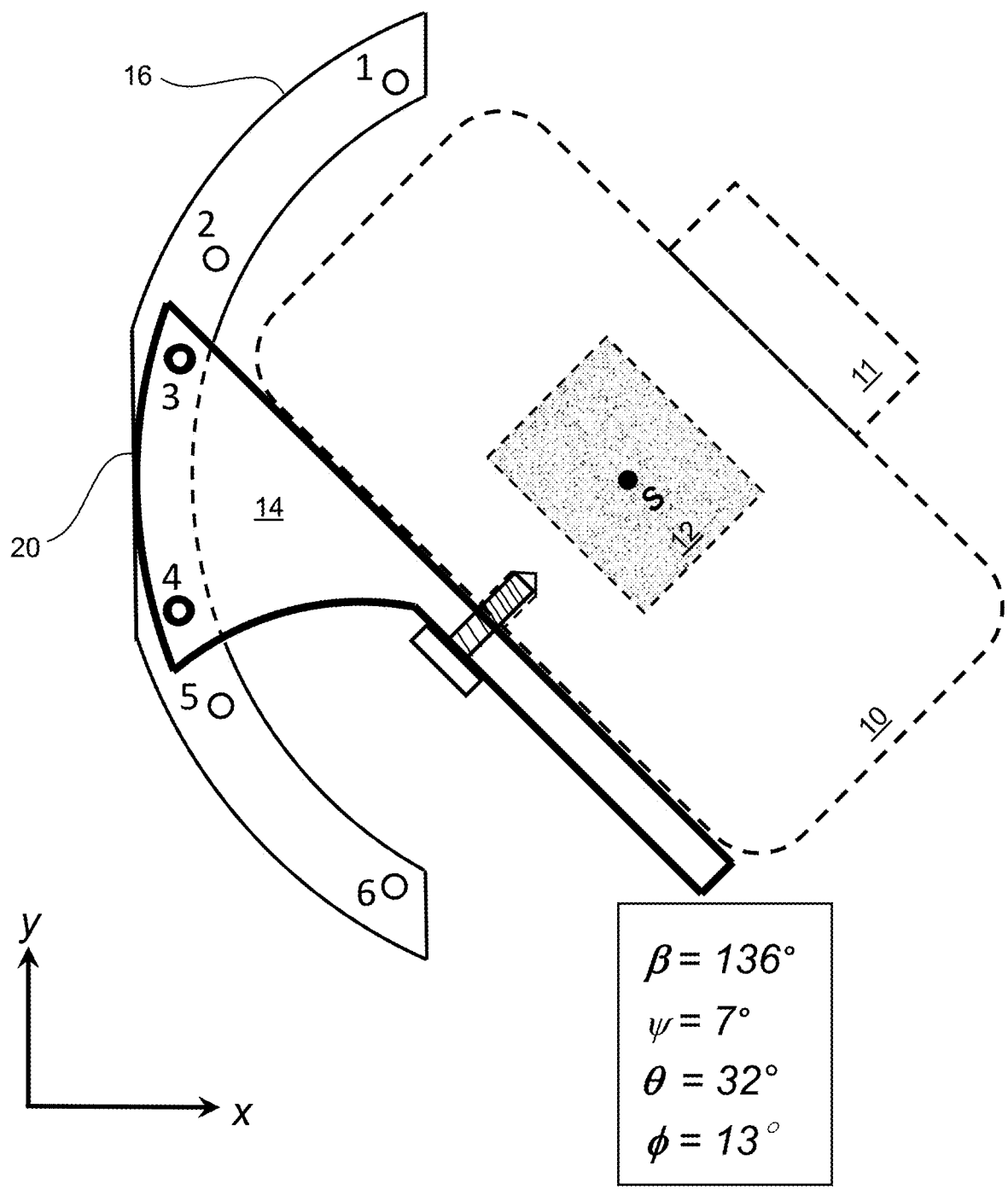

FIG. 33 shows an elevation rear view of another embodiment of a C-shaped support arc 16, camera mount 14, and removable camera body 10, according to the present invention.

Figure 34:
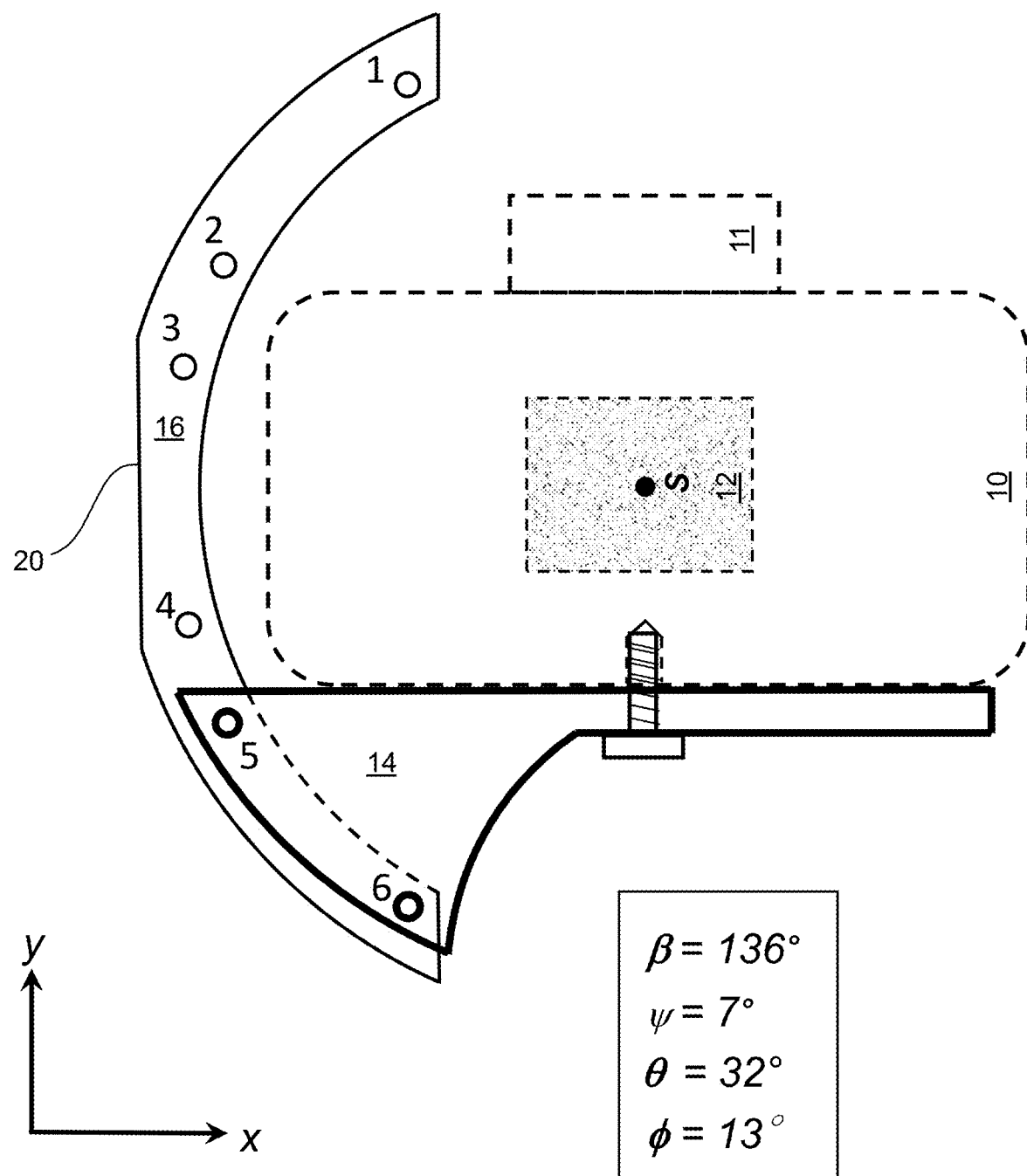

FIG. 34 shows an elevation rear view of another embodiment of a C-shaped support arc 16, camera mount 14, and removable camera body 10, according to the present invention.

Figure 35:
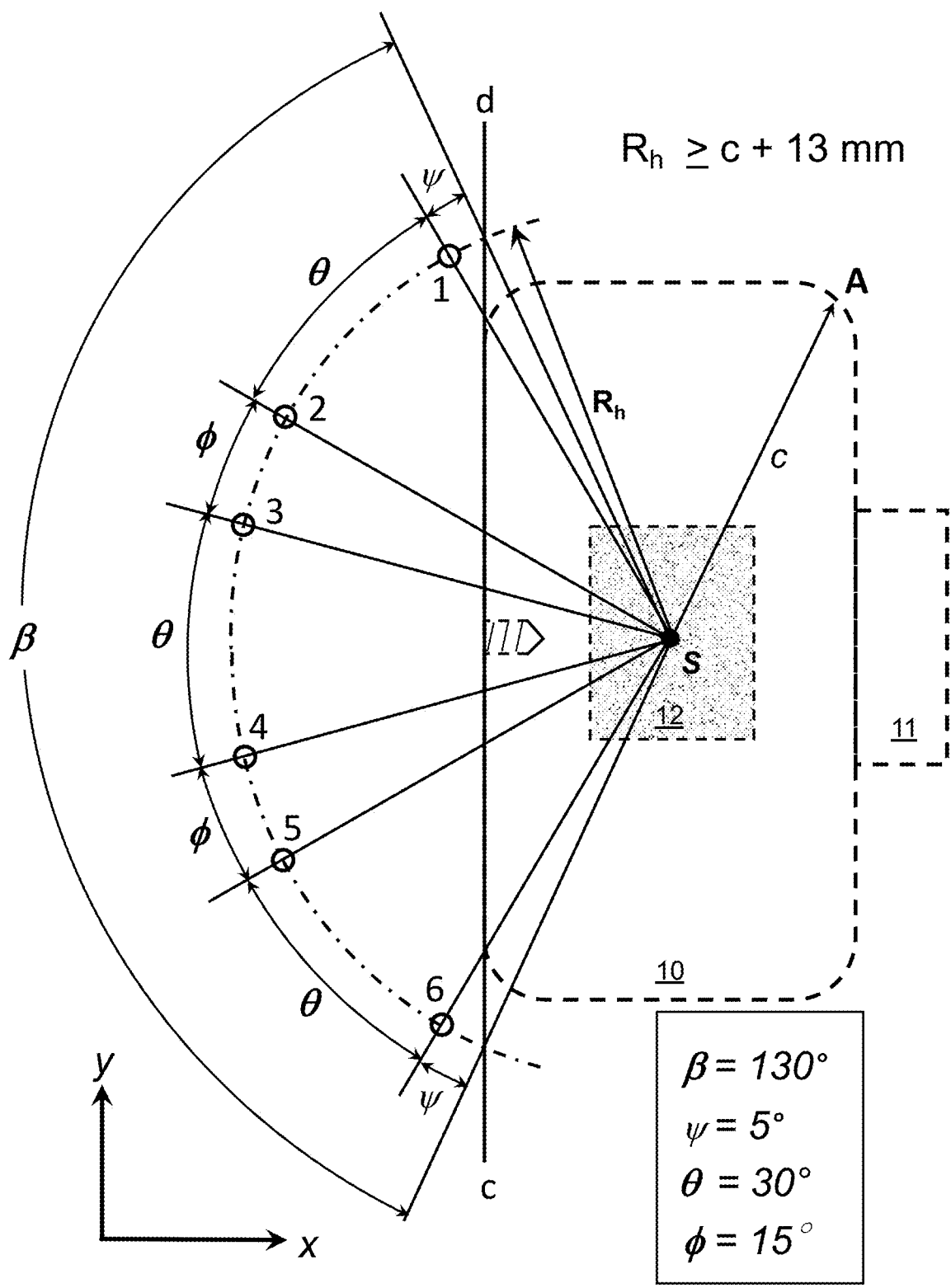

FIG. 35 shows an elevation rear view of another embodiment of a C-shaped support arc 16 and removable camera body 10, according to the present invention.

Figure 36:
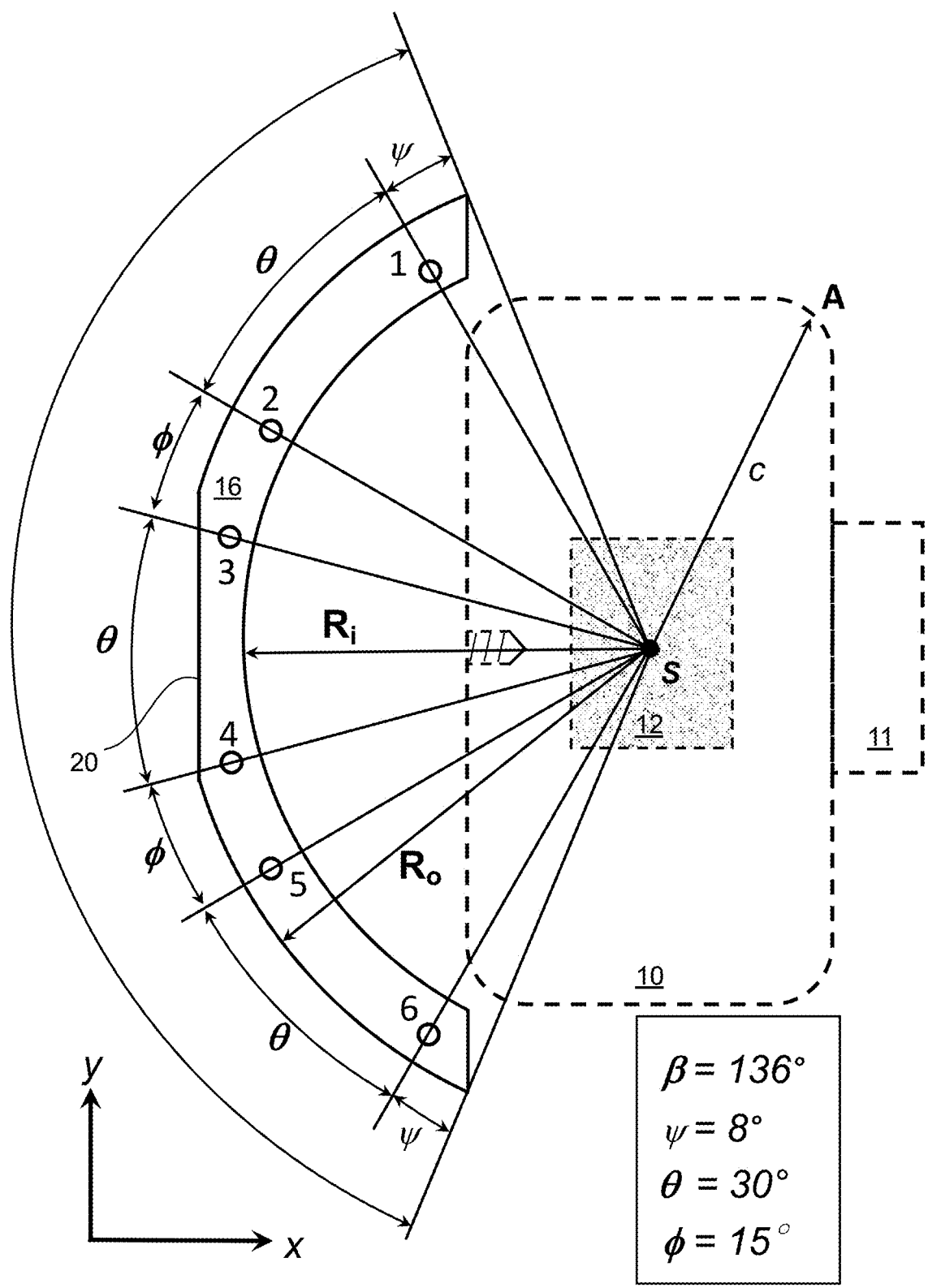

FIG. 36 shows an elevation rear view of another embodiment of a C-shaped support arc 16 and removable camera body 10, according to the present invention.

Figure 37:
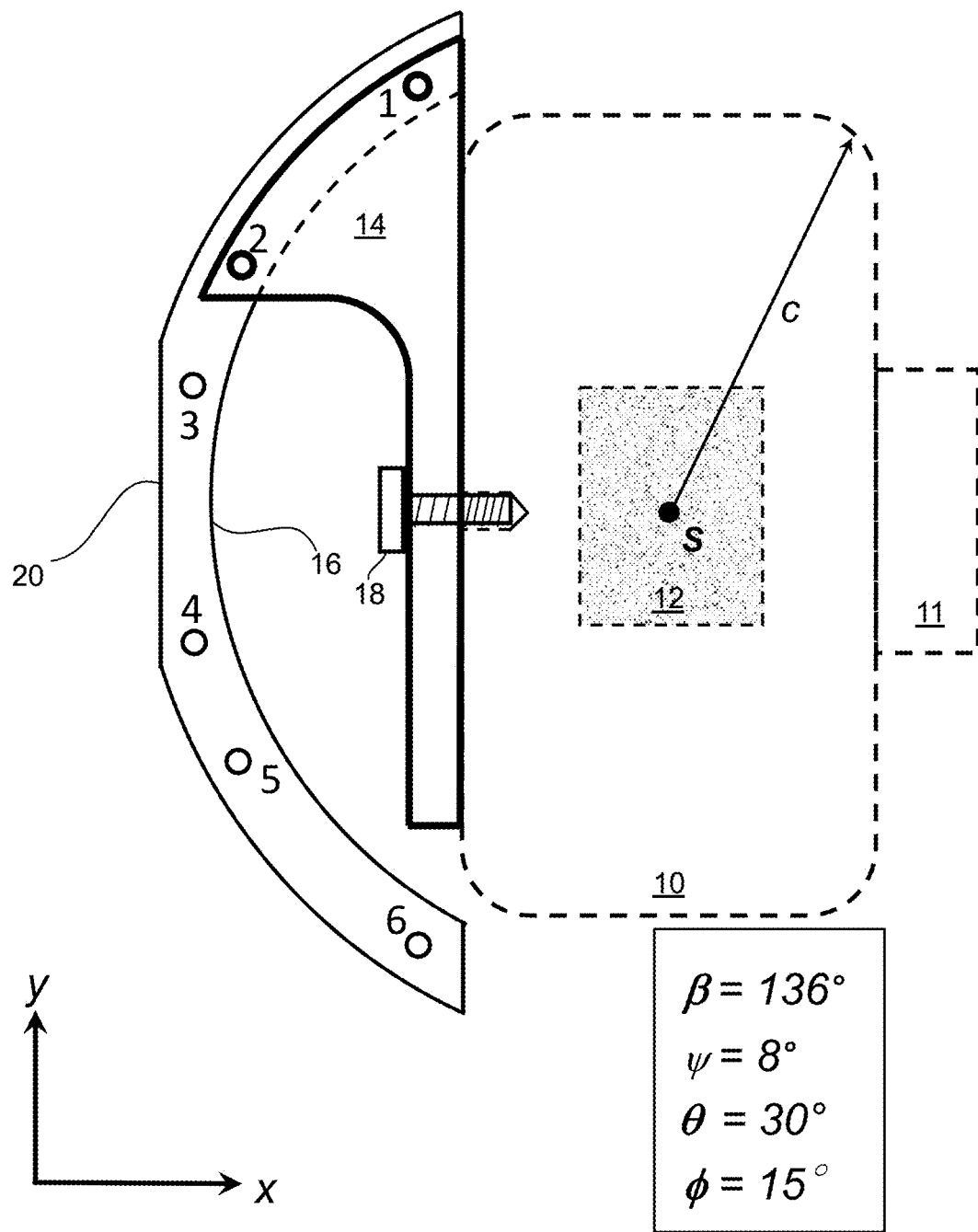

FIG. 37 shows an elevation rear view of another embodiment of a C-shaped support arc 16, camera mount 14, and removable camera body 10, according to the present invention.

Figure 38:
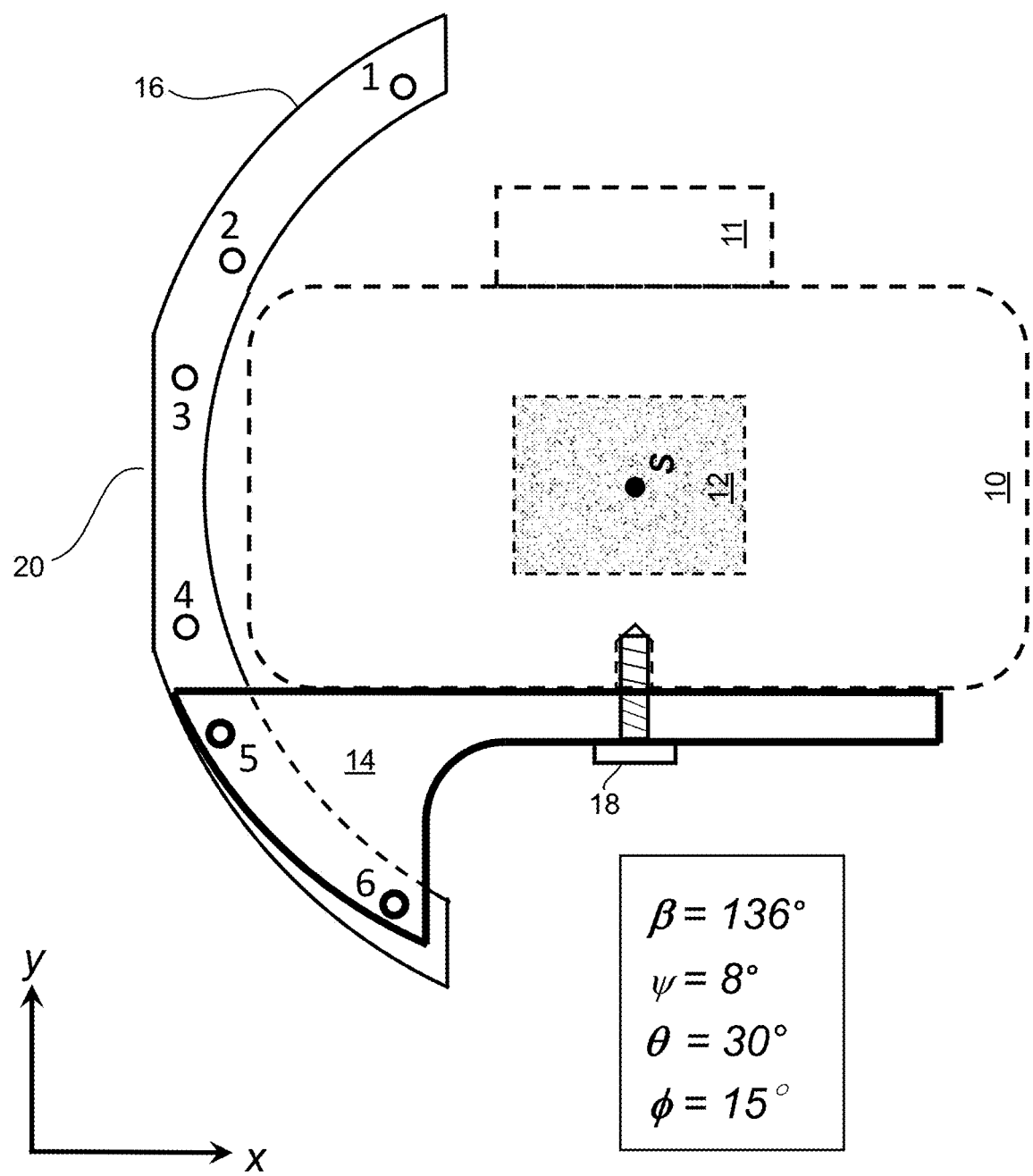

FIG. 38 shows an elevation rear view of another embodiment of a C-shaped support arc 16, camera mount 14, and removable camera body 10, according to the present invention.

Figure 39A:
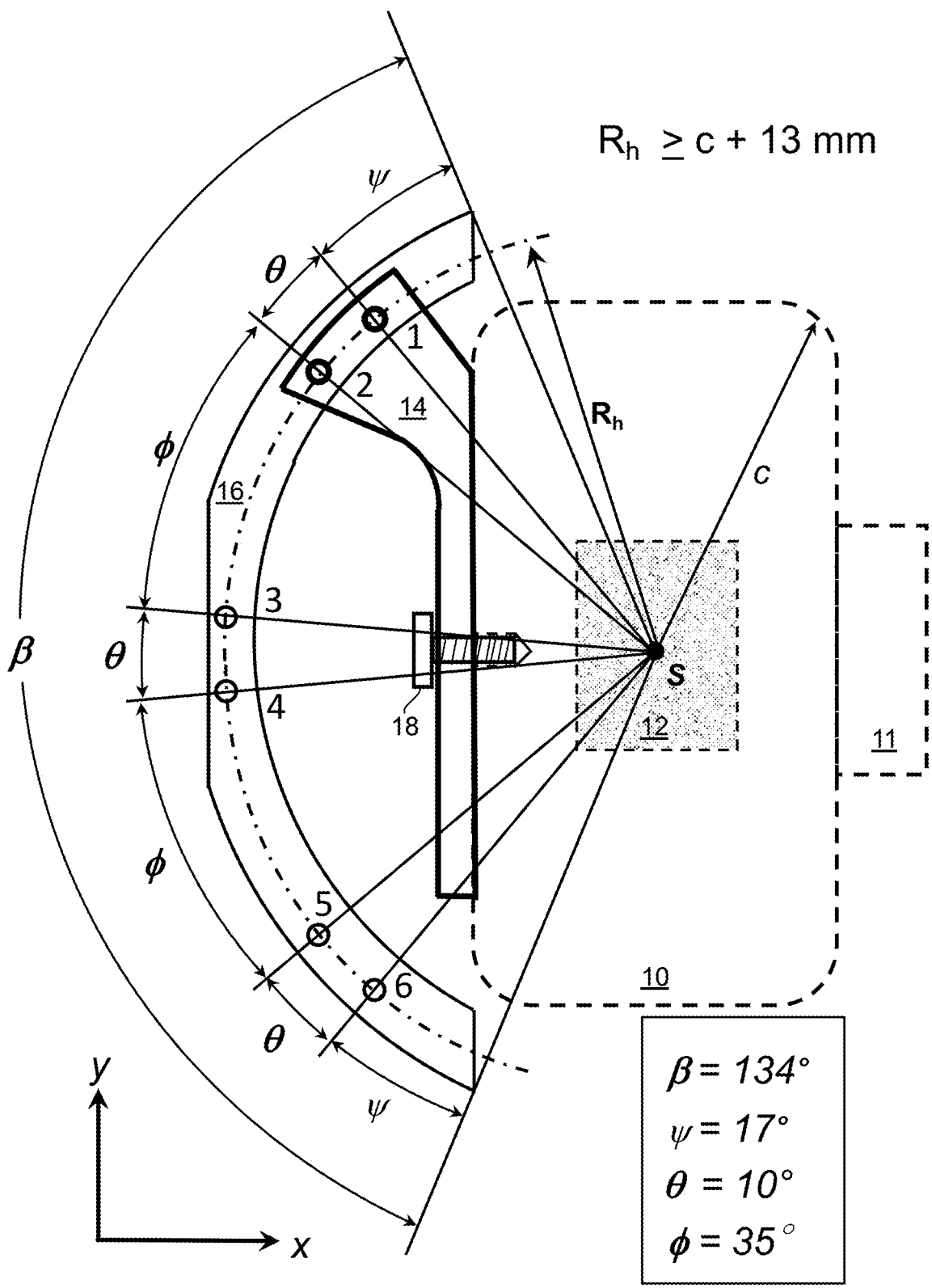

FIG. 39A shows an elevation rear view of another embodiment of a C-shaped support arc 16, camera mount 14, and removable camera body 10, according to the present invention.

Figure 39B:
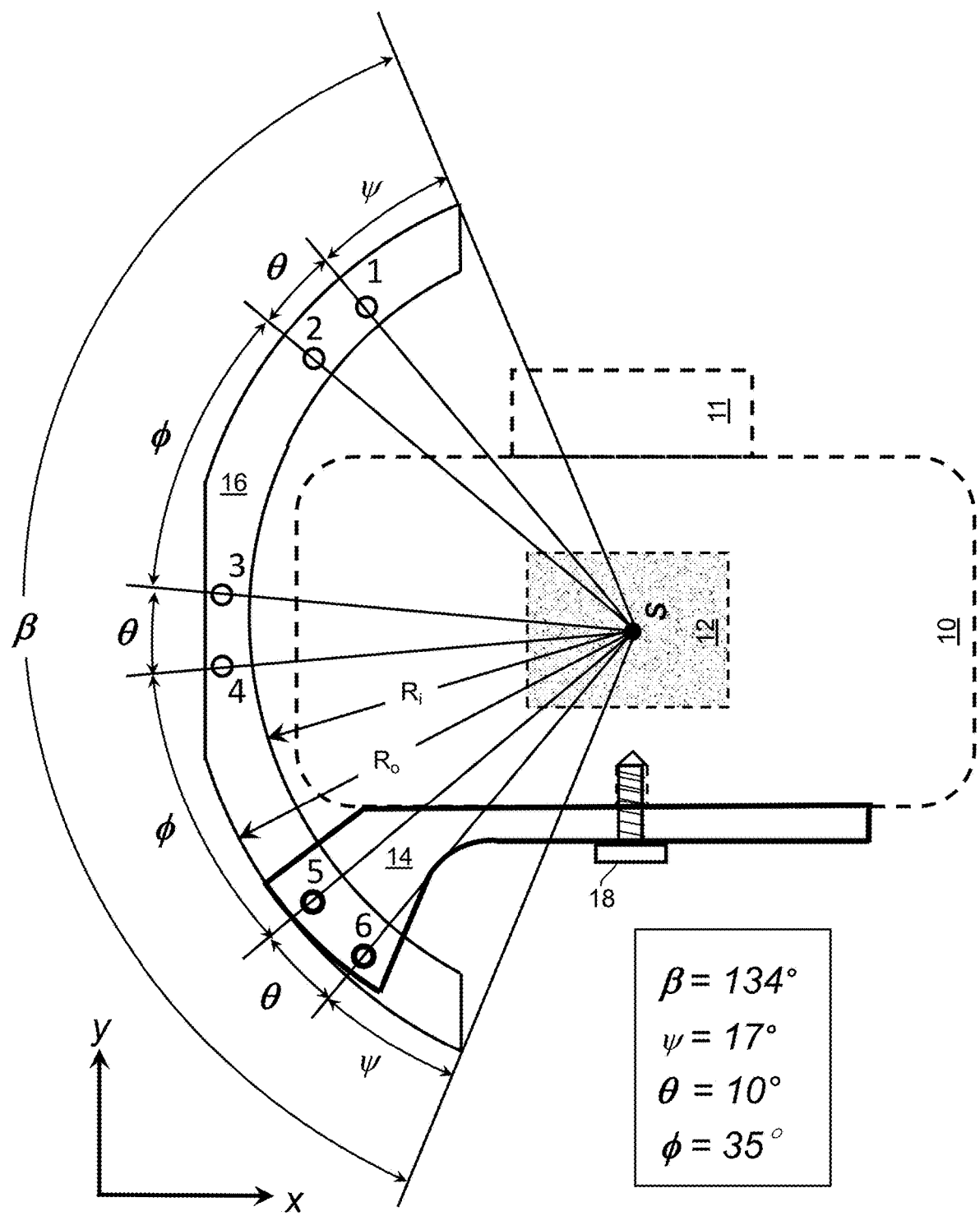

FIG. 39B shows an elevation rear view of another embodiment of a C-shaped support arc 16, camera mount 14, and removable camera body 10, according to the present invention.

Figure 40:
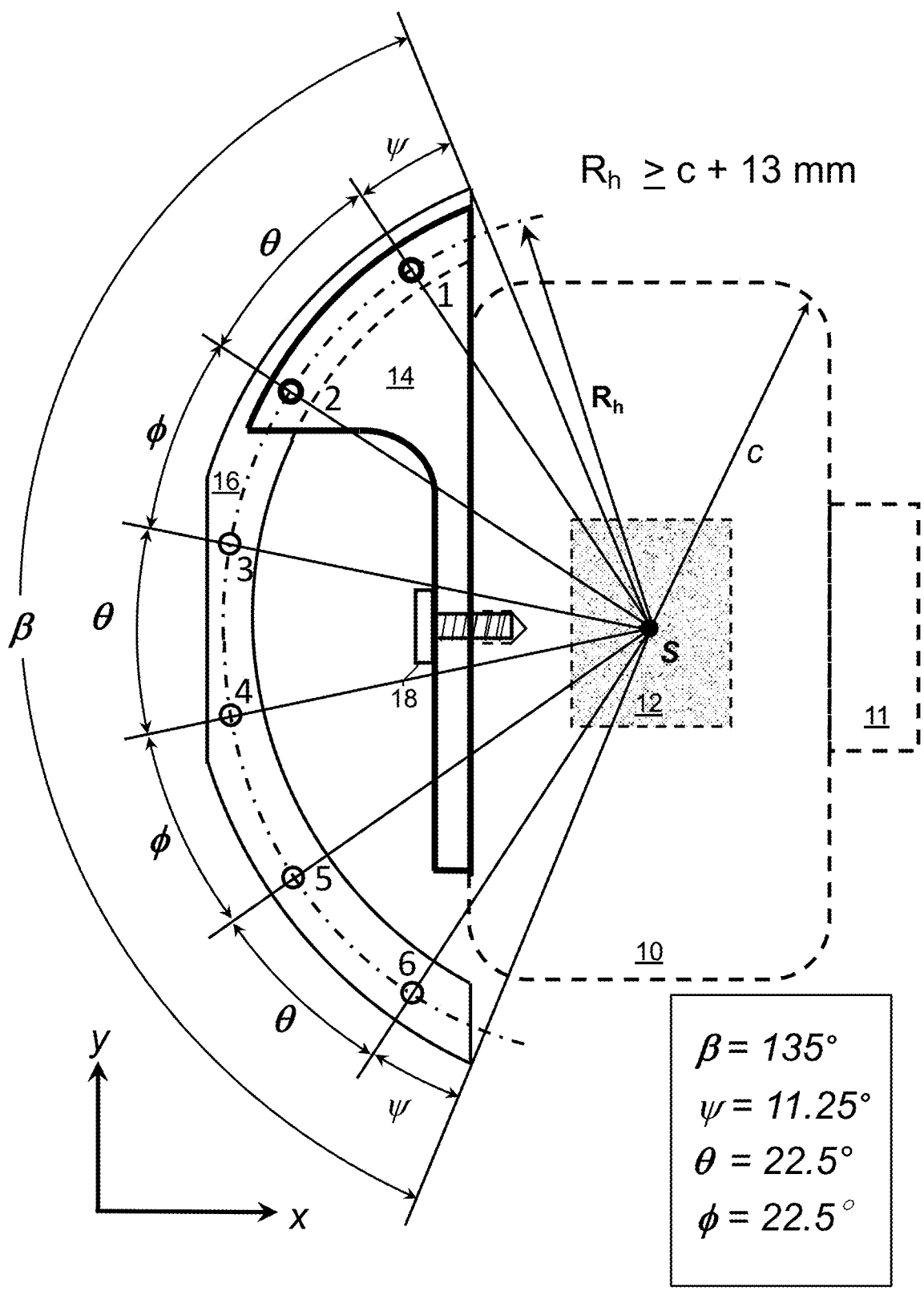

FIG. 40 shows an elevation rear view of another embodiment of a C-shaped support arc 16, camera mount 14, and removable camera body 10, according to the present invention.

Figure 41:
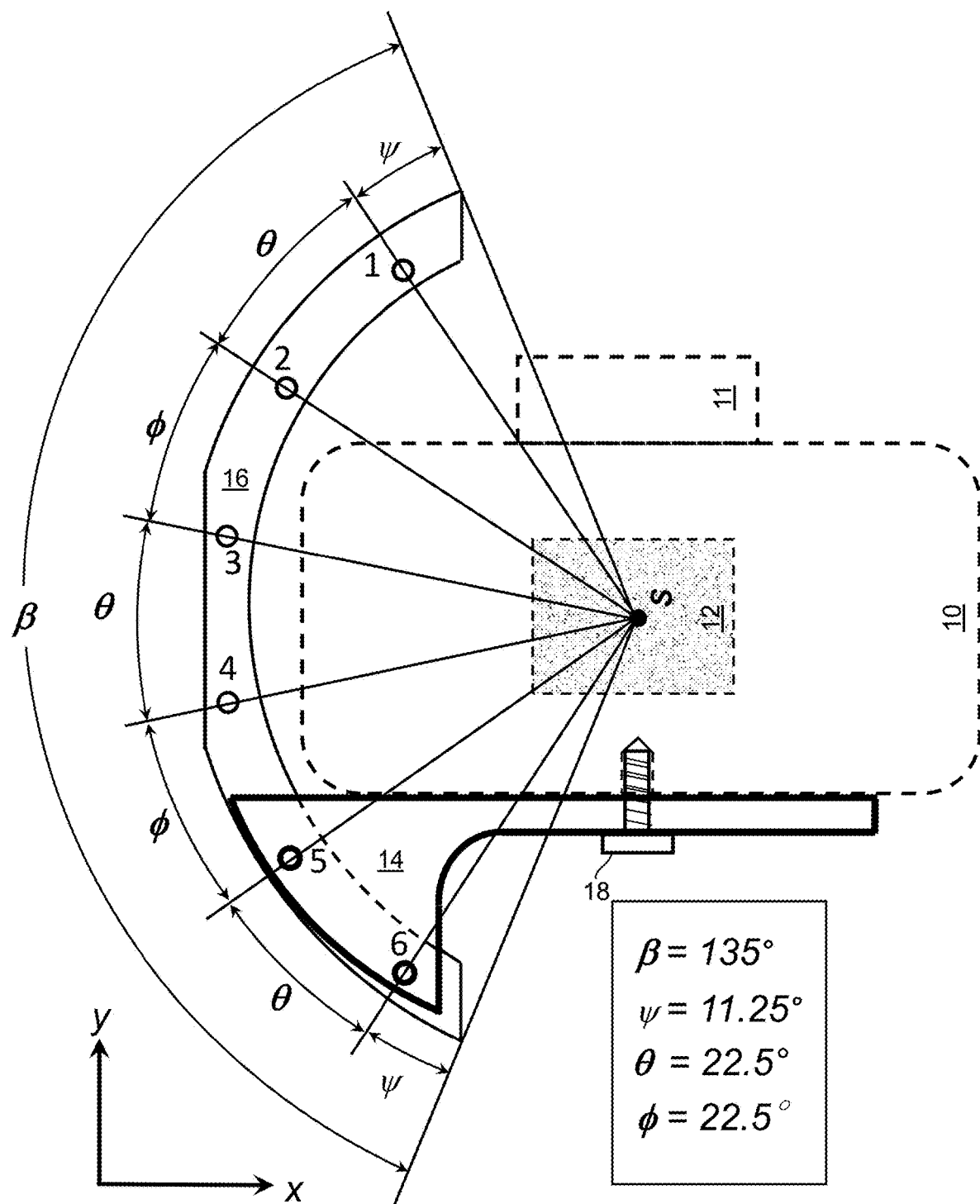

FIG. 41 shows an elevation rear view of another embodiment of a C-shaped support arc 16, camera mount 14, and removable camera body 10, according to the present invention.

Figure 42A:
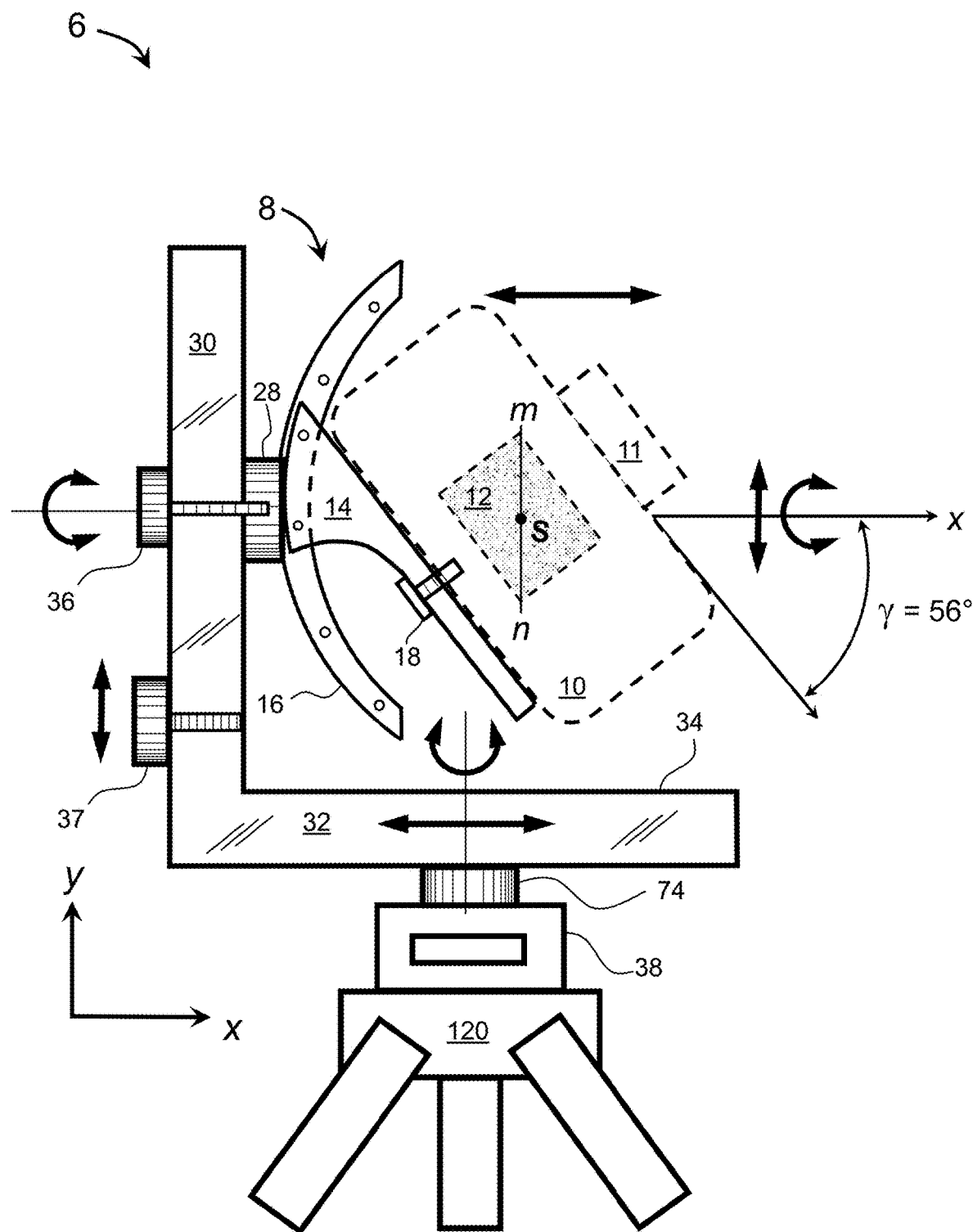

FIG. 42A shows an elevation rear view of another embodiment of a view camera system 6 comprising a multi-position camera adapter assembly 8 and removable camera body 10 oriented at $\gamma=56°$ to the horizontal x-axis (i.e., maximum-vertical mode), according to the present invention.

Figure 42B:
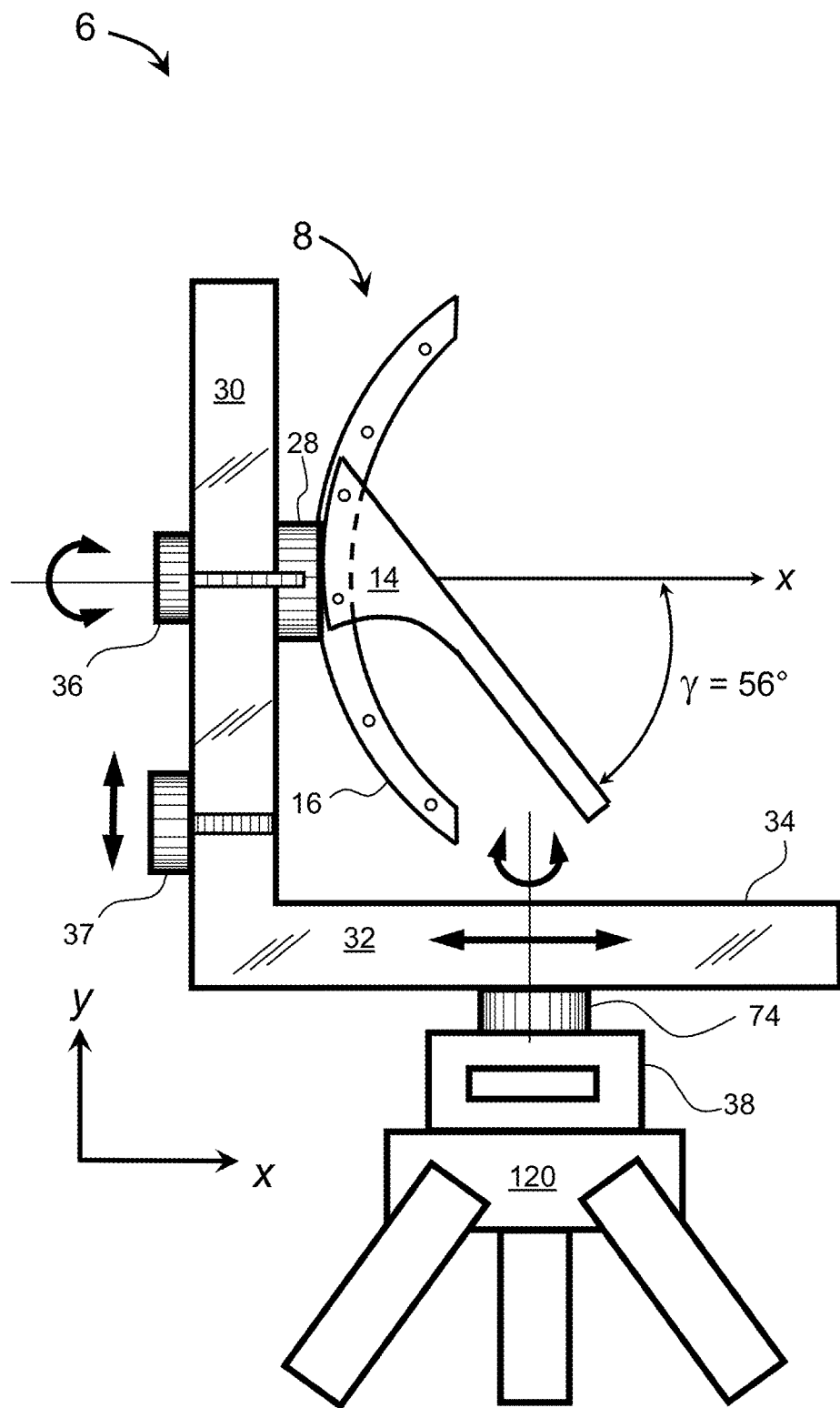

FIG. 42B shows an elevation rear view of another embodiment of a view camera system 6 comprising a multi-position camera adapter assembly 8 oriented at $\gamma=56°$ to the horizontal x-axis (i.e., maximum-vertical mode), according to the present invention.

Figure 42C:
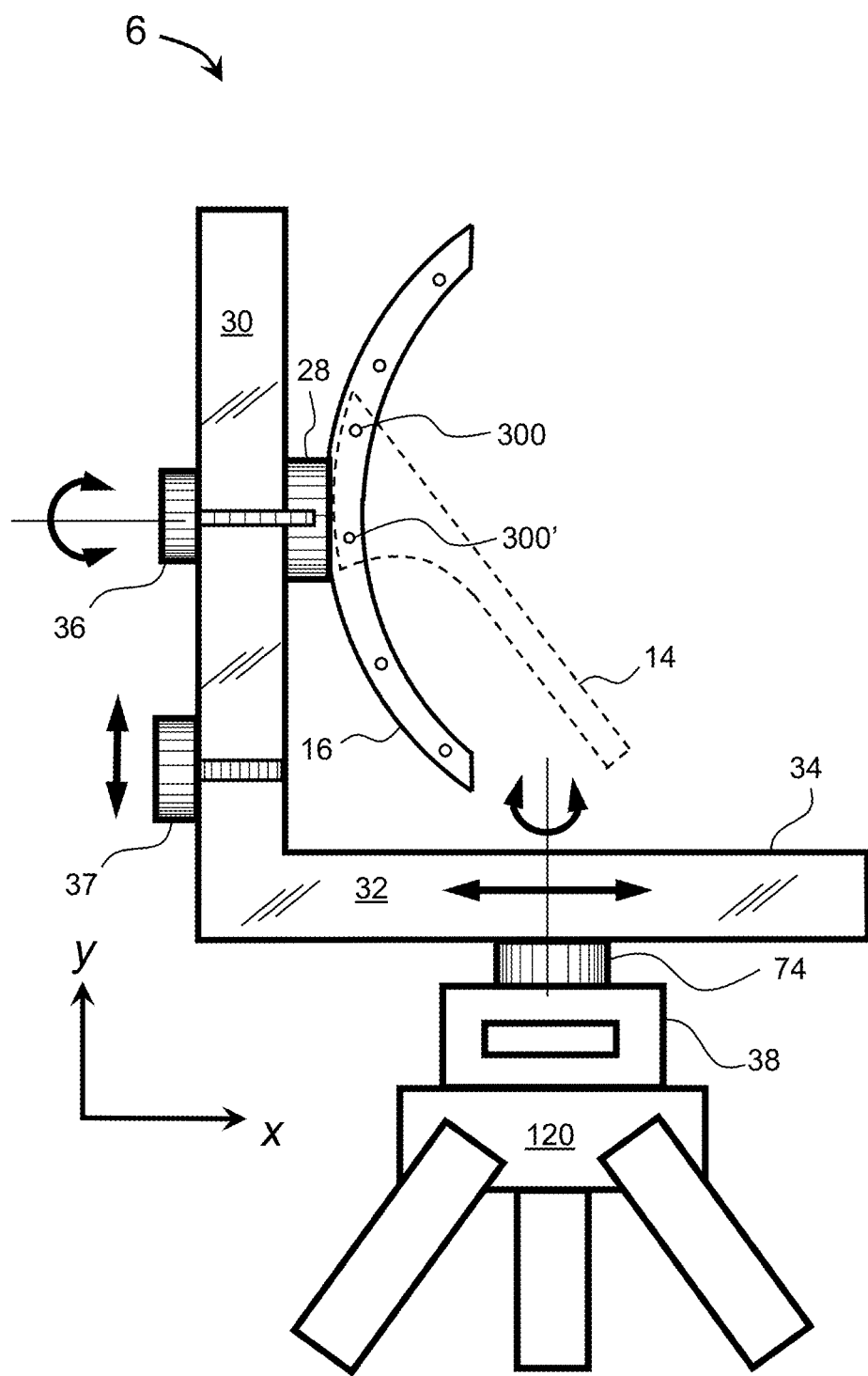

FIG. 42C shows an elevation rear view of another embodiment of a view camera system 6, according to the present invention.

Figure 43A:
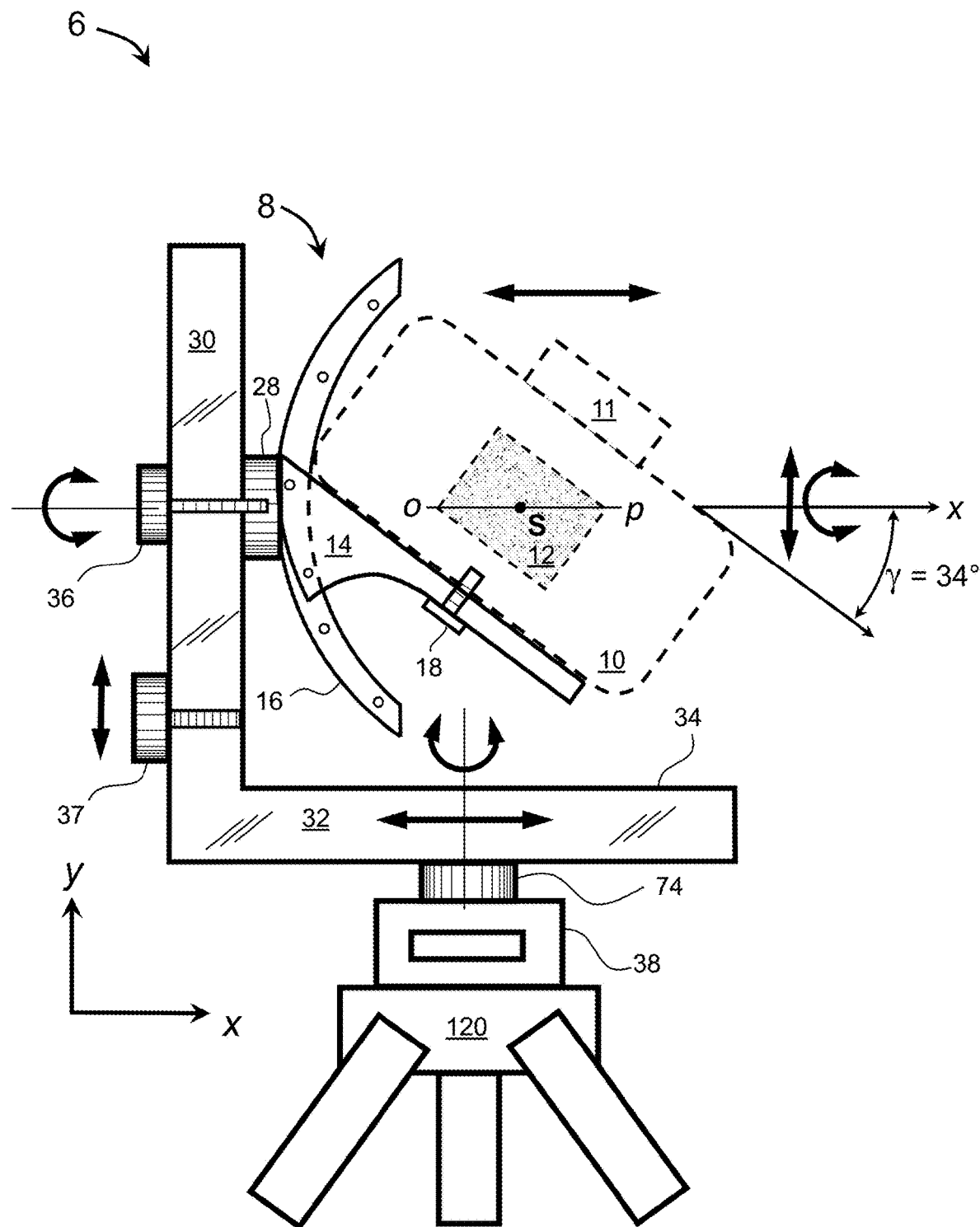

FIG. 43A shows an elevation rear view of another embodiment of a view camera system 6 comprising a multi-position camera adapter assembly 8 and removable camera body 10 oriented at $\gamma=34°$ to the horizontal x-axis (i.e., maximum-horizontal mode), according to the present invention.

Figure 43B:
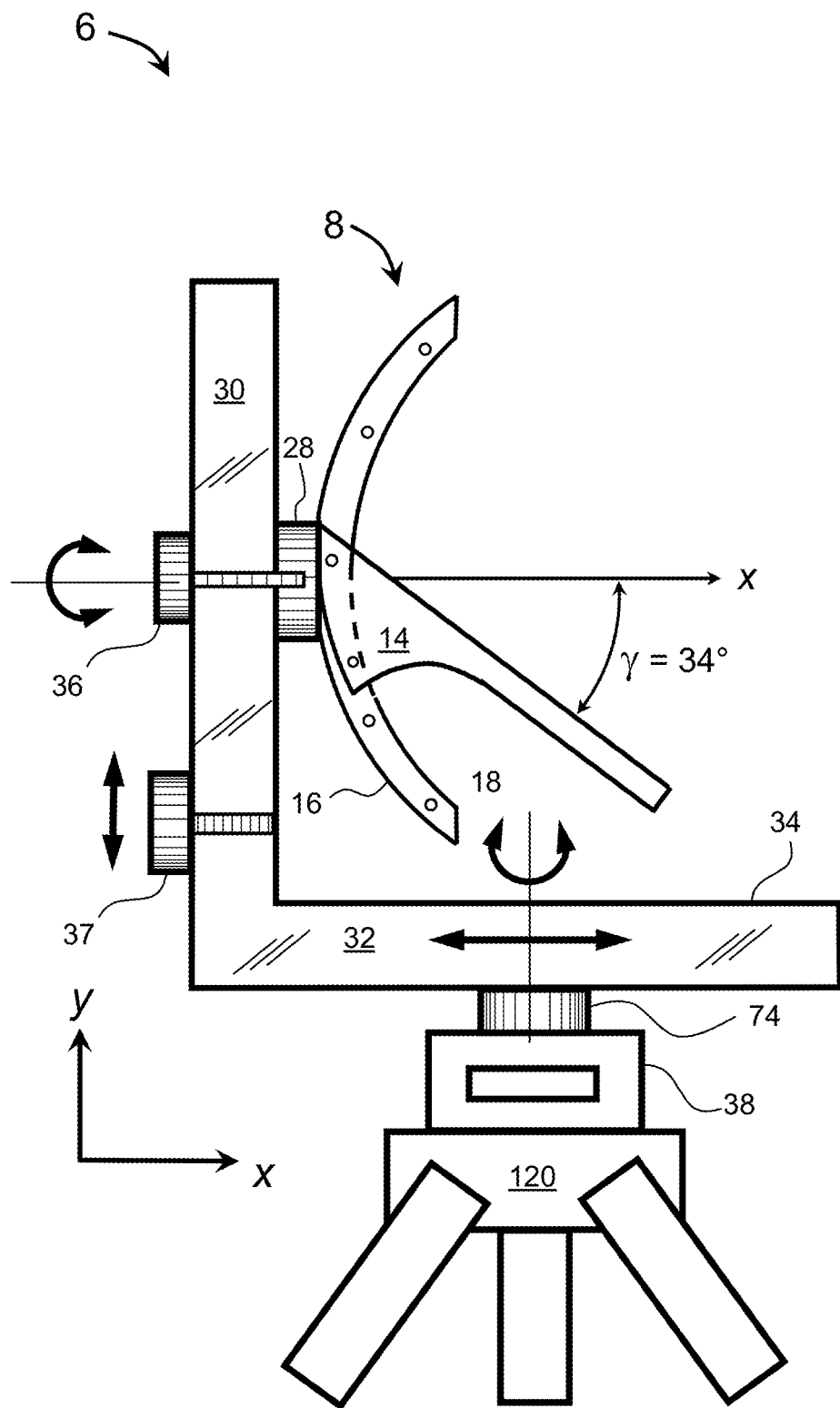

FIG. 43B shows an elevation rear view of another embodiment of a view camera system 6 comprising a multi-position camera adapter assembly 8 oriented at $\gamma=34°$ to the horizontal x-axis (i.e., maximum-horizontal mode), according to the present invention.

Figure 43C:
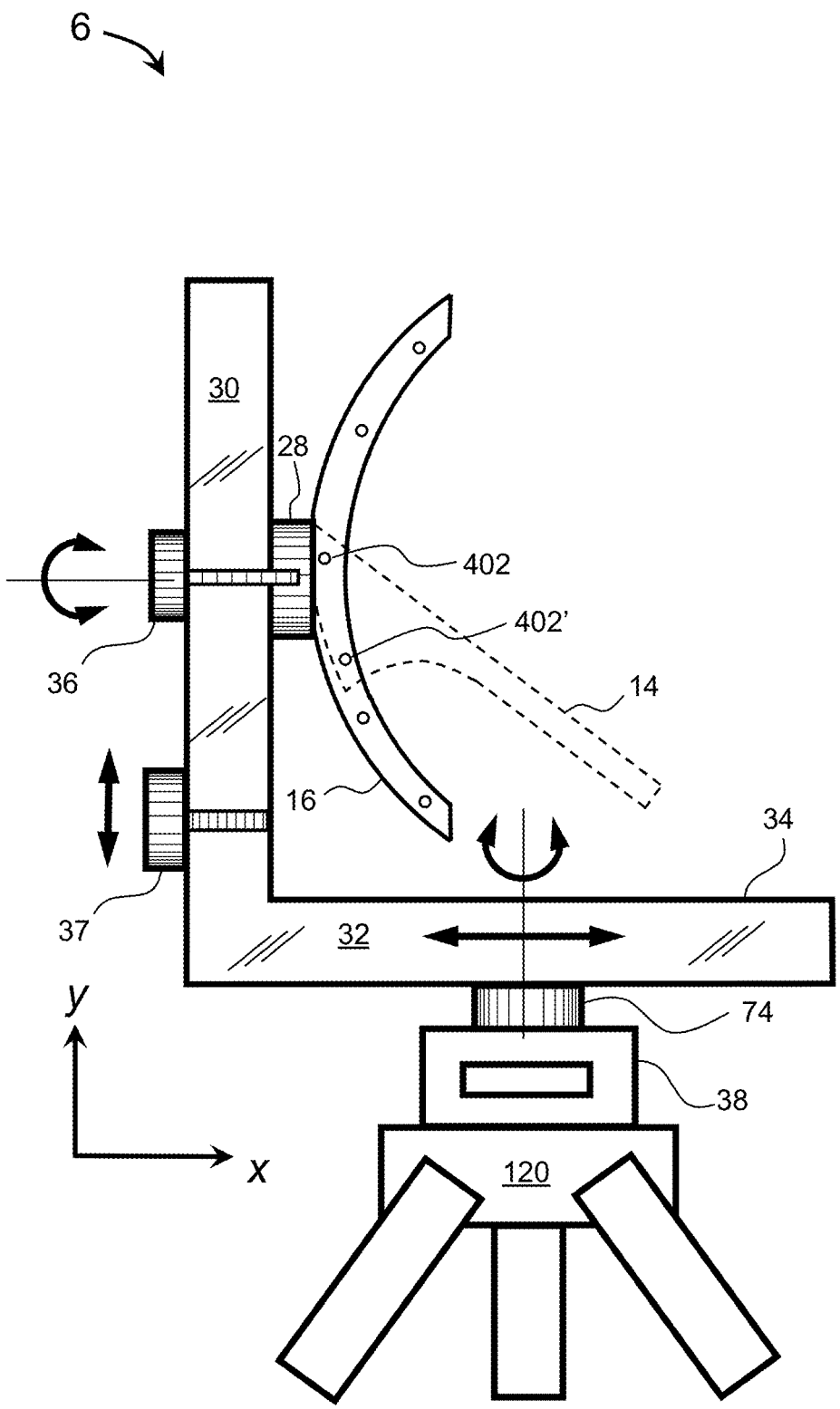

FIG. 43C shows an elevation rear view of another embodiment of a view camera system 6, according to the present invention.

Figure 44:
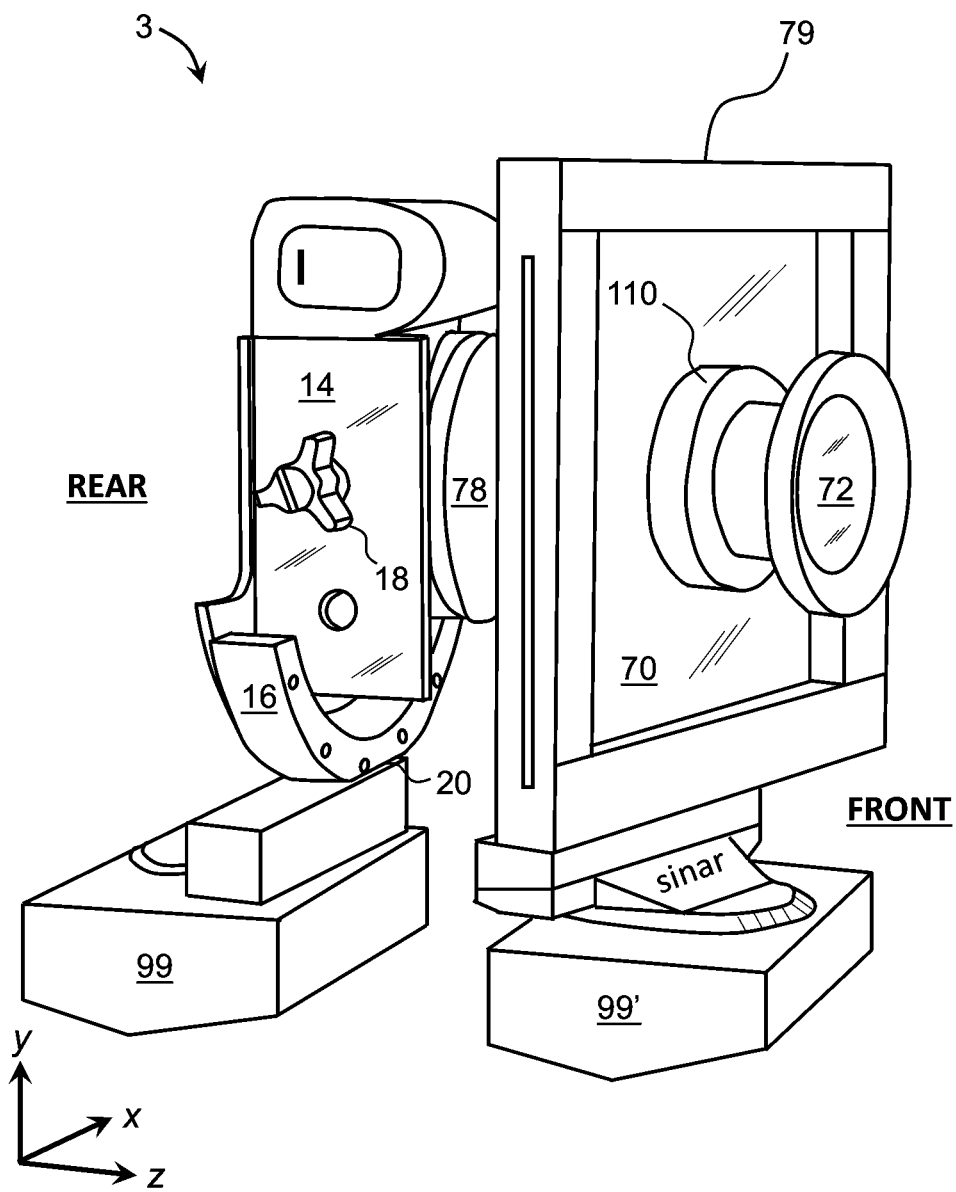

FIG. 44 shows an elevation side perspective view of an embodiment of a view camera system 3, according to the present invention.

Figure 45:
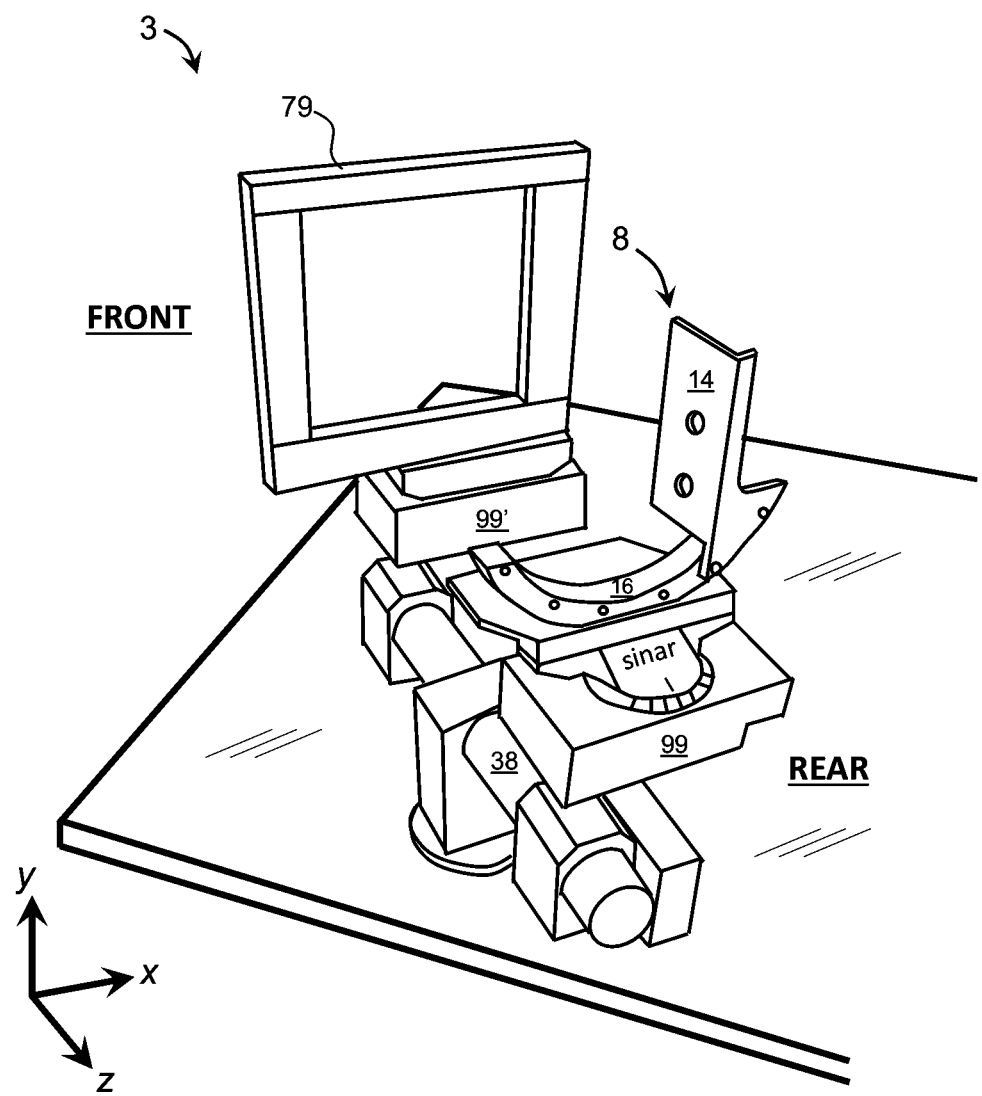

FIG. 45 shows an elevation rear perspective view of an embodiment of a view camera system 3, according to the present invention.

Figure 46:
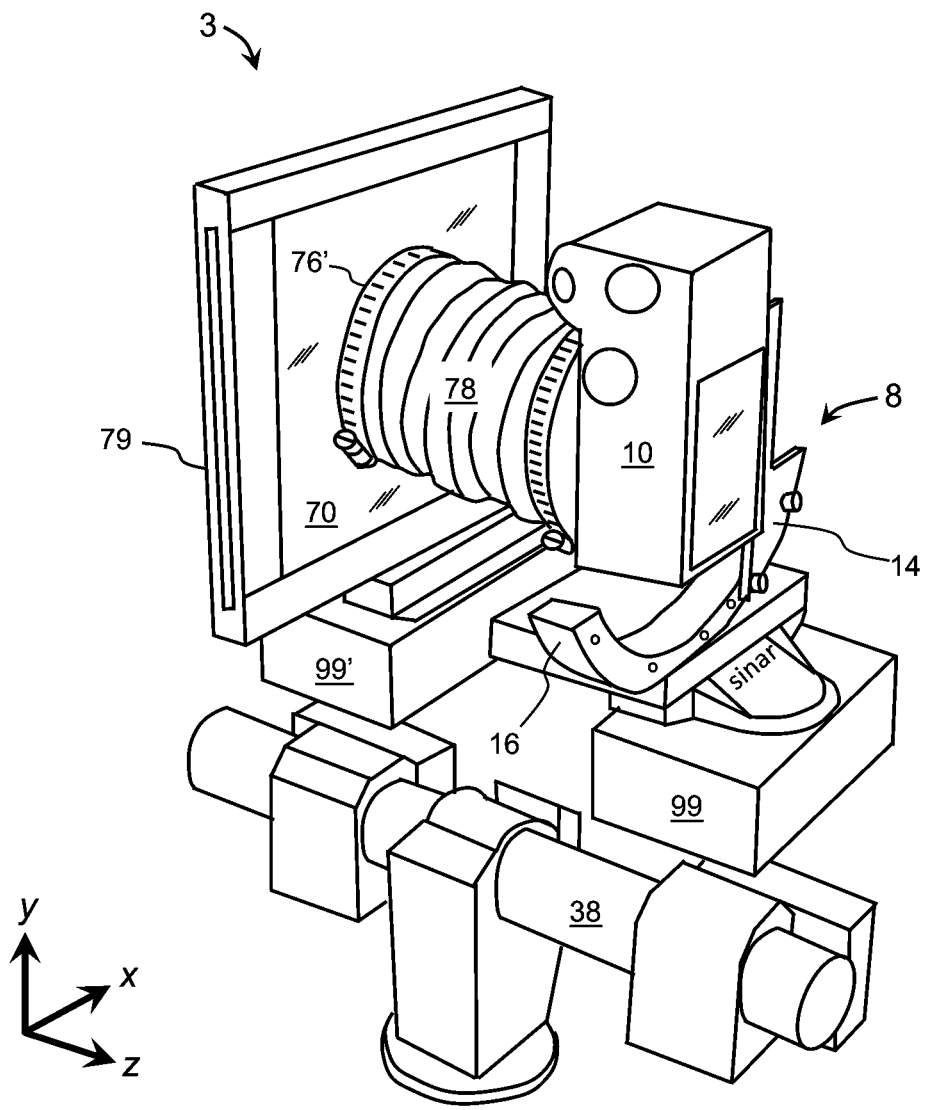

FIG. 46 shows an elevation side perspective view of an embodiment of a view camera system 3, according to the present invention.

Figure 47:
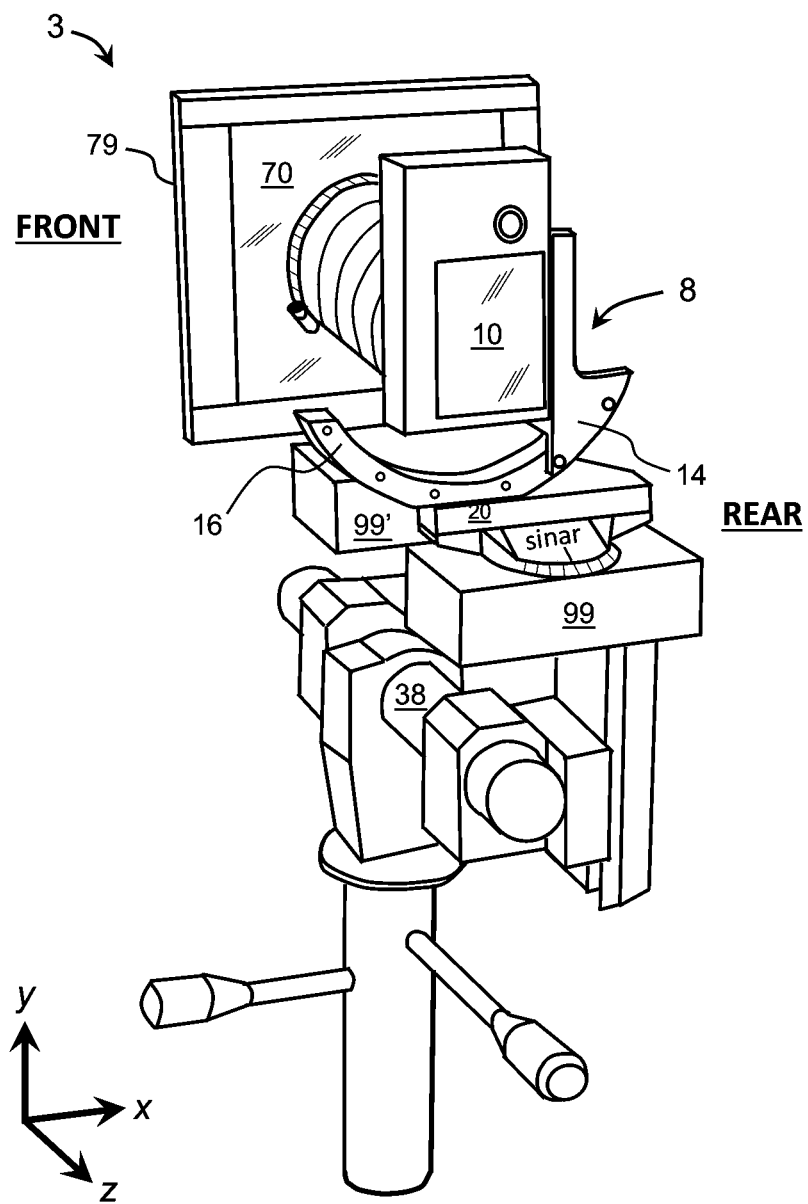

FIG. 47 shows an elevation rear perspective view of an embodiment of a view camera system 3, according to the present invention.

Figure 48:
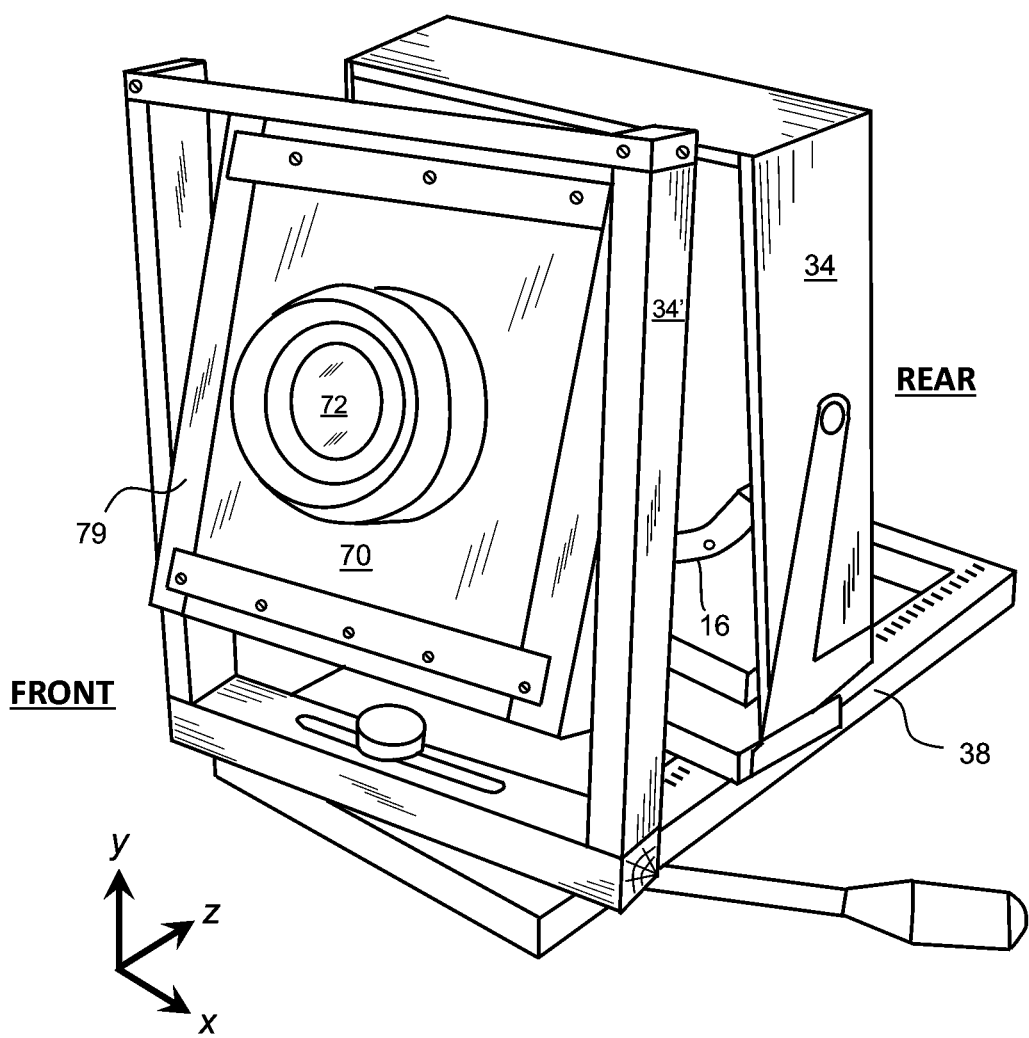

FIG. 48 shows a front elevation perspective view of an embodiment of a view camera system 2, according to the present invention.

Figure 49:
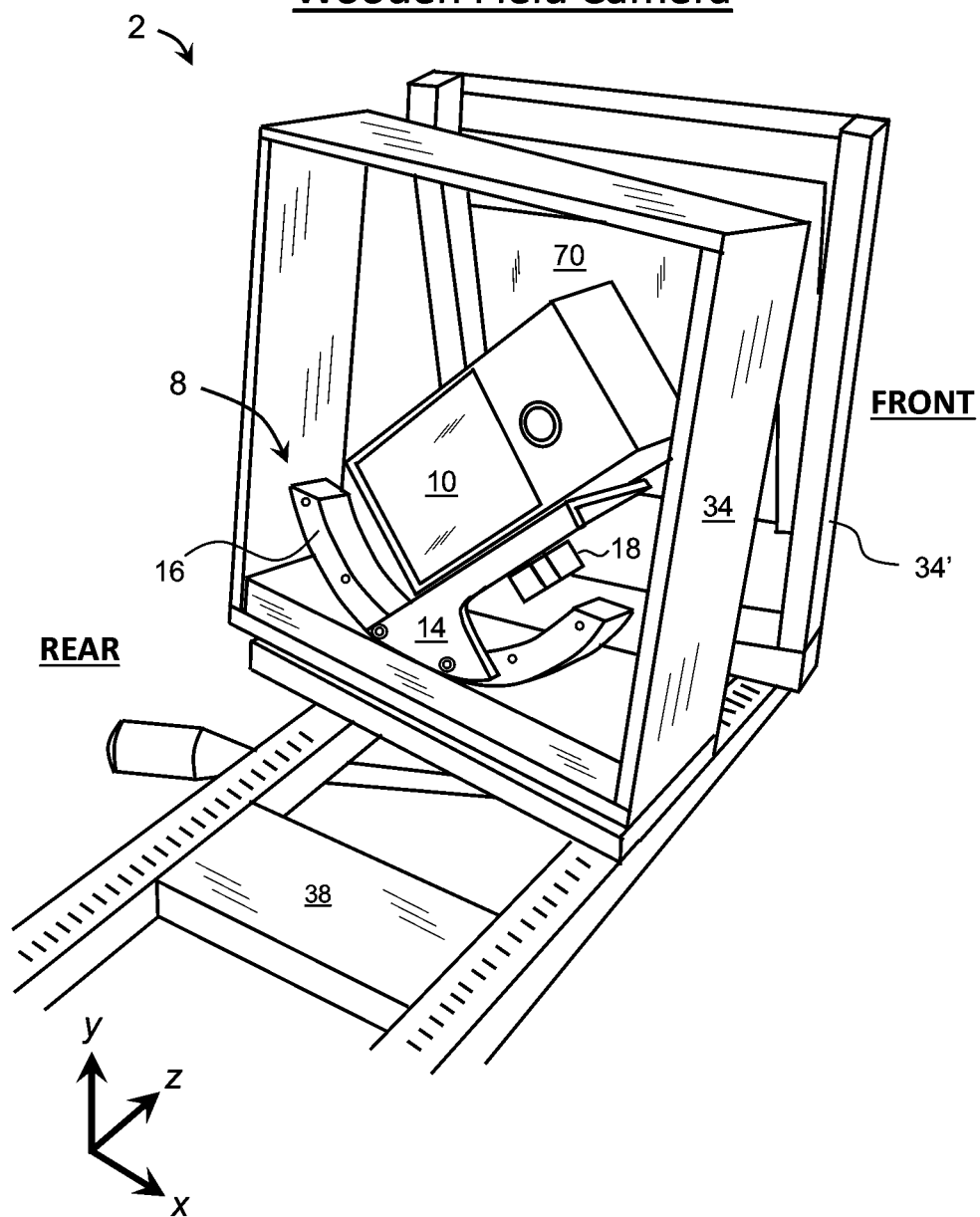

FIG. 49 shows a rear elevation perspective view of an embodiment of a view camera system 2, according to the present invention.

DETAILED DESCRIPTION OF THE INVENTION

FIGS. 1-49 show examples of various embodiments of the present invention. The present invention relates to a view camera system that uses an adjustable adapter assembly to attach a relatively-inexpensive camera body with a digital sensor (or film) to a rigid part of the view camera's structure. The adjustable adapter assembly includes a C-shaped support arc and an L-shaped, cantilevered camera mount that is removably attached to the support arc. The camera mount can be attached to the support arc at multiple, different positions, e.g., corresponding to portrait, 45° tilted, or landscape orientations. A film or digital camera body can be attached to the camera mount using a standardized thumb screw. The multi-camera, multi-position camera adapter of the present invention can be used with medium-format, large-format, or panoramic view camera systems.

The camera bodies used in this invention can be either traditional film or digital cameras, and they can have a range of sensor sizes; ranging from: micro four/thirds, APC, full-frame (35 mm), 4"×5", 5"×7", 8"×10" format, or even larger formats (including extra-wide or ultra-wide panoramic formats). A view camera system can comprise: a rear film plane, a front lens plane, an extension bellows disposed between the two planes, and a front lens board with a front lens and optional shutter (or lens cap). The camera body can be used without a directly-mounted lens (in which case the camera body is simply acting as a light-gathering sensor or film). Preferably, a full frame (35 mm sensor size) Digital Single Lens Reflex (DSLR) camera body is used. Alternatively, the DSLR camera body can have a medium-sized sensor, e.g., 44 mm×33 mm. In other embodiments, the camera body can be replaced with just a sensor chip (e.g., CCD chip) inside a much smaller enclosure. Note also that wherever a machine bolt (screw) is mounted in a threaded hole to join two parts together, that an alternate construction can be used that comprises an unthreaded through-hole and a nut threaded on the far side of the machine bolt (screw). Note also that the use of the words "standard" or "upright standard" are synonymous with an upright vertical arm of an L-frame of a view camera system.

Figure 1:
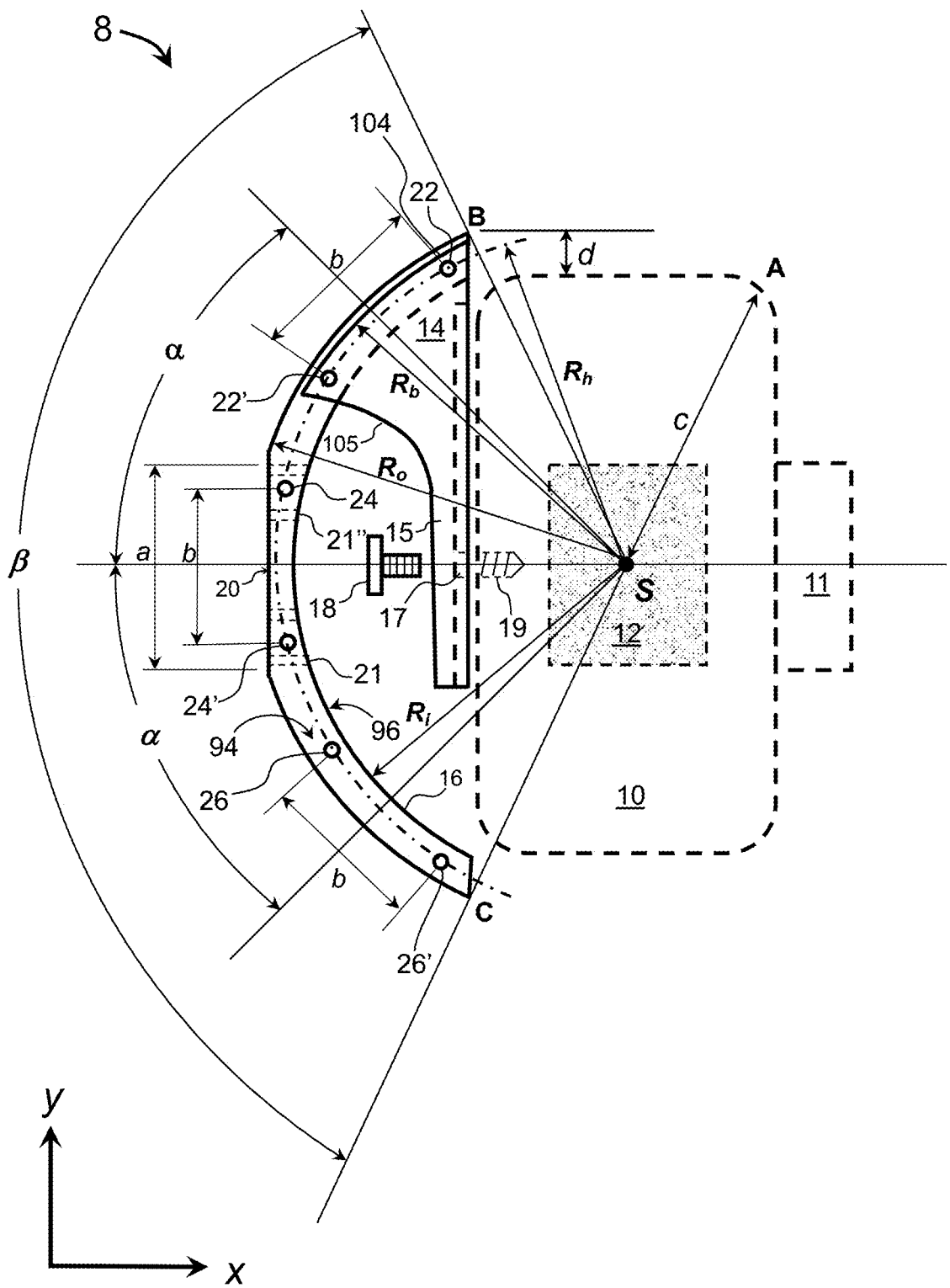
FIG. 1 shows an elevation rear view of a first embodiment of a multi-position camera adapter 8 and removable camera body 10, according to the present invention.

FIG. 1 shows an elevation rear view of a first embodiment of a multi-position adjustable camera adapter 8 and removable camera body 10, according to the present invention. Camera adapter 8 comprises two mating parts that are attached together with a pair of machine screws (not shown, which can be a pair of cap-head machine bolts). The two mating parts include: (1) a C-shaped support arc 16, and (2) a L-shaped, cantilevered camera mount 14. Note that camera body 10 is illustrated herein with dashed lines, indicating that the camera body itself is not an essential or required part of some embodiments of the invention. Camera body 10 comprises a multi-pixel sensor chip 12, which has a central point labelled "S". Camera body 10 also can comprise an optional viewfinder prism 11. Camera body 10 can also comprise a live digital display (not shown) located on its backside. Camera mount 14 comprises a curved (semi-circular) outer portion 104 with radius=$R_b$, and a pair of unthreaded through-holes 54, 54' (not shown) that are spaced apart a distance=b. Mount 14 further comprises an inner curved side portion with radius=$R_s$ (see FIG. 3A). Mount 14 further comprises a cantilevered portion 15 that has an unthreaded through-hole 17, which is appropriately sized to hold a standardized tripod thumb screw 18 (e.g., ¼-20 screw size) that screws into a standardized tripod threaded hole 19 in the base of camera body 10, for the purpose of rigidly attaching camera body 10 to cantilevered base 15 of mount 14.

Referring still to FIG. 1, support arc 16 can be a semi-circular arc, with an outer radius=$R_o$ and an inner radius=$R_i$, where $R_i<R_o$. Note that: $R_i<R_b<R_o$. In this view, support arc 16 is a sector of a circle, having a sector central angle, β, which is less than 180°, but is greater than 90°. In this example, the sector angle β=134°. Support arc 16 comprises three pairs of threaded holes: 22, 22'; 24, 24'; and 26, 26', which are oriented perpendicular to the rear face 94 of arc 16. Each pair of threaded holes is spaced apart circumferentially at a same distance=b. The three pairs of threaded holes: 22, 22'; 24, 24'; and 26, 26', can be located radially offset a small distance away from a centerline circumference (not shown) of arc 16 (i.e., holes 22, 22'; 24, 24'; and 26, 26' can be located closer to the inner surface 96 at $R_i$). These three pairs of mounting holes allow the camera mount 14 to be optionally mounted in one of three different (i.e., multiple) positions, corresponding to three different camera orientations (portrait, 45° tilted, and landscape). The other angle, a, defining the radial centerlines of each pair of through-holes (22, 22'; 24, 24'; and 26, 26') can be positioned at +/−45°; indicating that support arc 16 is symmetric about a horizontal line (x-axis) that bisects the arc. Support arc 16 further comprises a vertical flat portion 20 centered at the horizontal line that bisects arc 16, which has a height=a, where a>b. Note that the upper right-hand corner of support arc 16, labelled "B" in FIG. 1, is located a vertical distance=d above the uppermost edge of camera body 10. In some embodiments, d≥($R_o-R_i$). In general, support arc 16 and camera mount 14 can be made of magnesium, or aluminum or aluminum alloy, or steel, or another dense metal or alloy, which can be anodized black or painted black. Attachment screws/bolts can also be made of steel, or magnesium, or aluminum or aluminum alloy, all of which can be anodized black or painted black. In the example shown in FIG. 1: a=55 mm; b=36 mm; c=62 mm; $R_o$=90 mm; $R_i$=77 mm; $R_h$=81 mm; β=134° and α=45°.

Figure 2A:
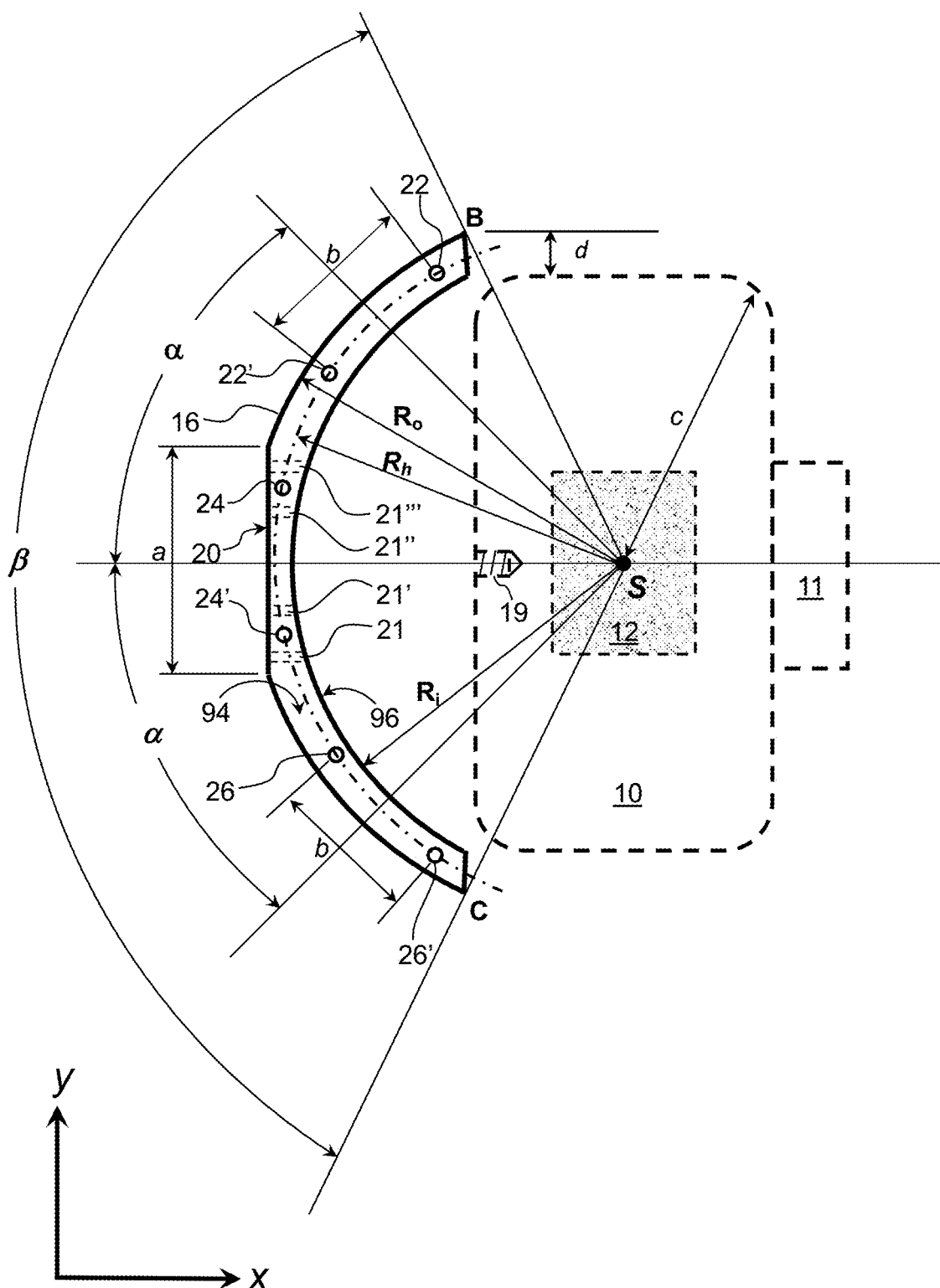
FIG. 2A shows an elevation rear view of a first embodiment of a C-shaped support arc 16 and removable camera body 10, according to the present invention.

FIG. 2A shows an elevation rear view of a first embodiment of a C-shaped support arc 16 and removable camera body 10, according to the present invention. Support arc 16 has an outer radius=$R_o$, and an inner radius=$R_i$, where $R_i<R_o$. In this view, support arc 16 is a sector of a circle, having a sector angle, β, which is less than 180°, but is greater than 90°. In this example, β=130°. Support arc 16 comprises three pairs of threaded holes: 22, 22'; 24, 24'; and 26, 26', which are oriented perpendicular to the rear face 94 of arc 16, and are positioned radially at a same radius=$R_h$ from the geometric center, S, of the sensor chip 12. These threaded mounting holes allows the camera mount 14 to be optionally mounted in one of three different (multiple) positions, corresponding to three different camera orientations (portrait, 45° tilted, and landscape). The angle, α, defining the radial centerlines of each pair of through-holes (22, 22'; 24, 24', and 26, 26') can be +/−45°. Support arc 16 further comprises a vertical flat portion 20 centered at the horizontal line along the x-axis that bisects arc 16, which has a height=a, where a>b. Support arc 16 further comprises four, parallel, horizontal through-holes 21, 21', 21", and 21''' (which are all unthreaded), and which are oriented substantially perpendicular to inside face 97 of arc 16. Through-holes 21, 21', 21", and 21''' allow support arc 16 to be securely mounted onto a rigid support structure of a view camera system (not shown). Note that the upper right-hand corner of support arc 16, labelled "B" in FIG. 2A, is located a vertical distance=d above the uppermost edge of camera body 10. In some embodiments, $d \geq (R_o - R_i)$. The length of inner radius $R_i$ is greater than the diagonal dimension "c" of camera body 10 (i.e., $R_i > c$). In some embodiments, $R_h \geq c+$ 18, where $R_h$ and c are measured in mm.

Figure 2B:
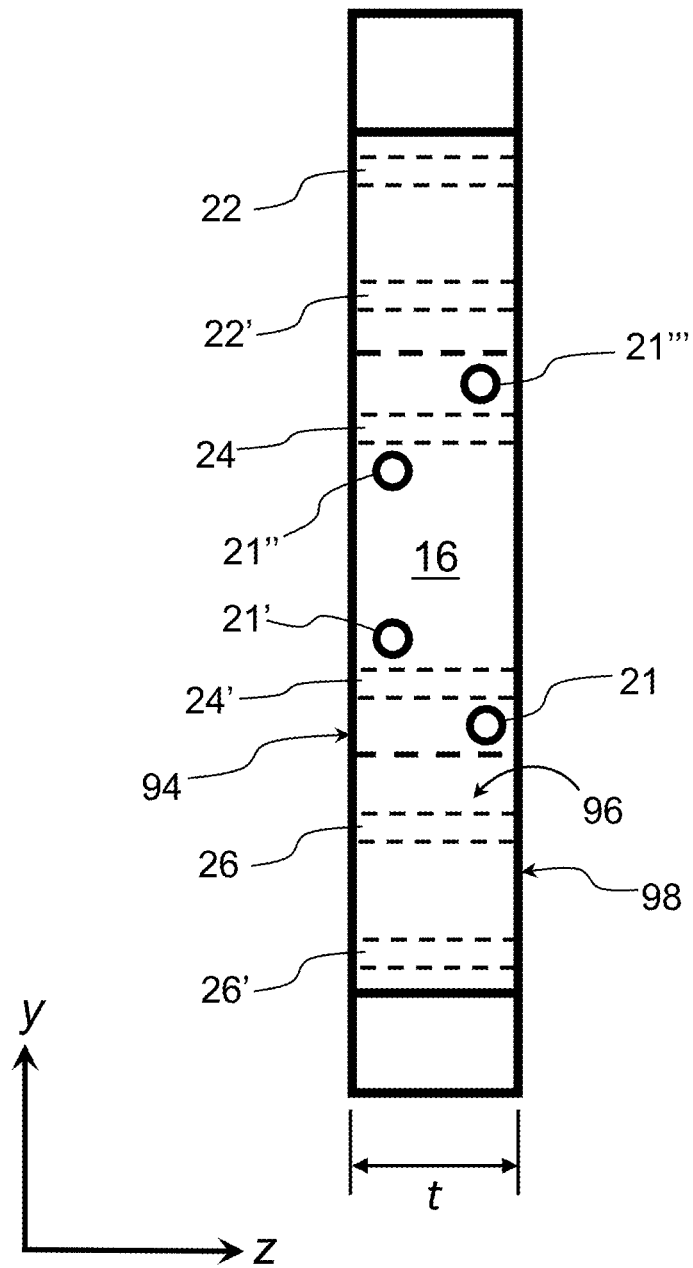
FIG. 2B shows an elevation side view of the first embodiment of a C-shaped support arc 16, according to the present invention.

FIG. 2B shows an elevation side view of the first embodiment of a C-shaped, support arc 16, according to the present invention. Support arc 16 further comprises four, parallel, horizontal through-holes 21, 21', 21", and 21'" (which are all unthreaded), and which are oriented perpendicular to inside face 96 of arc 16. Through-holes 21, 21', 21", and 21'" allow support arc 16 to be securely mounted onto a rigid support structure of a view camera system (not shown). Two of the holes 21' and 21" can be located offset on the left-hand side of arc 16, while the other two holes 21 and 21'" can be located offset on the right-hand side of arc 16. Other numbers of through-holes can be used for the plurality of holes, for example, two or three holes, instead of four (as in the present example). Support arc 16 further comprises three pairs of threaded holes: 22, 22'; 24, 24'; and 26, 26', which are oriented substantially perpendicular to the rear face 94 of arc 16. These three pairs of threaded mounting holes allow camera mount 14 to be optionally attached in one of three different (multiple) positions, corresponding to three different camera orientations (i.e., portrait, 45° tilted, and/or landscape). Note that through-holes 21, 21', 21", and 21'" can optionally be countersunk on the inner surface 96. Threaded holes 22, 22', 24, 24', 26, and 26' can penetrate completely through the thickness, t, of arc 16 (i.e., from the rear side 94 to the front side 98 of arc 16). Alternatively, threaded holes 22, 22', 24, 24', 26, and 26' can partially penetrate into the thickness, t, of arc 16 (e.g., 50% to 75% deep), (not shown).

Figure 3A:
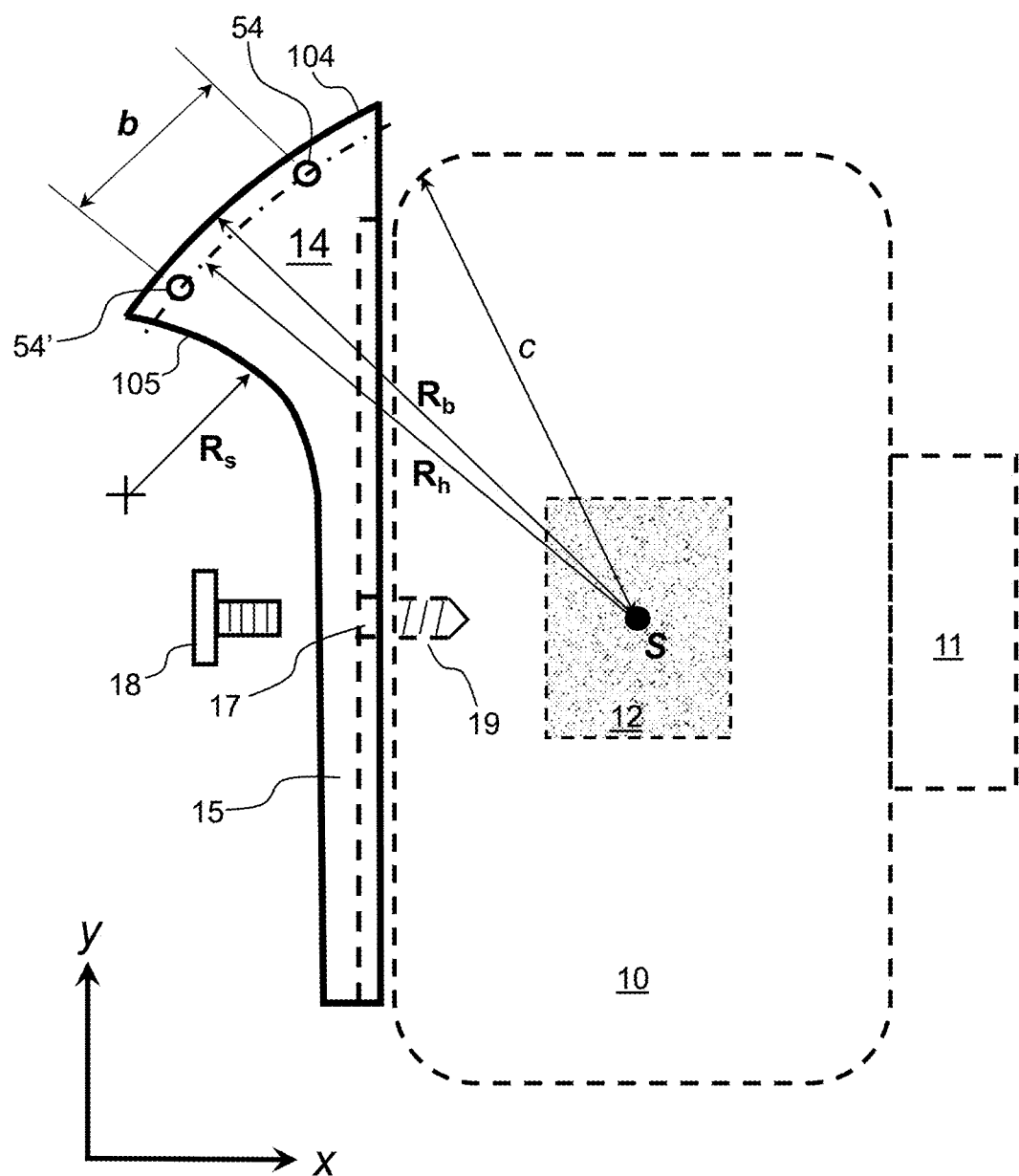
FIG. 3A shows an elevation rear view of a first embodiment of a cantilevered camera mount 14 and removable camera body 10, according to the present invention.

FIG. 3A shows an elevation rear view of a first embodiment of an L-shaped, cantilevered camera mount 14 and removable camera body 10, according to the present invention. Camera mount 14 comprises a curved (semi-circular) outer portion 104 with radius=$R_b$, and a pair of unthreaded through-holes 54, 54' that are spaced apart a circumferential distance=b. In some embodiments, $R_b > c$, where c=diagonal distance of camera body 10. Mount 14 further comprises an inner curved side portion 105 with a smaller radius=$R_s$ (i.e., $R_s < R_b$). $R_s$ can, for example, range from ⅓ to ¼ times $R_b$. Mount 14 further comprises a cantilevered extension portion/base 15 that has an unthreaded through-hole 17, which is sized appropriately to receive a standardized thumb screw 18, and which screws into standardized, threaded tripod hole 19 in the base of camera body 10 for the purpose of rigidly attaching camera body 10 to cantilevered base portion 15 of mount 14.

Figure 3B:
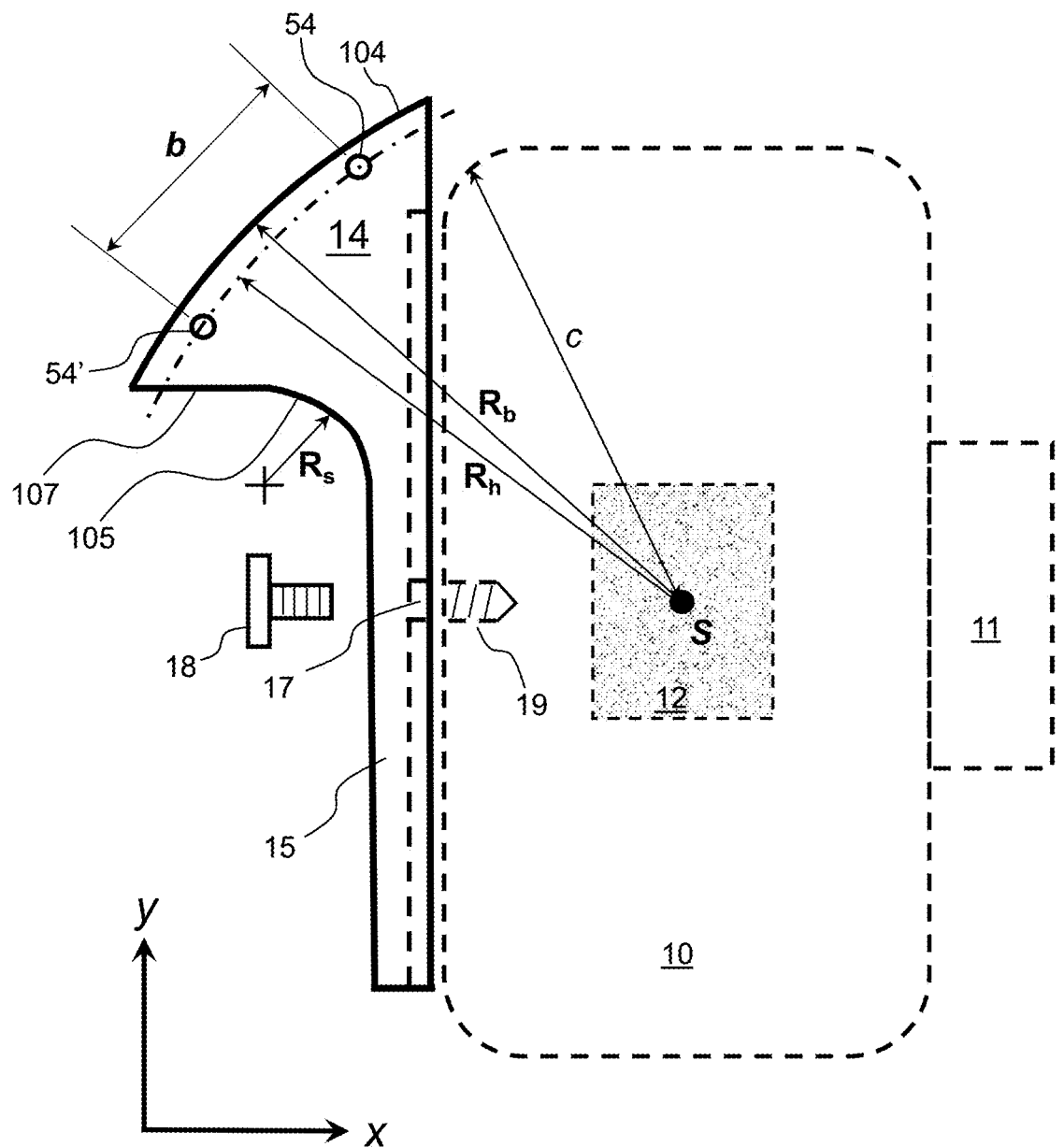
FIG. 3B shows an elevation rear view of a second embodiment of a cantilevered camera mount 14 and removable camera body 10, according to the present invention.

FIG. 3B shows an elevation rear view of a second embodiment of an L-shaped, cantilevered camera mount 14 and removable camera body 10, according to the present invention. Camera mount 14 comprises a curved (semi-circular) outer portion 104 with radius=$R_b$, and a pair of unthreaded through-holes 54, 54' that are spaced apart a circumferential distance=b, and are radially positioned at the same radius=$R_h$ from the geometric center, S, of the sensor chip 12 as the radius $R_h$ of the three pairs of threaded holes 22, 22'; 24, 24'; and 26, 26' in arc 16. In some embodiments, $R_b > c$, where c=diagonal distance of camera body 10. Mount 14 further comprises an inner curved side portion 105 with smaller radius=$R_s$. $R_s$ can range from ¼ to ⅙ times $R_b$. Mount 14 further comprises a horizontal, straight-line segment 107 that joins to semi-circular segment 105. Mount 14 further comprises a cantilevered extension base portion 15 that has an unthreaded through-hole 17, which is sized appropriately to receive a standardized, tripod thumb screw 18, and which screws into threaded tripod hole 19 in the base of camera body 10 for the purpose of rigidly attaching camera body 10 to cantilevered base portion 15 of mount 14.

Figure 4A:
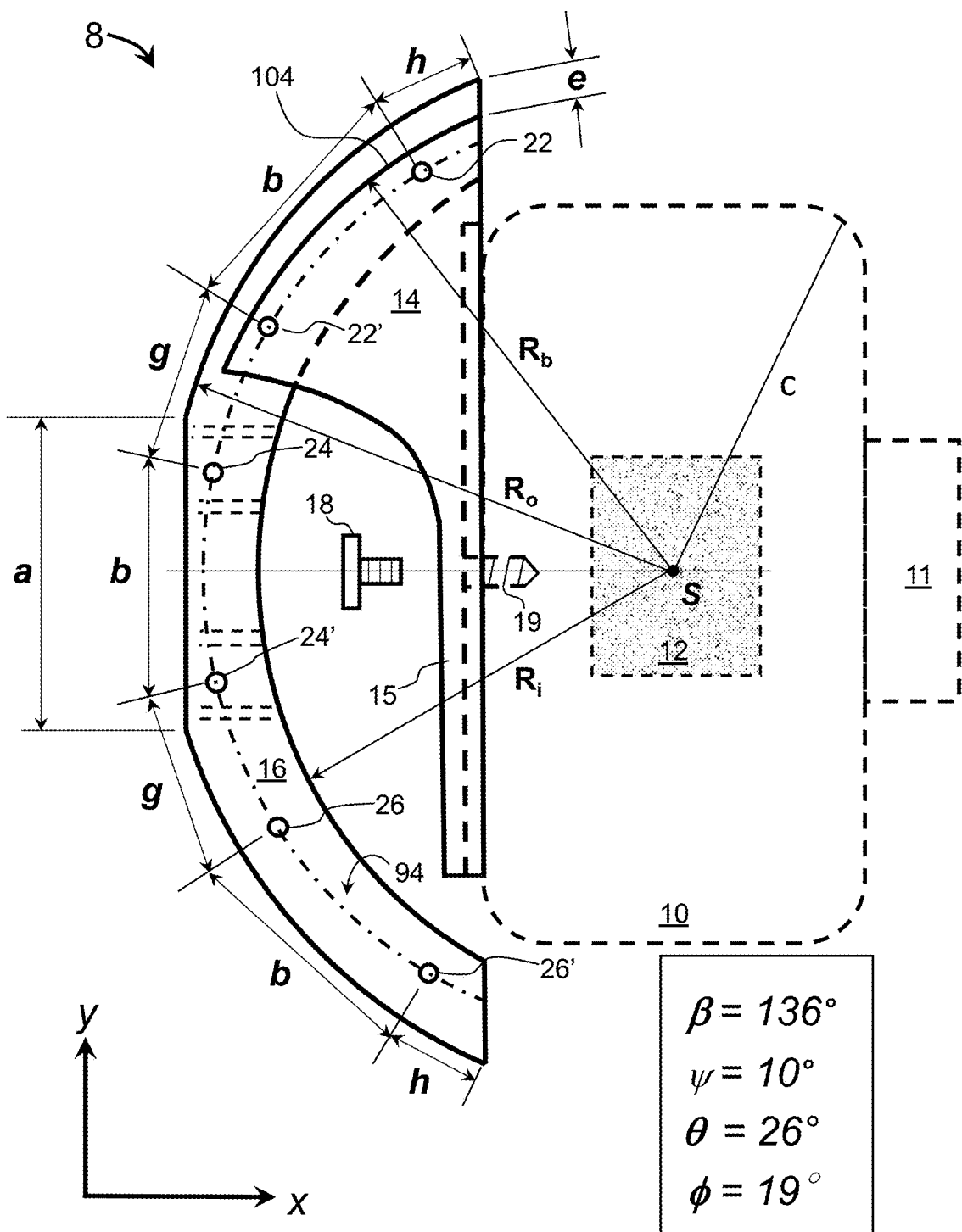
FIG. 4A shows an elevation rear view of the first embodiment of a multi-position camera adapter 8 and removable camera body 10, according to the present invention.

FIG. 4A shows an elevation rear view of the first embodiment of a multi-position camera adapter 8 and removable camera body 10 mounted in a portrait orientation, according to the present invention. Radial gap dimension "e" is shown, which is defined by the following equation: $e = R_o - R_b$. This gap, e, which can range from 3-5 mm, is needed to prevent interference of the outer circular arc portion 104 of camera mount 14 with a vertical adjustment cylinder 28 (not shown) when the mount 14 is attached at 45° tilted to the horizontal x-axis (see, e.g., FIG. 6). Support arc 16 further comprises three pairs of threaded holes: 22, 22'; and 24, 24'; and 26, 26', which are oriented substantially perpendicular to the rear face 94 of arc 16. These pairs of threaded mounting holes allow the camera mount 14 to be optionally attached in one of three different (multiple) positions, corresponding to three different camera orientations (i.e., portrait, 45° tilted, and/or landscape). The circumferential distance between each pair of the three pairs of threaded holes is the same, and is equal to b. The circumferential distance between adjacent holes (e.g., holes 24 and 22'; or 26 and 24') is also the same, and is equal to g, where g<b, as can be seen in FIG. 4A. In this example: a=55 mm, b=36 mm, c=62 mm, g=27 mm, h=15 mm, and the ratio g/b=0.75. Also, $R_i$=77 mm, $R_h$=81 mm, and $R_o$=90 mm.

Figure 4B:
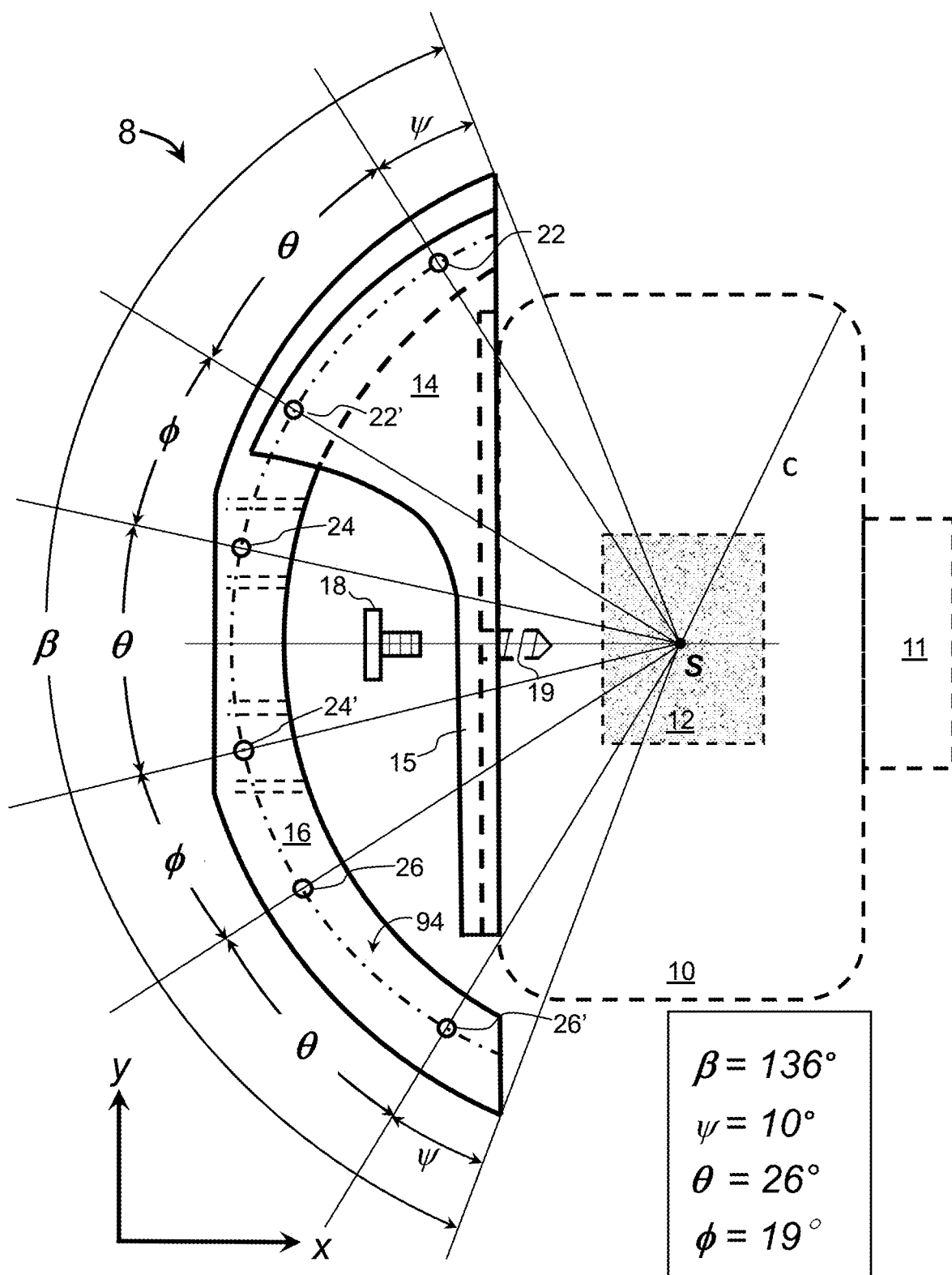
FIG. 4B shows an elevation rear view of the first embodiment of a multi-position camera adapter 8 and removable camera body 10, according to the present invention.

FIG. 4B shows an elevation rear view of the first embodiment of a multi-position camera adapter 8 and removable camera body 10 mounted in a portrait orientation, according to the present invention. The three pairs of threaded holes 22, 22'; and 24, 24'; and 26, 26' in arc 16 are circumferentially positioned at a same interior circumferential angular spacing, θ. In this example, θ=26°. The adjacent circumferential angular spacing, φ, defined as the adjacent circumferential angle disposed in-between adjacent pairs of holes (e.g., holes 24 and 22'; or holes 26 and 24') is less than the interior circumferential angular spacing, θ, inside of each pair of holes. In other words, φ<θ. In this example, φ=19° and θ=26°, and the ratio of angles φ/θ=0.75 (which is the same as the ratio of circumferential distances g/b=0.75 discussed above). In this example, the sector central angle, β=136°, and the circumferential angular offset of the first hole (22), ψ=10°. Note that θ+φ=45° (which is a general requirement). Note: the angles are measured in degrees.

FIG. 5 shows an elevation rear view of a first embodiment of a view camera system 6 comprising a multi-position camera adapter 8 and removable camera body 10 oriented parallel to the y-axis, γ=90°, (i.e., portrait mode), according to the present invention. Camera adapter 8 is rotatably and slidably attached to an upright rear arm (standard) 30 of a positionable rear L-frame 34 via movable, vertical adjustment cylinder 28 (which can rotate around the x-axis when upper thumb screw 36 is loosened). Likewise, vertical adjustment cylinder 28 can move up/down when the lower thumb screw 37 is loosened via a connected plate (not shown). Support arc 16 is securely attached to vertical adjustment cylinder 28 via four parallel, horizontal machine bolts 40, 40', 40", and 40'". Horizontal arm 32 of L-frame 34 is adjustable left/right along the x-axis, and in/out along the z-axis by sliding along the length of guide rail 38. Horizontal arm 32 of L-frame 34 is also rotatable around the y-axis using horizontal, adjustment cylinder 74, which is rotatably and slidably attached to guide rail 38. Tripod mount 120 is attached to the bottom of guide rail 38.

FIG. 6 shows an elevation rear view of a first embodiment of a view camera system 6 comprising a multi-position camera adapter 8 and removable camera body 10 oriented at $\gamma=45°$ to the horizontal x-axis (i.e., 45° tilt mode), according to the present invention. Camera adapter 8 is rotatably and slidably attached to an upright rear standard 30 of a positionable rear L-frame 34 via movable vertical adjustment cylinder 28 (which can rotate around the x-axis when upper thumb screw 36 is loosened). Likewise, vertical adjustment cylinder 28 can move up/down when the lower thumb screw 37 is loosened. Support arc 16 is securely attached to vertical adjustment cylinder 28 via four parallel machine bolts 40, 40', 40", and 40''' (not shown). Horizontal arm 32 of L-frame 34 is adjustable and can be translated left/right along the x-axis, and in/out along the z-axis along the length of guide rail 38. Horizontal arm 32 of L-frame 34 is also rotatable around the y-axis using horizontal adjustment cylinder 74, which is rotatably and slidably attached to guide rail 38. Tripod mount 120 is attached to the bottom of guide rail 38.

FIG. 7 shows an elevation rear view of a first embodiment of a view camera system 6 comprising a multi-position camera adapter 8 and removable camera body 10 oriented parallel to the horizontal x-axis, $\gamma=0°$, (i.e., landscape mode), according to the present invention. Camera adapter 8 is rotatably and slidably attached to an upright rear arm (standard) 30 of a positionable rear L-frame 34 via movable, vertical adjustment cylinder 28 (which can rotate around the x-axis when upper thumb screw 36 is loosened). Likewise, vertical adjustment cylinder 28 can move up/down when the lower thumb screw 37 is loosened. Support arc 16 is securely attached to vertical adjustment cylinder 28 via four parallel machine bolts 40, 40', 40", and 40'''. Horizontal arm 32 of L-frame 34 is adjustable left/right along the x-axis, and in/out along the z-axis along the length of guide rail 38. Horizontal arm 32 of L-frame 34 is also rotatable around the y-axis using horizontal adjustment cylinder 74, which is rotatably and slidably attached to guide rail 38. Tripod mount 120 is attached to the bottom of guide rail 38.

FIG. 8 shows an elevation rear view of a second embodiment of a view camera system 6' comprising a second embodiment of a multi-position camera adapter 8' and removable camera body 10 oriented parallel to the y-axis (i.e., portrait mode), that is rotatably and slidably attached to an upright rear arm (standard) 30 of a positionable rear L-frame 34, according to the present invention. Camera adapter 8 is rotatably and slidably attached to an upright arm (standard) 30 of a positionable rear L-frame 34 via movable, vertical adjustment cylinder 28 (which can rotate around the x-axis when upper thumb screw 36 is loosened). Likewise, vertical adjustment cylinder 28 can move up/down when the lower thumb screw 37 is loosened. Support plate 42 has a pair of square outer corners 44 and 44', and a semi-circular inner arc 43 with radius=$R_i$. Camera mount 14 can be bolted to support plate 42 at three different optional positions (multi-position), depending on the desired angle of orientation, r Horizontal arm 32 of L-frame 34 is also rotatable around the y-axis using horizontal adjustment cylinder 74, which is rotatably and slidably attached to guide rail 38. All three optional camera orientations are available in this second embodiment. Tripod mount 120 is attached to the bottom of guide rail 38.

FIG. 9 shows an elevation rear view of a third embodiment of a camera system 6" comprising a multi-position camera adapter 8 and removable camera body 10 oriented parallel to the y-axis (i.e., portrait mode), that is attached directly to an upright rear arm (standard) 30 of a positionable rear L-frame 34, according to the present invention. In this third embodiment, vertical adjustment cylinder 28 has been removed, and support arc 16 is directly attached to vertical rear arm 30. This particular embodiment can be used, for example, with older view cameras that have frames made of wood that do not tilt (e.g., Burke & James). Horizontal arm 32 of L-frame 34 is also rotatable around the y-axis using horizontal adjustment cylinder 74, which is rotatably and slidably attached to guide rail 38. All three optional camera orientations are available to be used in this embodiment. Tripod mount 120 is attached to the bottom of guide rail 38.

FIG. 10 shows an isometric, exploded perspective rear view of a view camera system 6 comprising a multi-position camera adapter assembly 8 and removable camera body 10 oriented parallel to the vertical y-axis (i.e., portrait mode), according to the present invention. Camera adapter 8 is rotatably and slidably attached to an upright rear arm (standard) 30 of an adjustable rear L-frame 34. Camera adapter 8 comprises two mating parts that are attached together with a pair of cap-head machine bolts 64, 64'. The two mating parts include: a C-shaped, support arc 16; and a L-shaped, cantilevered camera mount 14. Note that camera body 10 is illustrated with dashed lines, indicating that the camera itself is not a required part of this embodiment of the invention. Camera body 10 comprises a multi-pixel sensor chip 12, which has a central point "S". Camera body 10 also can comprise an optional viewfinder prism 11. Camera body 10 can also comprise a live, digital display screen 13 located on its backside. The L-shaped, cantilevered camera mount 14 comprises a curved (semi-circular) outer portion 104, and a pair of unthreaded through-holes 54, 54'. Mount 14 further comprises an inner, curved side portion 105 (which, optionally, can be a straight-line segment). Mount 14 further comprises a cantilevered extension base portion 15 that has an unthreaded through-hole 17, which is appropriately sized to receive a tripod thumb screw 18 that screws into threaded tripod hole 19 in the base of camera body 10, for the purpose of rigidly attaching camera body 10 to cantilevered portion 15 of mount 14.

Referring still to FIG. 10, camera adapter 8 further comprises a C-shaped support arc 16. In this view, support arc 16 is a sector of a circle, having a sector central angle, $\beta$, which is less than 180°, but is greater than 90°. Support arc 16 comprises three pairs of threaded holes: 22, 22'; 24, 24'; and 26, 26', which are oriented substantially perpendicular to the rear face 94 of arc 16. These mounting holes allows the camera mount 14 to be optionally mounted in one of three different (multiple) positions, corresponding to three different camera orientations (portrait, 45° tilted, and landscape). Support arc 16 further comprises a vertical flat portion 20 centered at the horizontal line that bisects arc 16. The flat vertical portion 20 comprises four through-holes 21, 21', 21", and 21''' that hold four cap-head bolts 40, 40', 40", and 40''', that are received by threaded holes 92, 92', 92", 92''', respectively, in vertical adjustment cylinder 28. Vertical adjustment cylinder 28 can move up/down on recessed groove/track 102 (or rotate about the x-axis), when thumb screws 36 and/or 37 are loosened, respectively. These adjustments thereby provide a 5-axis motion capability (X, Y, and Z translations, and 2 rotations) for camera body 10, thereby generating five traditional view camera adjustments (movements), including: tilt, swing, rise-and-fall, shift, and micro-focus of the rear plane.

FIG. 11 shows an isometric perspective rear view of the first embodiment of a C-shaped support arc 16, according to the present invention. Support arc 16 is a sector of a circle, having a sector central angle, β, which is less than 180°, but is greater than 90°. Support arc 16 comprises three pairs of threaded holes: 22, 22'; 24, 24'; and 26, 26', which are oriented substantially perpendicular to the rear face 94 of arc 16 These mounting holes allows a camera mount 14 (not shown) to be optionally mounted in one of three different multiple positions, corresponding to three different camera orientations (portrait, 45° tilted, and landscape). Support arc 16 further comprises a vertical flat portion 20 centered at a horizontal line along the x-axis that bisects arc 16. The flat portion 20 defines four, parallel, horizontal through-holes 21, 21', 21", and 21'" (which are oriented substantially perpendicular to inner diameter surface 96 of arc 16) for holding four cap-head bolts 40, 40', 40", and 40'" (not shown), that are received by threaded holes 92, 92', 92", 92'" (not shown), respectively, in adjustment cylinder 28 (not shown).

FIG. 12A shows an isometric perspective rear view of the first embodiment of a L-shaped, cantilevered camera mount 14, according to the present invention. Camera mount 14 comprises a curved (semi-circular) outer portion 104 with radius=$R_b$ (not shown), and a pair of unthreaded through-holes 54, 54' that are spaced apart a distance=b. The centerlines of holes 54 and 54' are aligned with the z-axis. Mount 14 further comprises an inner curved side portion 105 with a smaller radius=$R_s$. Mount 14 further comprises a cantilevered extension/base portion 15 that has an unthreaded through-hole 17, which is appropriately sized to hold a thumb screw 18 (not shown) that screws into standardized, threaded tripod hole 19 in the base of camera body 10 (not shown) for the purpose of rigidly attaching camera body 10 to cantilevered base portion 15. Notch 55 is cut out from mount 14 (note: mount 14 was originally machined from a length of L-angle metal stock). Note also that mount 14 comprises two integral plates: a rear face plate 150 and an integral base plate 152, which are disposed at right angles to each other (i.e., at 90°). This can be also seen in FIGS. 13A and 13C. Through-holes 54 and 54' are disposed in rear plate 150, while through-hole 17 for holding thumb screw 18 (not shown) is disposed in cantilevered base plate 152. Camera body 10 (not shown) can be mounted to base plate 152 using through-hole 17. The proximal and distal ends of mount 14 are indicated.

FIG. 12B shows an isometric perspective rear view of another embodiment of a L-shaped, cantilevered camera mount 14, according to the present invention. In this embodiment, the location of through-hole 17' is located offset in the z-axis direction away from the vertical centerline of base plate 152. Alternatively, or in combination with the preceding sentence, the location of through-hole 17' can be located offset in the vertical y-axis direction away from a horizontal centerline (not illustrated) of base plate 152. Such X- or Y-offsets can be helpful for accommodating a camera body 10 that has a tripod screw mount 19 that is offset some distance away from the plane or centerline of the camera's sensor chip 12 (not shown). Also, additional holes or slots or openings or recesses (not shown) can be custom-machined into the rear face plate 150 and/or base plate 152 of camera mount 14, as needed, (in addition to hole 17) to accommodate different locations of the camera body's tripod mounting hole 17, electronic cables, doors (battery or memory card), or other items that protrude from the camera's body 10 (not shown) and might hit or interfere with mount 14.

FIG. 13A shows a plan view of the first embodiment of a cantilevered camera mount 14, according to the present invention. Unthreaded through-holes 54, 54', and 17 are shown. Note that mount 14 comprises two integral plates: a rear face plate 150 and an integral base plate 152, which are disposed at right angles to each other (i.e., at 90°).

FIG. 13B shows a plan cross-section view A-A of the top end of a camera mount 14 attached to a support arc 16 with a pair of cap-head bolts 64 and 64', screwed into threaded holes 22 and 22', respectively, through through-holes 54 and 54' of mount 14, respectively, according to the present invention. The rear face 94 and front face 98 of arc 16 are indicated.

FIG. 13C shows a plan view of the top end of a cantilevered camera mount 14 attached to a semi-circular support arc 16, according to the present invention. Mount 14 is attached to arc 16 with a pair of cap-head screws 64 (only one screw is shown). Thumb screw 18 is shown. Mount 14 can be machined from a stock piece of L-angle of steel or aluminum alloy.

FIG. 14 shows an isometric rear perspective view of a view camera system 4 comprising a multi-camera, multi-position adapter 8 and attached camera body 10 oriented parallel to the y-axis (i.e., portrait mode), that is rotatably and slidably attached to an upright rear arm (standard) 30 of an adjustable rear L-frame 34, and including an adjustable front L-frame 34', according to the present invention. Support arc 16 is securely mounted to rear vertical adjustment cylinder 28 with four, parallel, horizontal cap-head bolts 40, 40', 40", and 40'" that screw into four, parallel, horizontal threaded holes 92, 92', 92", and 92'" (not shown) disposed in rear vertical adjustment cylinder 28. Camera body 10 can be securely mounted to camera mount 14 with tripod thumb screw 18 (not shown in this view). The height of adapter assembly 8 (and, hence, attached camera body 10) can be adjusted up and down along the y-axis, and/or adapter 8 can be rotated about the x-axis. An additional set of movements (z-axis translation, x-axis translation, and rotation about the y-axis) is provided by a pair of movable attachment mechanisms (not shown) that are disposed between horizontal support arms 32, 32' and guide rail 38. Optionally, vertical pins 84 and 84' can be used that slide in track/groove 80, which allows for rotation of arms 32 and 32' about the y-axis, as well as translation of arms 32, 32' along the length of guide rail 38 in the z-direction. A front lens board, front frame, and front lens/shutter or lens cap are not shown in this Figure. Front mounting hole 130' in front vertical attachment cylinder 28' can be used to attach a frame (not shown) that holds a front lens board (not shown).

FIG. 15 shows a side elevation view of a view camera system 4 comprising a multi-position, adjustable adapter assembly 8 (not shown) and attached camera body 10 oriented parallel to the vertical y-axis (i.e., portrait mode), that is rotatably and slidably attached to a upright rear arm (standard) 30 of an adjustable rear L-frame 34, according to the present invention. View camera system 4 further comprises an adjustable front L-frame 34' comprising a tiltable and positionable lens board 70 with attached front lens 72 and optional shutter 110 (or lens cap, not shown). Both front and rear L-frames 34' and 34, respectively, are adjustably attached to a common, horizontal guide rail 38. Horizontal guide rail 38 can be attached to an adjustable tripod mounting block 100, for removably mounting the guide rail 38 of camera system 4 to a tripod 120. The distance between front and rear L-frames 34' and 34, respectively, is equal to "H", which can be decreased or increased by sliding the horizontal arms 32 and 32' closer or further apart, respectively, along horizontal track/groove 80 in guide rail 38. The vertical position of camera body 10 can be adjusted by moving the camera body up or down along track 102 in rear vertical arm 30. Camera body 10 can be rotated about its x-axis by rotating the camera body 10 and locking it into place. Front lens 72 is mounted to lens board 70, which is held by frame 79 mounted to a front vertical adjustment cylinder 28' (not shown) on front vertical arm 30'. The position and orientation of lens board 70 (with mounted front lens 72 and optional shutter 110 or lens cap (not shown)) can be adjusted about five-axes by tilting, swinging, raising or lowering, shifting, or micro-focusing the lens board 70 using the five-axis movements of front L-frame 34'. Disposed in-between camera body 10 and lens board 70 is an adjustable, flexible extension bellows 78 that is rotatably attached to custom-machined, rotatable, cylindrical sealing rings 82 and 82'. The proximal and distal ends of bellows 78 are held in place with hose clamps 76 and 76' on sealing rings 82 and 82', respectively. Bellows 78, in this example, is shown in its fully extended position. Tripod mount 120 is attached to the bottom of guide rail 38 with tripod mounting cylinder 100.

FIG. 16 is a photograph showing an isometric rear perspective view of a prototype view camera system 4 comprising a multi-position, adjustable camera adapter assembly 8 and a Sony-brand DSLR camera body 10 (Sony α7II) oriented parallel to the y-axis (i.e., portrait mode), that is rotatably and slidably attached to a rear upright arm (standard) 30 of an adjustable rear L-frame 34; and with an adjustable front L-frame 34' comprising a tiltable and positionable lens board 70 and front lens 72 and shutter 110 (or lens cap, not shown), wherein both front and rear L-frames 34' and 34, respectively, are adjustably attached to a common horizontal guide rail 38, according to the present invention. Front lens 72 is mounted to lens board 70, which is held by square frame 79 by front vertical attachment cylinder 28' on front vertical arm 30' of front L-frame 34'. The position and orientation of lens board 70 (with mounted front lens 72) can be adjusted by tilting, swinging, raising or lowering, shifting, or micro-focusing the lens board 70 using the five-axis movements of front L-frame 34'. Disposed in-between camera body 10 and lens board 70 is an adjustable, flexible extension bellows 78 that is rotatably attached to custom-machined, rotatable sealing rings 82 and 82' (not shown). The proximal and distal ends of bellows 78 are held in place with hose clamps 76 and 76' on sealing rings 82 and 82', respectively. Bellows 78, in this example, is shown is its fully collapsed position. The bottom of rear L-frame 34 is attached to rotatable and slidable horizontal, adjustment cylinder 74, which is attached to horizontal guide rail 38 (and, likewise, for the front L-frame 34'). Guide rail 38 is attached to tripod 120 (which affords additional degrees of rotation and movements).

FIG. 17 is a photograph showing a rear elevation perspective view of a prototype view camera system 4 comprising a multi-position, adjustable camera adapter 8 and Sony-brand DSLR camera body 10 (Sony α7II) oriented parallel to the y-axis (portrait mode), that is rotatably and slidably attached to a rear vertical arm (standard) 30 of an adjustable rear L-frame 34, and with an adjustable front L-frame 34' comprising a tiltable and positionable lens board 70 and front lens 72 and shutter 110 (or lens cap, not shown), wherein both front and rear L-frames 34' and 34, respectively, are adjustably attached to a horizontal guide rail 38, according to the present invention. Front lens 72 is mounted to lens board 70, which is held by square frame 79 held in front L-frame 34'. Tightening thumb screw 36 secures the angular position of rear vertical adjustment cylinder 28; and tightening thumb screw 37 secures the vertical position of rear vertical adjustment cylinder 28. The position and orientation of lens board 70 (with mounted front lens 72) can be adjusted by tilting, swinging, raising or lowering, shifting, or micro-focusing the lens board 70 using any combination of the five-axis movements of front L-frame 34'. Disposed in-between camera body 10 and lens board 70 is an adjustable, flexible extension bellows 78 (not shown) that is rotatably attached to custom-machined, rotatable sealing rings 82 and 82' (not shown). The proximal and distal ends of bellows 78 are held in place with hose clamps 76 and 76' on sealing rings 82 and 82', respectively. The bottom of rear L-frame 34 is attached to rotatable and slidable horizontal, adjustment cylinder 74, which is attached to horizontal guide rail 38 (and, likewise, for the front L-frame 34').

FIG. 18 is a photograph showing a side elevation perspective view of a prototype view camera system 4 comprising a multi-position, adjustable camera adapter 8 and Sony-brand DSLR camera body 10 (Sony α7II) oriented parallel to the y-axis (portrait mode), that is rotatably and slidably attached to an upright arm (standard) 30 of an adjustable rear L-frame 34, with an adjustable front L-frame 34' comprising a tiltable and positionable lens board 70 and front lens 72 and shutter 110 or lens cap (not shown), wherein both front and rear L-frames 34' and 34, respectively, are adjustably attached to a horizontal guide rail 38, according to the present invention. Front lens 72 is mounted to lens board 70, which is held by square frame 79 in front L-frame 34'. Tightening rear upper thumb screw 36 secures the angular position of the rear vertical adjustment cylinder 28; and tightening lower thumb screw 37 secures the vertical position of the rear vertical adjustment cylinder 28 (and, likewise, for the front L-frame 34'). The position and orientation of lens board 70 (with mounted front lens 72) can be adjusted by tilting, swinging, raising or lowering, shifting, or micro-focusing the lens board 70 using any combination of the five-axis movements of front L-frame 34'. Disposed in-between camera body 10 and lens board 70 is an adjustable, flexible extension bellows 78 that is rotatably attached to custom-machined, rotatable sealing rings 82 and 82' (not shown). The proximal and distal ends of bellows 78 are held in place with hose clamps 76 and 76' on sealing rings 82 and 82', respectively. The bottom of rear L-frame 34 is attached to rotatable and slidable horizontal, adjustment cylinder 74, which is attached to horizontal guide rail 38 (and, likewise, for the front L-frame 34'). Guide rail 38 is attached to tripod 120 (which affords additional degrees of rotation and movements).

FIG. 19 is a photograph showing a front elevation perspective view of a prototype view camera system 4 comprising an adjustable front L-frame 34' comprising a tiltable and positionable lens board 70 and front lens 72 and shutter 110 (or lens cap, not shown), wherein both front L-frames 34' is adjustably attached to a horizontal guide rail 38, according to the present invention. Front lens 72 is mounted to lens board 70, which is held by square frame 79 in front L-frame 34'. Tightening front upper thumb screw 36' secures the angular position of front vertical adjustment cylinder 28'; and tightening lower thumb screw 37' secures the vertical position of the front vertical adjustment cylinder 28'. The position and orientation of lens board 70 (with mounted front lens 72) can be adjusted by tilting, swinging, raising or lowering, shifting, or micro-focusing the lens board 70 using any combination of the 5-axis movements of front L-frame 34'. In this example, lens board 70 is tilted upwards around the x-axis. The bottom of front L-frame 34' is attached to rotatable and slidable horizontal, adjustment cylinder 74', which is attached to horizontal guide rail 38.

FIG. 20 is a photograph showing a rear isometric perspective view of a prototype view camera system 4 comprising a multi-position, adjustable camera adapter 8 and DSLR camera body 10 (Sony α7II) oriented parallel to the y-axis (portrait orientation), that is rotatably and slidably attached to an upright arm (standard) 30 of an adjustable rear L-frame 34, with an adjustable front L-frame 34' comprising a tiltable and positionable lens board 70 and front lens 72 and shutter 110 or lens cap (not shown), wherein both front and rear L-frames 34' and 34, respectively, are adjustably attached to a horizontal guide rail 38, according to the present invention. Tightening front upper thumb screw 36 secures the angular position of rear vertical adjustment cylinder 28; and tightening lower thumb screw 37 secures the vertical position of the rear vertical adjustment cylinder 28. In this example, camera body 10 is tilted downwards around the x-axis. The bottom of rear L-frame 34 is attached to rotatable and slidable horizontal, adjustment cylinder 74, which is attached to horizontal guide rail 38. Guide rail 38 is attached to tripod 120 (which affords additional degrees of rotation and movements).

FIG. 21 is a photograph showing an exploded, isometric perspective rear view of a prototype adjustable camera adapter 8 comprising two parts: (1) a multi-position support arc 16, and (2) an un-attached, positionable camera mount 14, according to the present invention. Threaded holes 22, 22', 24, 24', 26 and 26' can be seen in arc 16. Through-holes 54 and 54' can be seen, along with through-hole 17, in mount 14.

FIG. 22 is a photograph showing a rear isometric perspective view of a 50 mm lens 72 mounted in a lens board 70, according to the present invention. Also shown is a short section of bellows 78 attached to lens board 70 with hose clamps 76 and 76'. This non-traditional, wide-angle lens plus lens board combination has been successfully used to make excellent photographs with a Horseman "L" 4×5 view camera system 4, according to the present invention.

FIG. 23 is a photograph showing a front isometric perspective view of a 50 mm lens 72 mounted in a lens board 70, according to the present invention. This non-traditional, wide-angle lens/lens board combination has been successfully used to make excellent photographs with a Horseman "L" 4×5 view camera system 4, according to the present invention.

FIG. 24 is a photograph showing a front isometric perspective view of a 35 mm lens 72 mounted in a lens board 70, according to the present invention. This non-traditional, wide-angle lens/lens board combination has been successfully used to make excellent photographs with a Horseman "L" 4×5 view camera system 4, according to the present invention.

FIG. 25 is a photograph showing an isometric rear perspective view of a prototype view camera system 4 comprising a multi-position, adjustable camera adapter 8 and DSLR camera body 10 (Sony α7II) oriented 45° to the y-axis (i.e., 45° tilt mode), that is rotatably and slidably attached to a rear upright arm (standard) 30 of an adjustable rear L-frame 34, with an adjustable front L-frame 34' comprising a tiltable and positionable lens board 70 and front lens 72 and shutter 110 (or lens cap, not shown), wherein both front and rear L-frames 34' and 34, respectively, are adjustably attached to a horizontal guide rail 38, according to the present invention. Front lens 72 is mounted to lens board 70, which is held by square frame 79 held by front vertical attachment cylinder 28' on a front vertical upright arm 30' of front L-frame 34'. The position and orientation of lens board 70 (with mounted front lens 72) can be adjusted by tilting, swinging, raising or lowering, shifting, or micro-focusing the lens board 70 using any combination of the 5-axis movements of front L-frame 34'. Disposed in-between camera body 10 and lens board 70 is an adjustable, extension bellows 78 that is rotatably attached to custom-machined, rotatable sealing rings 82 and 82' (not shown). The proximal and distal ends of bellows 78 are held in place with hose clamps 76 and 76', respectively. Bellows 78, in this example, is partially collapsed. The bottom of rear L-frame 34 is attached to rotatable and slidable horizontal, adjustment cylinder 74, which is attached to horizontal guide rail 38 (and, likewise, for the front L-frame 34'). Guide rail 38 is attached to tripod 120 (which affords additional degrees of rotation and movements).

FIG. 26 shows an elevation rear view of another embodiment of a C-shaped support arc 16 and removable camera body 10, according to the present invention. Arc 16 comprises a plurality of equal-length, flat inside facets 180, 180', etc. on the inside surface 96 of arc 16; and a series of flat outside facets 190, 190', etc. on the outer surface 97 of arc 16. The number of inside facets and outside facets can be the same, or different, from each other. In this example, the number of facets is =5, for both the inside and outside surfaces 96 and 97, respectively. Alternatively, the number of facets can range from 2, 3, 4, 5, 6, 7, or 8, in various combinations on inside and outside surfaces 96 and 97, respectively. In this embodiment, support arc 16 approximates a sector of a circle, having a sector central angle, β, which is less than 180°, but is greater than 90°. Support arc 16 comprises three pairs of threaded holes: 22, 22'; 24, 24'; and 26, 26', which are oriented perpendicular to the rear face 94 of arc 16. Each pair of threaded holes is spaced apart circumferentially a distance=b, and are located on an inscribed semi-circle with radius=$R_h$ (see dashed, semi-circular line). These three pairs of mounting holes allow camera mount 14 to be optionally mounted in one of three different (i.e., multiple) positions, corresponding to three different camera orientations (portrait, 45° tilted, and landscape). Support arc 16 further comprises four, parallel, horizontal through-holes 21, 21', 21", and 21''' (which are all unthreaded), and which are oriented substantially perpendicular to inside surface 96 of arc 16.

FIG. 27 shows an elevation rear view of another embodiment of a C-shaped support arc 16 and removable camera body 10, according to the present invention. Arc 16 comprises a plurality of flat inside facets 180, 180', etc. on the inside surface 96 of arc 16; and a single vertical outside surface 200 on the outer surface 97 of arc 16. In this example, the number of inside facets is =5 on the inside surface of arc 16. Alternatively, the number of inside facets can range from 2, 3, 4, 5, 6, 7, or 8. Support arc 16 further comprises a pair of square-shaped outer corners "B" and "C" that are connected by vertical line segment 200. In this embodiment, support arc 16 approximates a sector of a circle, having a sector central angle, β, which is less than 180°, but is greater than 90°. Support arc 16 comprises three pairs of threaded holes: 22, 22'; 24, 24'; and 26, 26', which are oriented perpendicular to the rear face 94 of arc 16. Each pair of threaded holes is spaced apart circumferentially a distance=b, and are located on an inscribed semi-circle with radius=$R_h$ (see dashed semi-circular line). These three pairs of mounting holes allow camera mount 14 to be optionally mounted in one of three different (i.e., multiple) positions, corresponding to three different camera orientations (portrait, 45° tilted, and landscape). Support arc 16 further comprises four, parallel, horizontal through-holes 21, 21', 21", and 21''' (which are all unthreaded), and which are oriented substantially perpendicular to inside surface 96 of arc 16.

FIG. 28 shows an elevation rear view of another embodiment of a C-shaped support arc 16 and removable camera body 10, according to the present invention. Arc 16 comprises a plurality of flat inside facets 180, 180', etc. on the inside surface 96 of arc 16; and a single vertical outside surface 200 on the outer surface 97 of arc 16. In this example, the number of inside facets is =3 on the inside surface of arc 16. Alternatively, the number of inside facets can range from 2, 3, 4, 5, 6, 7, or 8. Support arc 16 further comprises a pair of square-shaped outer corners "B" and "C" that are connected by vertical line segment 200. In this embodiment, support arc 16 approximates a sector of a circle, having a sector central angle, β, which is less than 180°, but is greater than 90°. Support arc 16 comprises three pairs of threaded holes: 22, 22'; 24, 24'; and 26, 26', which are oriented perpendicular to the rear face 94 of arc 16. Each pair of threaded holes is spaced apart circumferentially a distance=b, and are located on an inscribed semi-circle with radius=$R_h$ (see dashed semi-circular line). These three pairs of mounting holes allow camera mount 14 to be optionally mounted in one of three different (i.e., multiple) positions, corresponding to three different camera orientations (portrait, 45° tilted, and landscape). Support arc 16 further comprises four, parallel, horizontal through-holes 21, 21', 21", and 21''' (which are all unthreaded), and which are oriented substantially perpendicular to inside surface 96 of arc 16.

FIG. 29 shows an isometric perspective rear view of another embodiment of a C-shaped support arc 16, according to the present invention. Support arc 16 is a sector of a circle, having a sector central angle, β, which is less than 180°, but is greater than 90°. Support arc 16 comprises three pairs of threaded holes: 22, 22'; 24, 24'; and 26, 26', which are oriented perpendicular to the rear face 94 of arc 16. These mounting holes allows camera mount 14 to be optionally mounted in one of three different multiple positions, corresponding to three different camera orientations (portrait, 45° tilted, and landscape). Support arc 16 further comprises a vertical flat portion 20 centered at a horizontal line that bisects arc 16. The flat portion 20 comprises four, parallel, horizontal through-holes 21, 21', 21", and 21''' (which are oriented perpendicular to inner diameter surface 96 of arc 16) for holding four cap-head bolts 40, 40', 40", and 40''' (not shown), that are received by threaded holes 92, 92', 92", 92''' (not shown), respectively, in adjustment cylinder 28 (not shown). Support arc 16 further comprises a continuously-adjustable, rotatable arc segment 210 that rotates about the z-axis by sliding in a dovetail or T-slot type joint, which is held by a fixed, racetrack arc segment 220 (a dovetail joint is shown in FIG. 29). The rotatable arc segment 210 can be secured at a selected, fixed circumferential position by, for example, a thumb screw (not shown). Alternatively, arc 16 could have a T-slot, or complementary grooves on both sides, or a raised ridge, or even rack and pinion gearing (not illustrated).

FIG. 30 shows an elevation rear view of another embodiment of a C-shaped support arc 16 and removable camera body 10, according to the present invention. The radius, $R_h$, of the set of six threaded holes (holes #1-6) is defined by equation (1), as follows:

$$R_h \geq c + 18 \tag{1}$$

where, $R_h$ and c are measured in mm. The dimension "c" is the diagonal distance of camera body 10, as measured from the geometrical center "S" of sensor chip 12. The circumferential angular locations of threaded holes #1-6 are constrained by two general equations that relate the four circumferential angles: β, ψ, θ, and ϕ (as measured in degrees). In equation (2), the sum of all of the angles over an entire sector must equal the sector's central angle, β, as follows:

$$2\psi + 3\theta + 2\phi = 13 \tag{2}$$

In equation (3), the sum of the interior circumferential angular spacing (θ) between two pairs of holes (holes #1 and #2, for example) plus the adjacent circumferential angular spacing (ϕ) between adjacent pairs of holes (holes #2 and #3, for example) must always equal 45°, as defined by equation (3):

$$\theta + \phi = 45° \tag{3}$$

Angular constraint equation (3) is a necessary requirement to constrain camera mount 14 to be parallel to the horizontal x-axis when camera body 10 is positioned in the horizontal (landscape) position (as compared to mounting camera body 10 in the vertical (portrait) position). Additionally, constraint equation (3) is required to constrain camera mount 14 when tilted at 45° (i.e., when placed in the middle pairs of holes #3 and #4). In this example, the sector central angle, β=136°, and the circumferential angular offset for the first hole (hole #1), ψ=7°. The remaining angles are θ=32° and ϕ=13° (which sum to) 45°. These specific angles satisfy equations (2) and (3). The inner radius, $R_i$, and the outer radius, $R_o$, of arc 16 are not shown in this example.

FIG. 31 shows an elevation rear view of another embodiment of a C-shaped support arc 16 and removable camera body 10, according to the present invention. In this example, the sector central angle, β=136°, and the circumferential angular offset for the first hole (hole #1), ψ=7°. The remaining angles are θ=32° and ϕ=13° (which sum to 45°). Vertical flat 20 is shown. The inner radius, $R_i$, and the outer radius, $R_o$, of arc 16 are identified in this example.

FIG. 32 shows an elevation rear view of another embodiment of a C-shaped support arc 16, camera mount 14, and removable camera body 10, according to the present invention. Camera body 10 is mounted in the vertical (portrait) orientation using holes #1 and #2. Vertical flat 20 is shown. In this example, the sector central angle, β=136°, and the circumferential angular offset for the first hole (hole #1), ψ=7°. The remaining angles are θ=32° and ϕ=13° (which sum to 45°).

FIG. 33 shows an elevation rear view of another embodiment of a C-shaped support arc 16, camera mount 14, and removable camera body 10, according to the present invention. Camera body 10 is mounted in the 45° tilted orientation using holes #3 and #4. Vertical flat 20 is shown. In this example, the sector central angle, β=136°, and the circumferential angular offset for the first hole (hole #1), ψ=7°. The remaining angles are θ=32° and ϕ=13° (which sum to 45°).

FIG. 34 shows an elevation rear view of another embodiment of a C-shaped support arc 16, camera mount 14, and removable camera body 10, according to the present invention. Camera body 10 is mounted in the horizontal (landscape) orientation using holes #5 and #6. Vertical flat 20 is shown. In this example, the sector central angle, β=136°, and the circumferential angular offset for the first hole (hole #1), ψ=7°. The remaining angles are θ=32° and ϕ=13° (which sum to 45°).

FIG. 35 shows an elevation rear view of another embodiment of a C-shaped support arc 16 and removable camera body 10, according to the present invention. In this example, the sector central angle, β=130°, and the circumferential angular offset for the first hole (hole #1), ψ=5°. The remaining angles are: θ=30° and ϕ=15° (which sum to 45°). These specific angles satisfy equations (2) and (3). Note: the inner radius, $R_i$, and the outer radius, $R_o$, of arc 16 are not shown in this example FIG. 36 shows an elevation rear view of another embodiment of a C-shaped support arc 16 and removable camera body 10, according to the present invention. In this example, the sector central angle, $\beta=136°$, and the circumferential angular offset for the first hole (hole #1), $\psi=8°$. The remaining angles are $\theta=30°$ and $\phi=15°$ (which sum to 45°). These specific angles satisfy equations (2) and (3). The inner radius, $R_i$, and the outer radius, $R_o$, of arc 16 are identified in this example.

FIG. 37 shows an elevation rear view of another embodiment of a C-shaped support arc 16, camera mount 14, and removable camera body 10, according to the present invention. Camera body 10 is mounted in the vertical (portrait) orientation using holes #1 and #2. Vertical flat 20 is shown.

FIG. 38 shows an elevation rear view of another embodiment of a C-shaped support arc 16, camera mount 14, and removable camera body 10, according to the present invention. Camera body 10 is mounted in the horizontal (landscape) orientation using holes #5 and #6. Vertical flat 20 is shown.

FIG. 39A shows an elevation rear view of another embodiment of a C-shaped support arc 16, camera mount 14, and removable camera body 10, according to the present invention. In this example, the sector central angle, $\beta=134°$, and the circumferential angular offset for the first hole (hole #1), $\psi=17°$. The remaining angles are $\theta=10°$ and $\phi=35°$ (which sum to 45°). These specific angles satisfy equations (2) and (3). The small distance, b, between any given pairs of holes (e.g., holes #1 and #2) in this example makes the camera mount 14 less stiff when attached to arc 16 than the examples shown previously in FIGS. 30-38. The inner radius, $R_i$, and the outer radius, $R_o$, of arc 16 are identified in this example.

FIG. 39B shows an elevation rear view of another embodiment of a C-shaped support arc 16, camera mount 14, and removable camera body 10, according to the present invention. Camera mount 14 with mounted camera body 10 are both positioned horizontally in a landscape orientation using holes #5 and #6.

FIG. 40 shows an elevation rear view of another embodiment of a C-shaped support arc 16, camera mount 14, and removable camera body 10, according to the present invention. In this example, the sector central angle, $\beta=135°$, and the circumferential angular offset for the first hole (hole #1), $\psi=11.25°$. The remaining angles are $\theta=22.5°$ and $\phi=22.5°$ (which sum up to 45°). These specific angles satisfy equations (2) and (3). Note that holes #1-6 are evenly spaced apart circumferentially (i.e., because $\theta=\phi$ in this example). Note also that $2\psi=22.5°$, which is the same angle as $\theta$ and $\phi$ in this example (e.g., when $\beta=135°$). Note also that the inner radius, $R_i$, and the outer radius, $R_o$, of arc 16 are identified in this example. Note also that when $\theta=\phi=22.5°$, and $\psi$ and $\beta$ are unknown angles, it follows that equation (2) simplifies into equation (4) as follows:

$$2\psi+112.5=\beta \qquad (4).$$

FIG. 41 shows an elevation rear view of another embodiment of a C-shaped support arc 16, camera mount 14, and removable camera body 10, according to the present invention. Camera body 10 is mounted in the horizontal (landscape) orientation using holes #5 and #6. Vertical flat 20 is shown. Note also that the inner radius, $R_i$, and the outer radius, $R_o$, of arc 16 are not identified in this example.

FIG. 42A shows an elevation rear view of another embodiment of a view camera system 6 comprising a multi-position camera adapter assembly 8 and removable camera body 10 oriented at $\gamma=56°$ to the horizontal x-axis (i.e., maximum-vertical mode), according to the present invention. When sensor chip 12 is oriented at $\gamma=56°$ to the horizontal x-axis, a vertical diagonal (i.e., line "m-n") that cuts vertically across the sensor maximizes the sensor's exposure to images aligned in the vertical direction (e.g., the Washington Monument). This angular orientation ($\gamma=56°$) puts the longest diagonal length=43.27 mm of a 24×36 mm DSLR sensor 12 exactly on the Y-axis without having to tilt the tripod 12 degrees more from 45 degrees and then having to deal with any resulting yaw angle.

FIG. 42B shows an elevation rear view of another embodiment of a view camera system 6 comprising a multi-position camera adapter assembly 8 oriented at $\gamma=56°$ to the horizontal x-axis (i.e., maximum-vertical mode), according to the present invention.

FIG. 42C shows an elevation rear view of another embodiment of a view camera system 6, according to the present invention. Additional threaded mounting holes 300 and 300' are shown, which correspond to $\gamma=56°$ orientation of mount 14.

FIG. 43A shows an elevation rear view of another embodiment of a view camera system 6 comprising a multi-position camera adapter assembly 8 and removable camera body 10 oriented at $\gamma=34°$ to the horizontal x-axis (i.e., maximum-horizontal mode), according to the present invention. When sensor chip 12 is oriented at $\gamma=34°$ to the horizontal x-axis, a horizontal diagonal (i.e., line "o-p") that cuts horizontally across the sensor maximizes the sensor's exposure to images aligned in the horizontal direction (e.g., horizon, lakeshores). This angular orientation ($\gamma=34°$) puts the longest diagonal length=43.27 mm of a 24×36 mm DSLR sensor 12 exactly on the X-axis without having to tilt the tripod 12 degrees more from 45 degrees and then having to deal with any resulting yaw angle.

FIG. 43B shows an elevation rear view of another embodiment of a view camera system 6 comprising a multi-position camera adapter assembly 8 oriented at $\gamma=34°$ to the horizontal x-axis (i.e., maximum-horizontal mode), according to the present invention.

FIG. 43C shows an elevation rear view of another embodiment of a view camera system 6, according to the present invention. Threaded mounting holes 402 and 402' are shown, which correspond to $\gamma=34°$ orientation of mount 14.

Note that in all of the embodiments of view camera systems disclosed herein that the camera mount 14 and/or support arc 16 can be configured (i.e., machined) by cutting slot(s), hole(s), or other openings such that mount 14 and/or arc 16 do not interfere with, or block access to, any items that protrude from camera body 10, such as: electronic cable(s), battery compartment door(s), or memory card door(s).

Note that support arc 16 can be easily flipped 180° about the x-axis. Also, the rear L-frame 34 can be rotated 180° about the y-axis to put the upright vertical arm (standard) 30 on the East side; and arc 16 can be rotated 180° about the x-axis to position screw hole 26' at the top. In this way, sensor 12 of camera body 10 can have the same distance from the lens board 70 along the z-axis as compared to the original (first) embodiment.

Note also that camera mount 14 can be manufactured as a mirror-image of itself (i.e., a "left-handed" version, as compared to the original "right-handed" version), which would allow the upright rear vertical arm (standard) 30 to be rotated 180° about the y-axis, thereby placing the camera body 10 on the East side of the view camera system 4, while still properly facing camera body 10 (i.e., sensor 12) towards the front standard 34' and front lens 72.

Another embodiment of the present invention is as a modular system. The camera body 10, bellows 78, hose clamps 76 & 76', sealing rings 82 & 82', front lens board 70, and front lens 72 can be easily switched out as a single module for a different body/bellows/lens module with a few quick movements: unplug the cables, loosen the thumb screw, and unsnap the lens board. It is similar to changing lenses on an SLR camera, except that it's better because a different camera body 10 (assuming roughly the same dimensions) can have a different sensor better suited to the lens to be put into use, i.e., a coarse-grain sensor 12 versus a fine-grain sensor 12.

FIG. 44 shows an elevation side perspective view of an embodiment of a view camera system 3, according to the present invention. View camera system 3 was made by a Swiss company "Sinar", and has 5-axis movements that allow for tilt, swing, rise and fall, shift, and micro-focus adjustments. Camera system 3 comprises a DSLR camera body 10 attached to camera mount 14 using thumb screw 18. Mount 14 is attached to support arc 16, which is attached to rear mounting block 99 of view camera 3. Support arc 16 is oriented horizontally, so that flat segment 20 rests horizontally flat against the top of rear mounting block 99. Camera body 10 is oriented in the vertical (i.e., Portrait) orientation in this example. Camera body 10 is connected to front lens board 70 through flexible bellows 78. Front lens board 70 (which is held by outer frame 79) holds shutter 110 and front lens 72. Horizontal guide tube 38 (not shown) allows the distance between the front and rear mounting blocks 99 and 99', respectively, to be adjusted.

FIG. 45 shows an elevation rear perspective view of an embodiment of a view camera system 3, according to the present invention. View camera system 3 was made by a Swiss company "Sinar", and has 5-axis movements that allow for tilt, swing, rise and fall, shift, and micro-focus adjustments. Camera system 3 comprises a DSLR camera body 10 (not shown) attached to camera mount 14 using thumb screw 18, and mount 14 is attached to support arc 16, which is attached to rear mounting block 99 of view camera 3. Support arc 16 is oriented horizontally, so that flat segment 20 rests horizontally flat against the top of rear mounting block 99. Horizontal guide tube 38 allows the distance between the front and rear mounting blocks 99 and 99', respectively, to be adjusted.

FIG. 46 shows an elevation side perspective view of an embodiment of a view camera system 3, according to the present invention. View camera system 3 was made by a Swiss company "Sinar", and has 5-axis movements that allow for tilt, swing, rise and fall, shift, and micro-focus adjustments. Camera system 3 comprises a DSLR camera body 10 attached to camera mount 14 using thumb screw 18, wherein mount 14 is attached to support arc 16, which is attached to rear mounting block 99 of view camera 3. Support arc 16 is oriented horizontally, so that flat segment 20 rests horizontally flat against the top of rear mounting block 99. Camera body 10 is oriented in the vertical (i.e., Portrait) orientation in this example. Camera body 10 is connected to front lens board 70 with flexible bellows 78. Front lens board 70 (which is held by outer frame 79) holds shutter 110 and front lens 72. Hose clamps 76 and 76' attach the ends of bellows 78 to camera body 10 and front lens board 70, respectively. Horizontal guide tube 38 allows the distance between the front and rear mounting blocks 99 and 99', respectively, to be adjusted.

FIG. 47 shows an elevation rear perspective view of an embodiment of a view camera system 3, according to the present invention. View camera system 3 was made by a Swiss company "Sinar", and has 5-axis movements that allow for tilt, swing, rise and fall, shift, and micro-focus adjustments. Camera system 3 comprises a DSLR camera body 10 attached to camera mount 14 using thumb screw 18, wherein mount 14 is attached to support arc 16, which is attached to rear mounting block 99 of view camera 3. Support arc 16 is oriented horizontally, so that flat segment 20 rests horizontally flat against the top of rear mounting block 99. Camera body 10 is oriented in the vertical (i.e., Portrait) orientation in this example. Camera body 10 is connected to front lens board 70 with flexible bellows 78. Front lens board 70 is held by outer frame 79. Horizontal guide tube 38 allows the distance between the front and rear mounting blocks 99 and 99', respectively, to be adjusted.

FIG. 48 shows a front elevation perspective view of an embodiment of a view camera system 2, according to the present invention. The view camera system 2 comprises a wooden rectangular rear frame 34 and wooden rectangular front frame 34' attached to a horizontal guide rail 38, where the distance between the front and rear frames 34' and 34, respectively, is adjustable. This antique camera (originally called a "field camera") was made by the Burke and James Company in the time frame of 1910 to 1940. The front frame 34' holds a tiltable front frame 79 that holds a front lens board 70 with mounted front lens 72.

FIG. 49 shows a rear elevation perspective view of an embodiment of a view camera system 2, according to the present invention. The view camera system 2 comprises a wooden rectangular rear frame 34 and wooden rectangular front frame 34' attached to a horizontal guide rail 38, where the distance between the front and rear frames 34' and 34, respectively, is adjustable. This antique camera (originally called a "field camera") was made by the Burke and James Company in the time frame of 1910 to 1940. The support arc 16 with attached camera mount 14 is shown resting in a horizontal orientation on the bottom arm of rear frame 34. In this example, camera body 10 is oriented at 45° to the horizontal axis; and camera body 10 is a Canon 1Ds-|| DLSR.

What is claimed is:

1. A view camera system comprising:
    a C-shaped support arc;
    a L-shaped cantilevered camera mount removably attached to the arc; and
    a view camera system comprising a plurality of outer boundaries;
    wherein the support arc is located inside of the outer boundaries of the view camera system, and the support arc is directly attached to a rigid part of the view camera system.

2. The view camera system of claim 1, wherein the support arc is oriented vertically, and the camera mount is attached to the support arc in a vertical orientation; and wherein the system further comprises a camera body attached to the camera mount at a 0 degree "portrait" orientation using a tripod thumb screw.

3. The view camera system of claim 1, wherein the support arc is oriented vertically, and the camera mount is attached to the support arc in a 45° orientation; and wherein the system further comprises a camera body attached to the camera mount at a 45 degree "tilted" orientation using a tripod thumb screw.

4. The view camera system of claim 1, wherein the support arc is oriented vertically, and the camera mount is attached to the support arc in a horizontal orientation; and wherein the system further comprises a camera body attached to the camera mount at a 90 degree "landscape" orientation using a tripod thumb screw.

5. The view camera system of claim 1, wherein the support arc comprises three pairs of threaded mounting holes (holes #1-2, #3-4, and #5-6), that are oriented perpendicular to a rear face of the arc;
   wherein each pair of holes (holes #1-2; #3-4; and #5-6) are spaced apart by a same distance=b; and
   wherein the camera mount is attached to the support arc with a pair of machine screws that screw into a selected one pair of the three pairs of threaded mounting holes.

6. A view camera system with an adjustable, multi-position camera adapter assembly, the system comprising:
   a C-shaped support arc;
   a L-shaped cantilevered camera mount removably attached to the arc; and
   a view camera system comprising:
      a movable, rear vertical adjustment cylinder, and
      an adjustable rear L-frame comprising a rear vertical arm and a rear horizontal arm;
   wherein the support arc is attached to the rear vertical adjustment cylinder with a plurality of attachment screws; and
   wherein the rear vertical adjustment cylinder is rotatably and slidably attached to the rear vertical arm.

7. The view camera system of claim 6, wherein the rear vertical adjustment cylinder is vertically movable along a vertical y-axis that coincides with a vertical direction of the rear vertical arm.

8. The view camera system of claim 6, wherein the rear vertical adjustment cylinder is rotatable around a horizontal x-axis that is oriented parallel to a horizontal direction of the rear horizontal arm.

9. The view camera system of claim 6, wherein the rear horizontal arm is mounted to a movable, rear horizontal adjustment cylinder that allows the rear L-frame to be translated along a horizontal x-axis; and that allows the rear L-frame to be rotated around a vertical y-axis that is oriented parallel to a vertical direction of the rear vertical arm.

10. The view camera system of claim 9, wherein the rear horizontal adjustment cylinder is mounted to a horizontal guide rail that allows the rear L-frame to be translated along a horizontal z-axis that coincides with a horizontal longitudinal direction of the guide rail.

11. The view camera system of claim 6, wherein the rear vertical adjustment cylinder comprises a plurality of parallel, horizontal threaded holes for receiving a plurality of horizontal attachment screws that attach the support arc to the rear vertical adjustment cylinder.

12. The view camera system of claim 6, wherein the support arc is oriented horizontally.

13. A dual-frame view camera system with an adjustable, multi-position camera adapter assembly, the system comprising:
   a C-shaped support arc;
   a L-shaped cantilevered camera mount removably attached to the arc;
   a movable, rear vertical adjustment cylinder;
   a movable, front vertical adjustment cylinder;
   a rear L-frame comprising a rear vertical arm and a rear horizontal arm;
   a front L-frame comprising a front vertical arm and a front horizontal arm; and a horizontal guide rail;
   wherein the support arc is securely attached to the rear vertical adjustment cylinder with a plurality of parallel, horizontal attachment screws; and
   wherein the rear vertical adjustment cylinder is rotatably and slidably attached to the rear vertical arm;
   wherein the front vertical adjustment cylinder is rotatably and slidably attached to the front vertical arm; and
   wherein the front and rear L-frames are movably attached to the horizontal guide rail in such a way as to allow for z-translation of each L-frame along a longitudinal z-axis of the guide rail; and to allow for x-translation of each L-frame along a x-axis that is perpendicular to said longitudinal z-axis; and for y-rotation around a vertical y-axis of each L-frame.

14. The dual-frame view camera system of claim 13, further comprising a front lens board with an attached front lens, and a shutter or lens cap;
   wherein the front lens board is held by a front frame that is attached to the front vertical attachment cylinder.

15. The dual-frame view camera system of claim 14, further comprising a camera body removably attached to the camera mount with a tripod thumb screw.

16. The dual-frame view camera system of claim 15, further comprising a flexible bellows disposed in-between the camera body and the front lens or shutter.

17. The dual-frame view camera system of claim 16 further comprising front and rear rotatable, cylindrical sealing rings; wherein each end of the bellows is attached with a hose clamp to a corresponding sealing ring.

18. The dual-frame view camera system of claim 17, wherein the camera body, bellows, hose clamps, sealing rings, front lens board, and front lens forms a modular unit that can be removed and replaced with a different module.

19. The dual-frame view camera system of claim 14, wherein the front lens is a wide-angle lens that has a focal length less than or equal to 50 mm.

20. The dual-frame view camera system of claim 13, wherein
   the support arc comprises three pairs of threaded mounting holes (holes #1-2, #3-4, and #5-6), that are oriented perpendicular to a rear face of the arc;
   wherein each pair of holes (holes #1-2; #3-4; and #5-6) are spaced apart by a same distance=b; and
   wherein the camera mount is attached to the support arc with a pair of machine screws that screw into a selected one pair of the three pairs of threaded mounting holes.

21. The dual-frame view camera system of claim 20, wherein the pair of machine screws are disposed through a pair of coincident through-holes disposed at a proximal end of the camera mount.

\* \* \* \* \*